US010947913B2

(12) United States Patent
Nahar et al.

(10) Patent No.: US 10,947,913 B2
(45) Date of Patent: Mar. 16, 2021

(54) ELECTRONIC EVAPORATIVE EMISSIONS MANAGEMENT SYSTEM

(71) Applicant: Eaton Intelligent Power Limited, Dublin (IE)

(72) Inventors: Nikhil Nahar, Kharadi (IN); Sudeep Motilal Solanki, Pune (IN); Max Russell Franklin, Birmingham, MI (US); Vaughn Kevin Mills, Chelsea, MI (US); Mark Beaupre, Southfield, MI (US); Matthew Memmer, Plymouth, MI (US); Robert Andrew Dayton, Attica, MI (US)

(73) Assignee: Eaton Intelligent Power Limited, Dublin (IE)

( * ) Notice: Subject to any disclaimer, the term of this patent is extended or adjusted under 35 U.S.C. 154(b) by 57 days.

(21) Appl. No.: 16/247,697

(22) Filed: Jan. 15, 2019

(65) Prior Publication Data

US 2019/0145326 A1    May 16, 2019

Related U.S. Application Data

(63) Continuation of application No. PCT/US2017/041888, filed on Jul. 13, 2017.
(Continued)

(51) Int. Cl.
*F02D 41/00* (2006.01)
*F02M 25/08* (2006.01)
*B60K 15/035* (2006.01)

(52) U.S. Cl.
CPC ......... *F02D 41/003* (2013.01); *F02M 25/089* (2013.01); *F02M 25/0872* (2013.01);
(Continued)

(58) Field of Classification Search
CPC .............. F02D 41/003; F02D 2200/50; F02D 2200/06; F02M 25/089; F02M 25/0872;
(Continued)

(56) References Cited

U.S. PATENT DOCUMENTS

| 6,546,955 B1 | 4/2003 | Burke |
| 2012/0012599 A1 | 1/2012 | Graham et al. |

(Continued)

FOREIGN PATENT DOCUMENTS

| WO | 2016049320 A1 | 3/2016 |
| WO | WO 2016/049320 A1 * | 3/2016 |
| WO | 2017046242 A1 | 3/2017 |

OTHER PUBLICATIONS

International Search Report and Written Opinion for International Application No. PCT/US2017/041888 dated Sep. 28, 2017, 21 pages.

*Primary Examiner* — Xiao En Mo
(74) *Attorney, Agent, or Firm* — RMCK Law Group PLC

(57) ABSTRACT

An evaporative emissions control system configured for use with a vehicle fuel tank includes a purge canister, an accelerometer, first and second vent tubes that terminate at first and second vent openings, a first vent valve, a second vent valve, a vent shut-off assembly and a control module. The accelerometer senses acceleration in an x, y and z axis. The first vent valve is fluidly coupled to the first vent tube. The second vent valve is fluidly coupled to the second vent tube. The vent shutoff assembly selectively opens and closes the first and second valves. The control module estimates a location of liquid fuel based on the sensed acceleration from the accelerometer and determines which vent opening is one of submerged and about to be submerged based on the estimated location of the liquid fuel. The control module closes the vent valve associated with the determined vent opening.

19 Claims, 51 Drawing Sheets

Related U.S. Application Data

(60) Provisional application No. 62/365,453, filed on Jul. 22, 2016.

(52) U.S. Cl.
CPC ............... *B60K 2015/03514* (2013.01); *F02D 2200/06* (2013.01); *F02D 2200/50* (2013.01); *F02M 2025/0863* (2013.01)

(58) Field of Classification Search
CPC .. F02M 2025/0863; B60K 2015/03514; B60K 2015/0348; B60K 2015/0358; B60K 15/03504
See application file for complete search history.

(56) References Cited

U.S. PATENT DOCUMENTS

| | | |
|---|---|---|
| 2015/0019066 A1 | 1/2015 | Dudar et al. |
| 2015/0083088 A1 | 3/2015 | Pearce et al. |

* cited by examiner

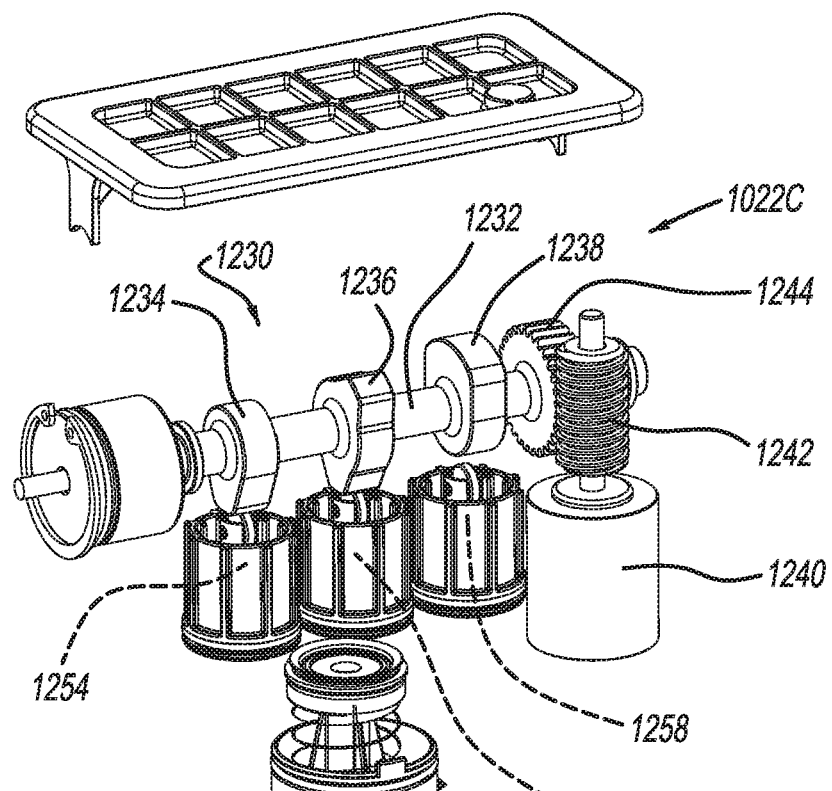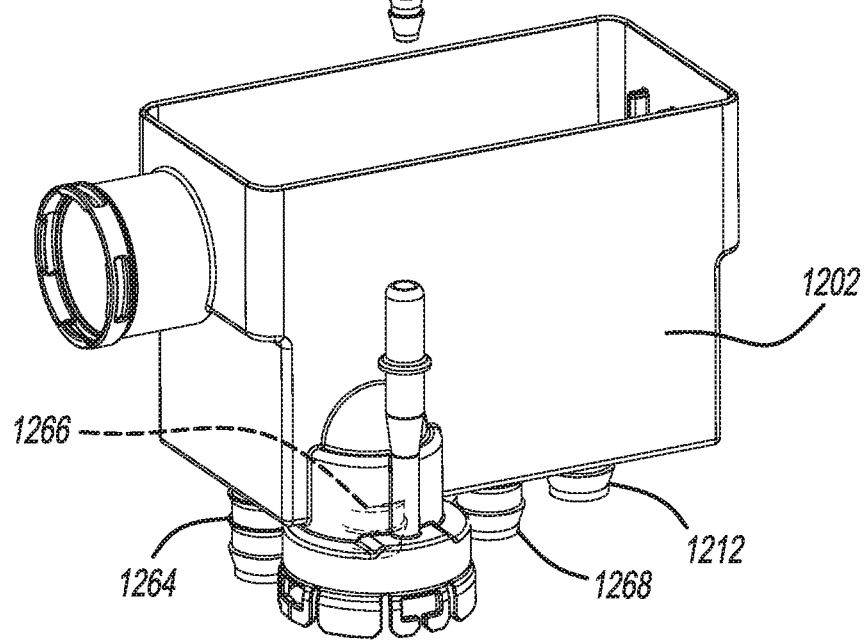
FIG. 13

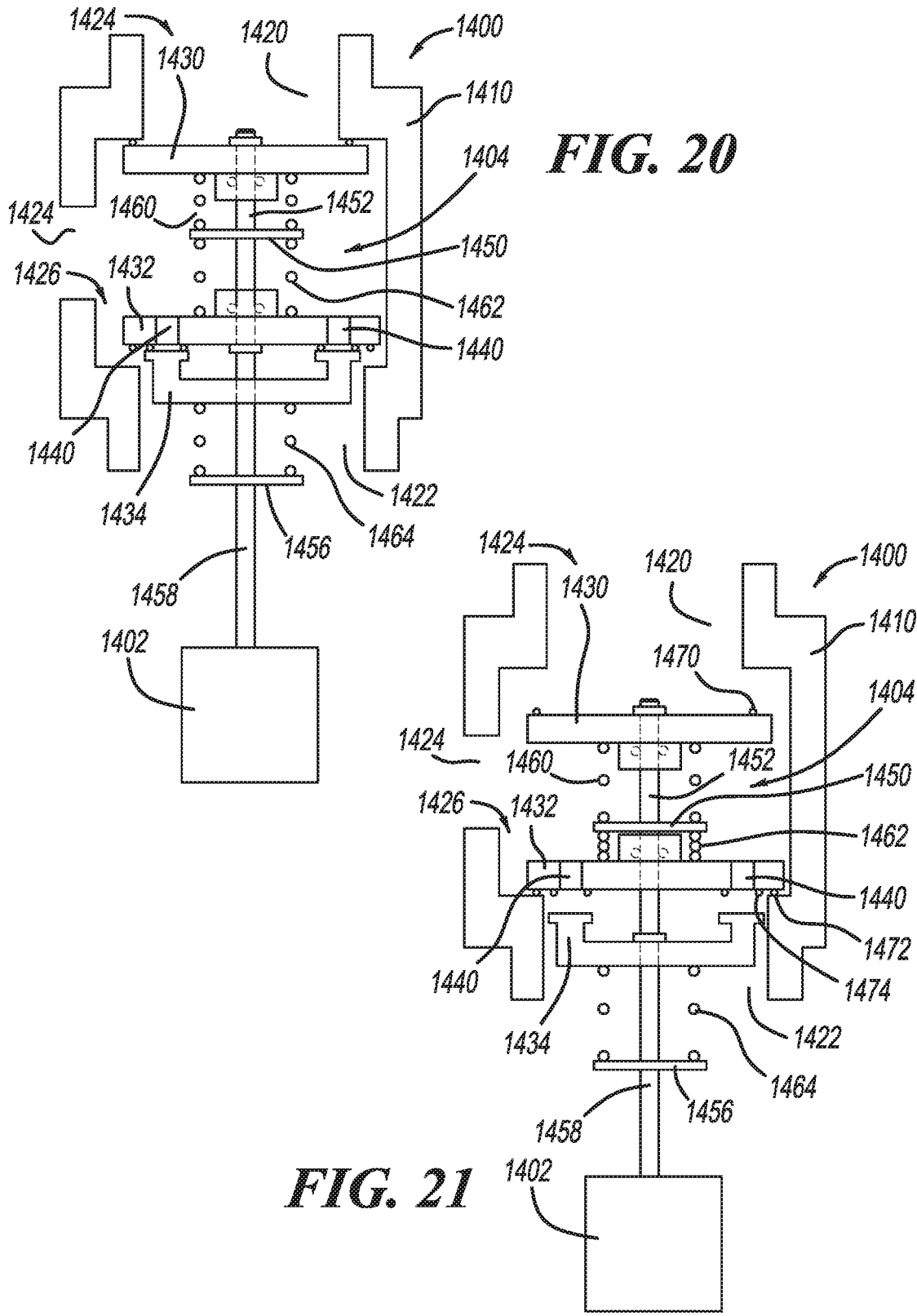

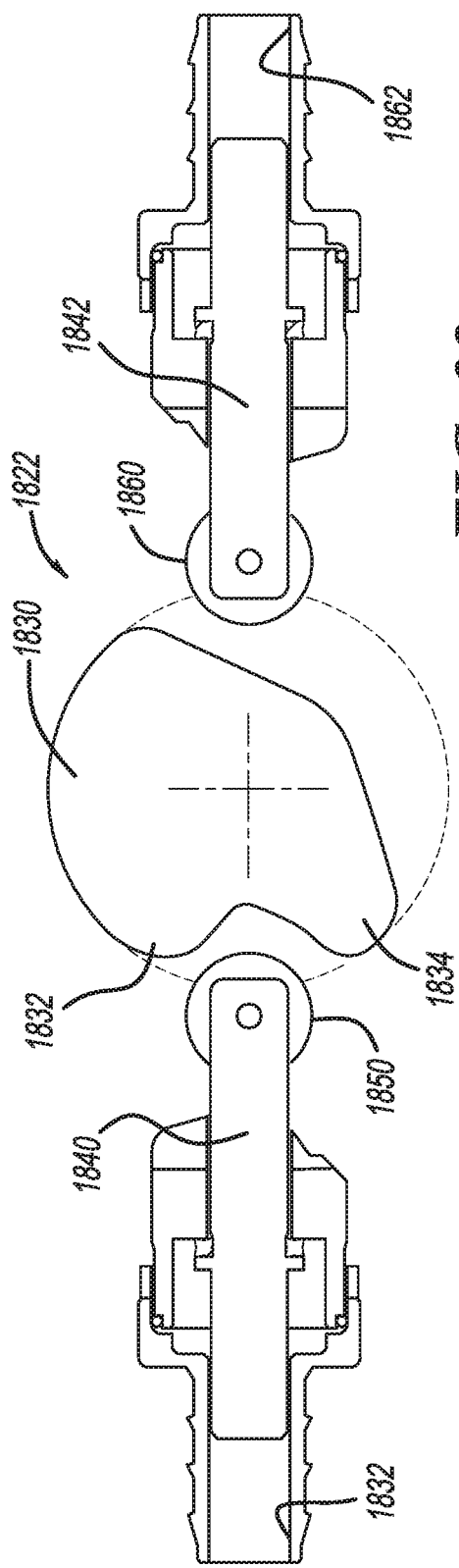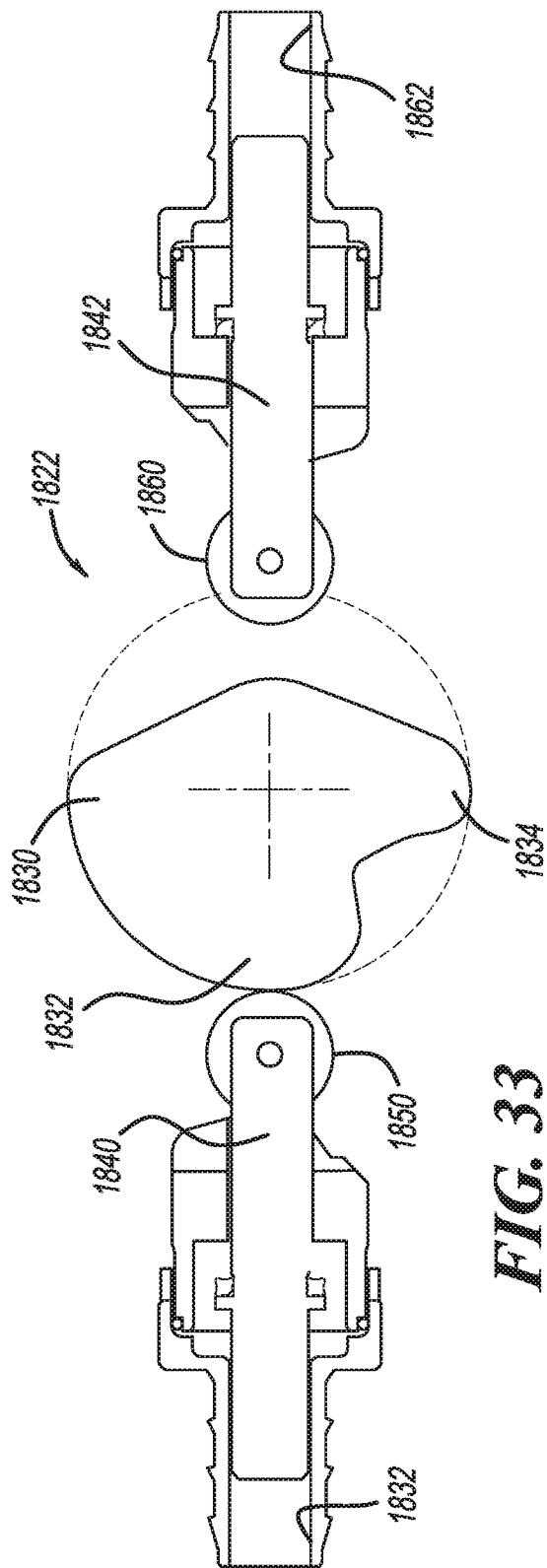

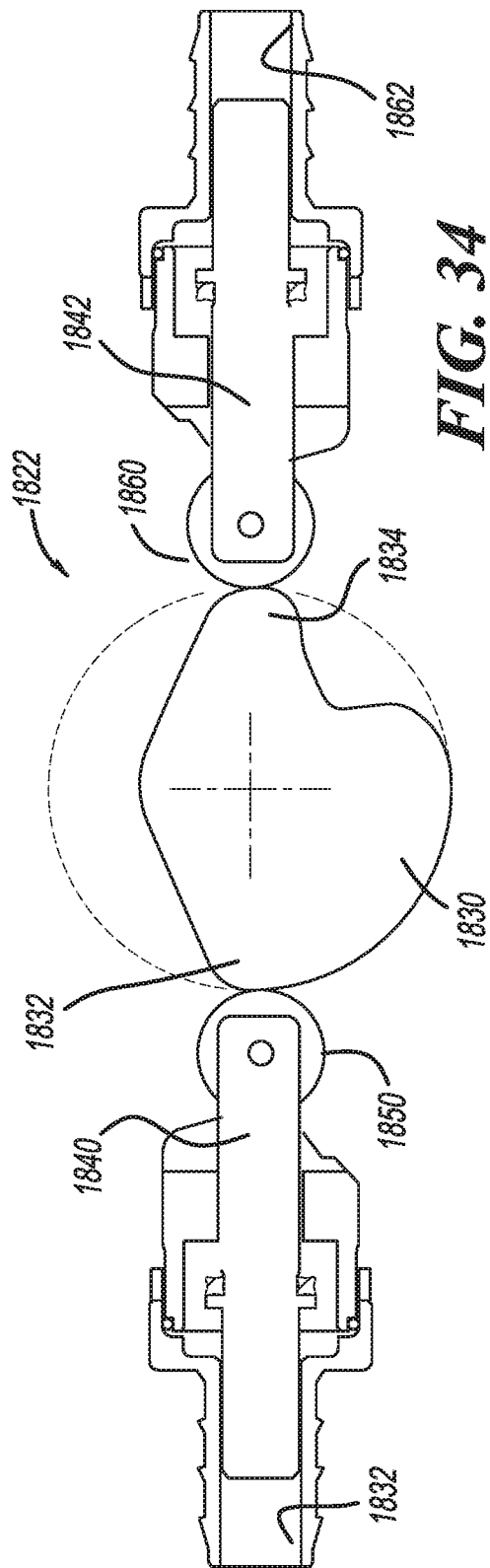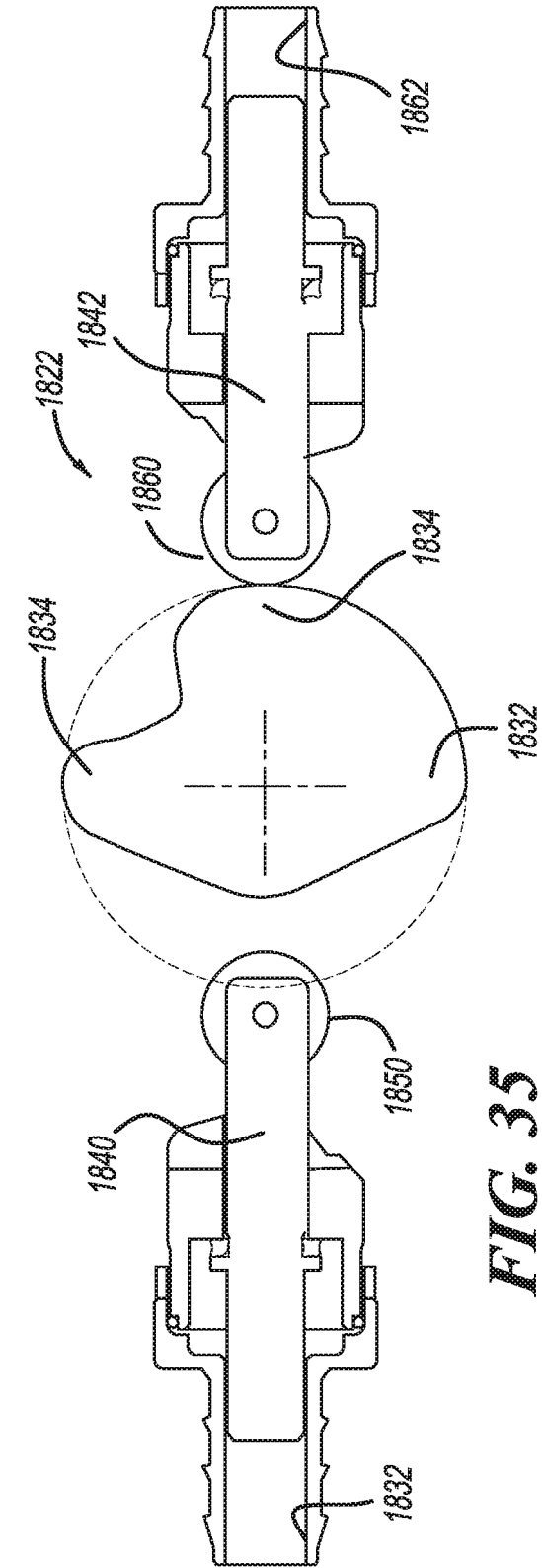

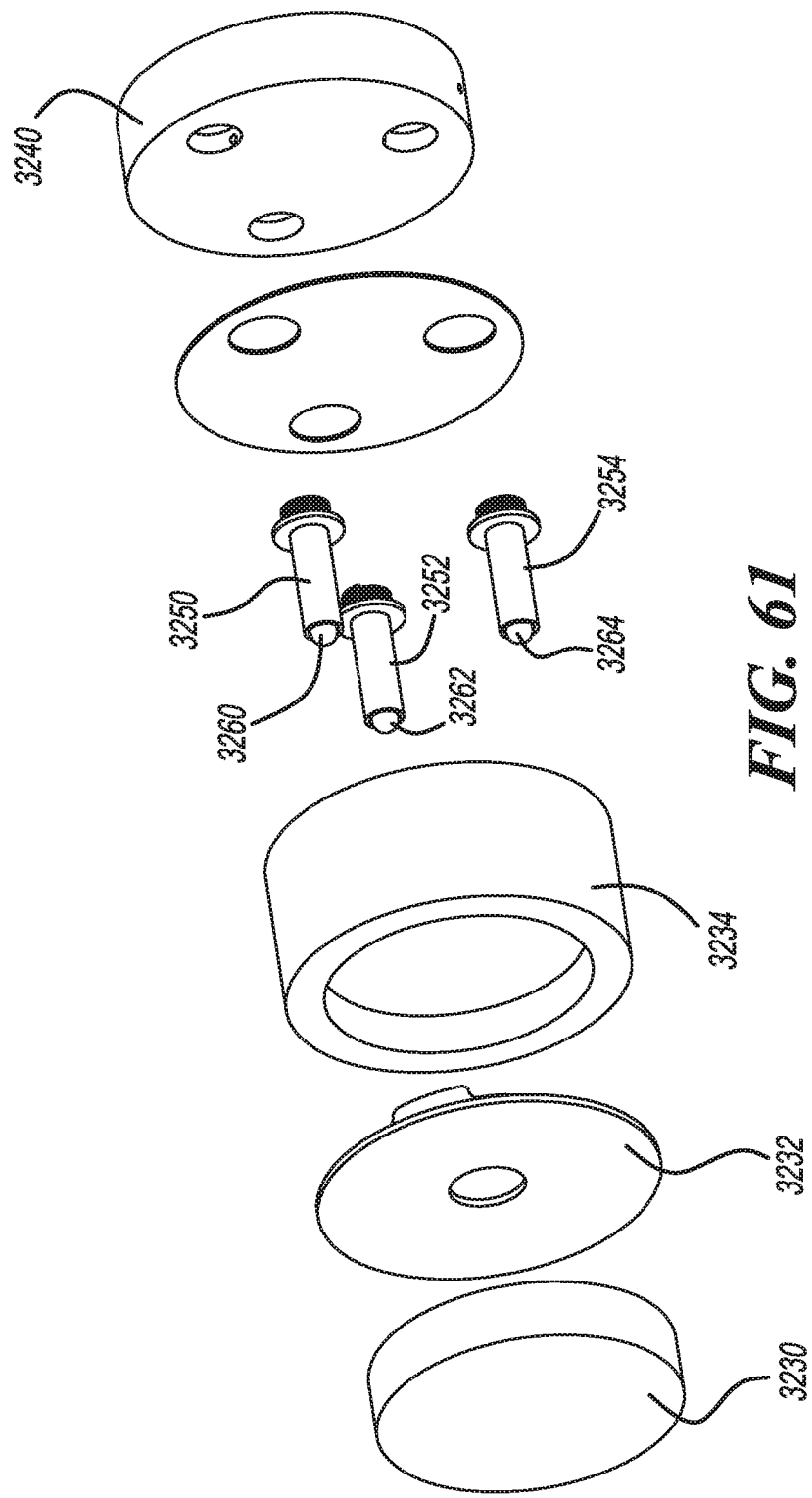

| Accel_X | Accel_Y | Accel_Z | VentA | VentB | Acceleration | Turn |
|---|---|---|---|---|---|---|
| 0 | 0 | 0 | 0 | 1 | Braking/ Reverse Acceleration | Right Turn |
| 0 | 1 | 0 | 0 | 1 | Braking/ Reverse Acceleration | Straight |
| 0 | 2 | 0 | 0 | 0.5 (PWM) | Braking/ Reverse Acceleration | Left Turn |
| 1 | 0 | 0 | 0 | 1 | Almost Constant Speed | Right Turn |
| 1 | 1 | 0 | 1 | 1 | Almost Constant Speed | Straight |
| 1 | 2 | 0 | 1 | 0 | Almost Constant Speed | Left Turn |
| 2 | 0 | 0 | 0.5 (PWM) | 0 | Accelerating/ Reverse Braking | Right Turn |
| 2 | 1 | 0 | 1 | 0 | Accelerating/ Reverse Braking | Straight |
| 2 | 2 | 0 | 1 | 0 | Accelerating/ Reverse Braking | Left Turn |

ELECTRONIC EVAPORATIVE EMISSIONS MANAGEMENT SYSTEM

CROSS-REFERENCE TO RELATED APPLICATIONS

This application is a continuation of International Application No. PCT/US2017/041888 filed Jul. 13, 2017 which claims the benefit of Indian Patent Application Nos. 201611024383 filed on Jul. 15, 2016; and 201711024902 filed on Jul. 13, 2017. This application also claims the benefit of U.S. Provisional Patent Application No. 62/365,453 filed on Jul. 22, 2016. This application also claims the benefit of Indian Patent Application No. 201711017947 filed on May 22, 2017. The disclosures of the above applications are incorporated herein by reference.

FIELD

The present disclosure relates generally to fuel tanks on passenger vehicles and more particularly to a fuel tank having an electronically controlled module that manages the complete evaporative system for the vehicle.

BACKGROUND

Fuel vapor emission control systems are becoming increasingly more complex, in large part in order to comply with environmental and safety regulations imposed on manufacturers of gasoline powered vehicles. Along with the ensuing overall system complexity, complexity of individual components within the system has also increased. Certain regulations affecting the gasoline-powered vehicle industry require that fuel vapor emission from a fuel tank's ventilation system be stored during periods of an engine's operation. In order for the overall vapor emission control system to continue to function for its intended purpose, periodic purging of stored hydrocarbon vapors is necessary during operation of the vehicle.

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

An evaporative emissions control system configured to recapture and recycle emitted fuel vapor in a vehicle fuel tank having liquid fuel includes a purge canister, a three axis accelerometer, a first vent tube, a second vent tube, a first vent valve, a second vent valve, a vent shut-off assembly and a control module. The purge canister is adapted to collect fuel vapor emitted by the fuel tank and subsequently release the fuel vapor to an engine. The accelerometer senses acceleration in an x, y and z axis. The first vent tube is disposed in the fuel tank and terminates at a first vent opening. The second vent tube is disposed in the fuel tank and terminates at a second vent opening. The first vent valve is fluidly coupled to the first vent tube and is configured to selectively open and close a first port that connects the first vent valve to the first vent tube. The second vent valve is fluidly coupled to the second vent tube and is configured to selectively open and close a second port that connects the second vent valve to the second vent tube. The vent shut-off assembly selectively opens and closes the first and second valves to provide overpressure and vacuum relief for the fuel tank. The control module regulates operation of the vent shut-off assembly based on operating conditions. The control module estimates a location of liquid fuel based on the sensed acceleration from the accelerometer. The control module determines which vent opening of the first and second vent openings is one of submerged and about to be submerged based on the estimated location of the liquid fuel. The control module closes the vent valve associated with the determined vent opening.

According to other features, the control module compares a first acceleration measured in a first direction by the accelerometer with a threshold acceleration and closes one of the first and second valves based on the comparison. The threshold acceleration corresponds to a sensed acceleration in the x, y and z axes. The control module closes one of the first and second valves by way of pulse width modulation. The threshold acceleration is dependent upon a fuel level of liquid fuel in the fuel tank. The evaporative emissions control system can further comprise a liquid trap configured to drain liquid fuel back to the fuel tank. The threshold acceleration is further dependent upon at least one of (i) pressure within the fuel tank, and (ii) amount of liquid fuel in the liquid trap. The control module can modify the threshold acceleration based upon historic performance of the evaporative emissions control system.

In other features, the control module estimates a fuel level top surface based on the sensed acceleration. The control module approximates a tangential surface of the fuel. The control module determines a volume of fuel in the fuel tank. The control module corrects the tangential surface of the fuel based on the determined volume of fuel. The control module determines which vent opening associated with the first and second vent valves is one of submerged and about to be submerged based on a comparison of a respective location of the first and second vent valve openings and the tangential surface of the fuel.

An evaporative emissions control system according to another example of the present disclosure is configured to recapture and recycle emitted fuel vapor in a vehicle fuel tank having liquid fuel includes a purge canister, a first vent tube, a second vent tube, a first vent valve, a second vent valve, a vent shut-off assembly and a controller. The purge canister is adapted to collect fuel vapor emitted by the fuel tank and subsequently release the fuel vapor to an engine. The first vent tube is disposed in the fuel tank and terminates at a first vent opening. The second vent tube is disposed in the fuel tank and terminates at a second vent opening. The first vent valve is fluidly coupled to the first vent tube and is configured to selectively open and close a first port that connects the first vent valve to the first vent tube. The second vent valve is fluidly coupled to the second vent tube and is configured to selectively open and close a second port that connects the second vent valve to the second vent tube. The vent shut-off assembly selectively opens and closes the first and second valves to provide overpressure and vacuum relief for the fuel tank. The controller determines whether a refueling event is occurring and operates the vent shut-off assembly based on the refueling event.

In other features, the controller determines whether a refueling event is occurring based upon (i) the vehicle being in park, (ii) fuel level increasing, and (iii) pressure increase within the fuel tank. The first and second valves can be opened and closed using pulse width modulation.

An evaporative emissions control system according to another example of the present disclosure is configured to recapture and recycle emitted fuel vapor in a vehicle fuel tank having liquid fuel includes a purge canister, a first vent tube, a second vent tube, a first vent valve, a second vent valve, a vent shut-off assembly and a controller. The purge canister is adapted to collect fuel vapor emitted by the fuel tank and subsequently release the fuel vapor to an engine. The first vent tube is disposed in the fuel tank and terminates at a first vent opening. The second vent tube is disposed in the fuel tank and terminates at a second vent opening. The first vent valve is fluidly coupled to the first vent tube and is configured to selectively open and close a first port that connects the first vent valve to the first vent tube. The second vent valve is fluidly coupled to the second vent tube and is configured to selectively open and close a second port that connects the second vent valve to the second vent tube. The vent shut-off assembly selectively opens and closes the first and second valves to provide overpressure and vacuum relief for the fuel tank. The controller determines whether a refueling event is occurring. The controller determines whether a subsequent fill level is reached and closes the first and second valves based upon the subsequent fill level being reached.

In additional features, the controller implements a profile to allow for a predetermined about of subsequent fill levels being reached. The first and second valves can be opened and closed using pulse width modulation.

BRIEF DESCRIPTION OF THE DRAWINGS

The present disclosure will become more fully understood from the detailed description and the accompanying drawings, wherein:

FIG. 13 is an exploded view of the vent shut-off assembly of FIG. 10;

FIG. 20 is a sectional view of the vent shut-off assembly of FIG. 18 and shown with the valve member assembly in a third position wherein the first inlet is closed and the second inlet is open;

FIG. 21 is a sectional view of the vent shut-off assembly of FIG. 18 and shown with the valve member assembly in a fourth position wherein the first and second inlets are open;

FIG. 32 is a sectional view of a vent shut-off assembly constructed in accordance to another example of the present disclosure and shown in a first venting state where first and second poppet valves are closed;

FIG. 33 is a sectional view of the vent shut-off assembly of FIG. 32 and shown with the first poppet valve open and the second poppet valve closed;

FIG. 34 is a sectional view of the vent shut-off assembly of FIG. 32 and shown with the first and second poppet valves open;

FIG. 35 is a sectional view of the vent shut-off assembly of FIG. 32 and shown with the first poppet valve closed and the second poppet valve open;

FIG. 61 is an exploded view of the vent shut-off assembly of FIG. 60;

FIG. 72 is a second vent closing lookup table according to an example of the present disclosure.

DETAILED DESCRIPTION

Figure 1:
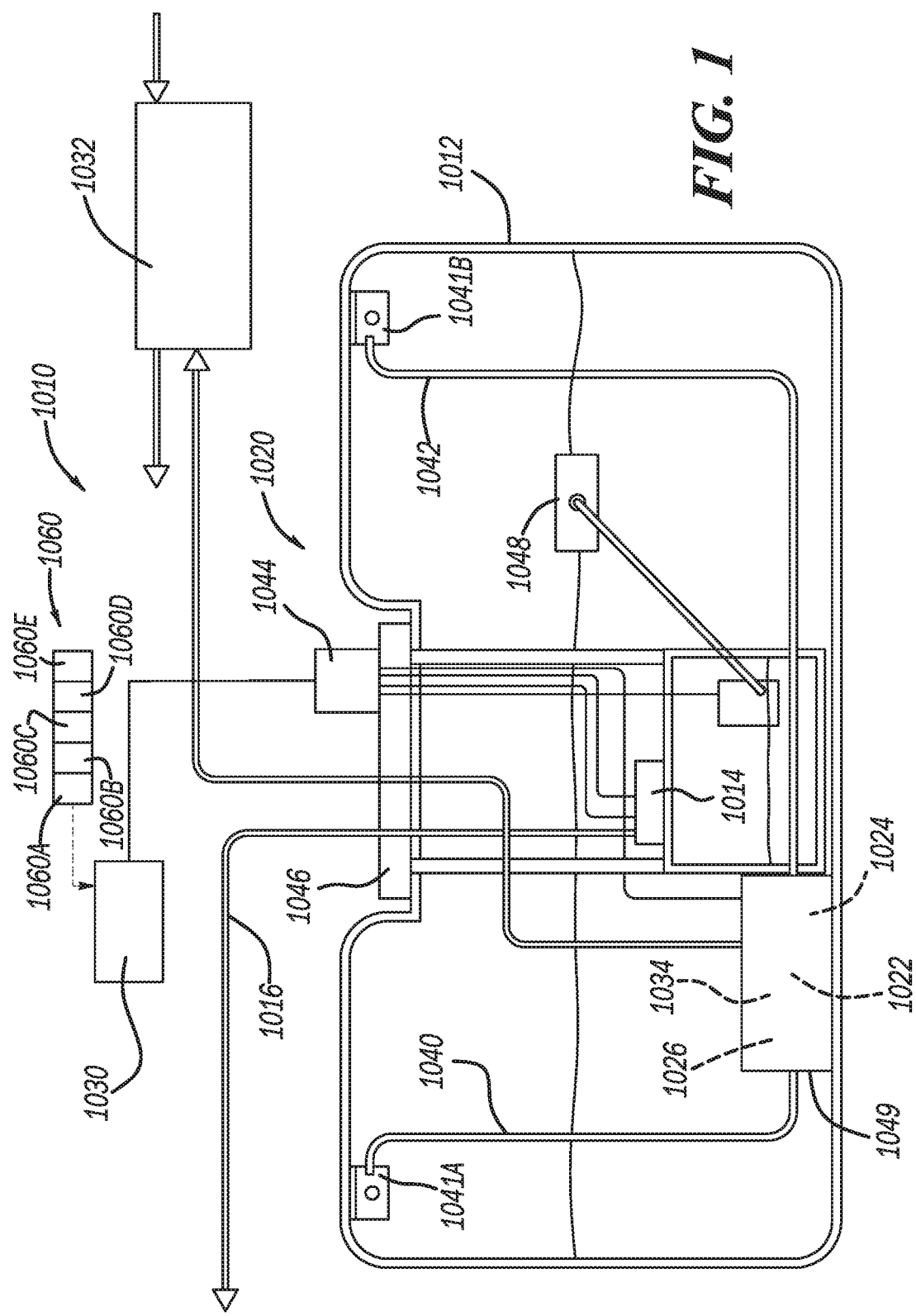
FIG. 1 is a schematic illustration of a fuel tank system having an evaporative emissions control system including a vent shut-off assembly, a controller, an electrical connector and associated wiring in accordance to one example of the present disclosure.

Turning now to FIG. 1, a fuel tank system constructed in accordance to one example of the present disclosure is shown and generally identified at reference number 1010. The fuel tank system 1010 can generally include a fuel tank 1012 configured as a reservoir for holding fuel to be supplied to an internal combustion engine via a fuel delivery system, which includes a fuel pump 1014. The fuel pump 1014 can be configured to deliver fuel through a fuel supply line 1016 to a vehicle engine. An evaporative emissions control system 1020 can be configured to recapture and recycle the emitted fuel vapor. As will become appreciated from the following discussion, the evaporative emissions control system 1020 provides an electronically controlled module that manages the complete evaporative system for a vehicle.

The evaporative control system 1020 provides a universal design for all regions and all fuels. In this regard, the requirement of unique components needed to satisfy regional regulations may be avoided. Instead, software may be adjusted to satisfy wide ranging applications. In this regard, no unique components need to be revalidated saving time and cost. A common architecture may be used across vehicle lines. Conventional mechanical in-tank valves may be replaced. As discussed herein, the evaporative control system 1020 may also be compatible with pressurized systems including those associated with hybrid powertrain vehicles.

The evaporative emissions control system 1020 includes a vent shut-off assembly 1022, a manifold assembly 1024, a liquid trap 1026, a control module 1030, a purge canister 1032, an energy storage device 1034, a first vapor tube 1040, a second vapor tube 1042, an electrical connector 1044, a fuel delivery module (FDM) flange 1046 and a float level sensor assembly 1048. The first vapor tube 1040 can terminate at a vent opening 1041A that may include a baffle arranged at a top corner of the fuel tank 1012. Similarly, the second vapor tube 1042 can terminate at a vent opening 1041B that may include a baffle arranged at a top corner of the fuel tank 1012.

In one example, the manifold assembly 1024 can include a manifold body 1049 (FIG. 3) that routes venting to an appropriate vent tube 1040 and 1042 (or other vent tubes) based on operating conditions. As will become appreciated from the following discussion, the vent shut-off assembly 1022 can take many forms such as electrical systems including solenoids and mechanical systems including DC motor actuated cam systems.

Figure 2:
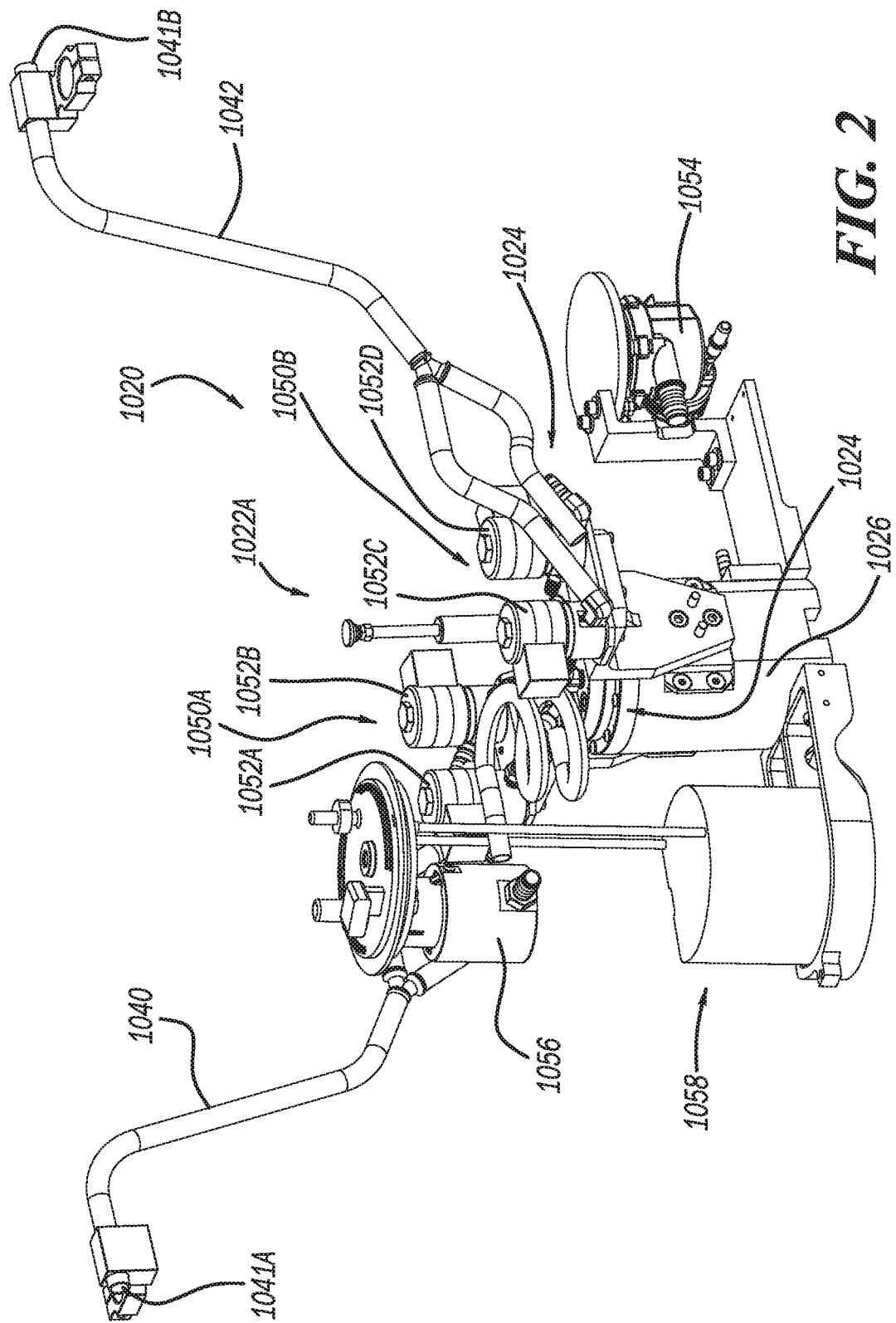
FIG. 2 is a front perspective view of an evaporative emissions control system including a vent shut-off assembly configured with solenoids according to one example of the present disclosure.
Figure 3:
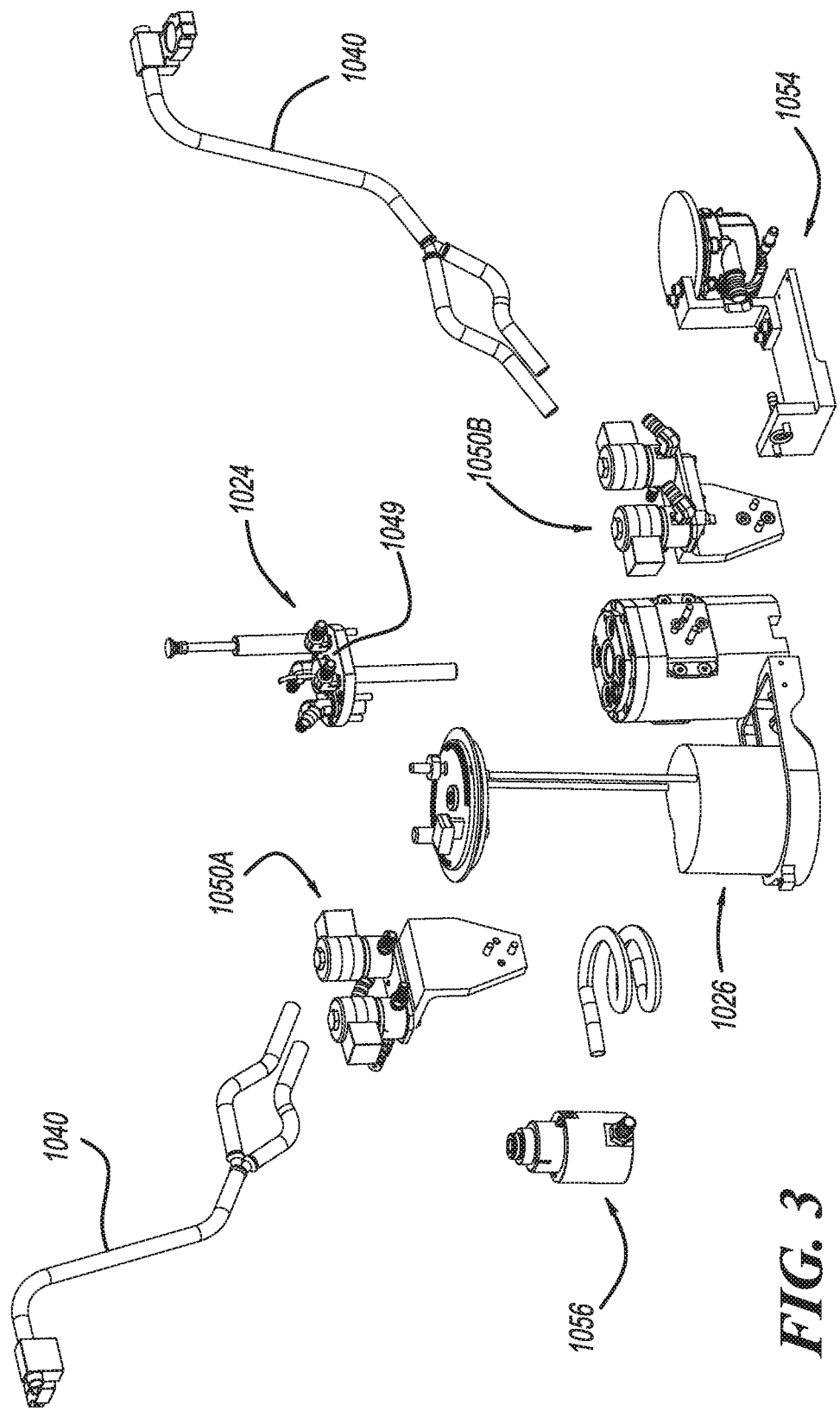
FIG. 3 is an exploded view of the evaporative emissions control system of FIG. 2.

Turning now to FIGS. 2 and 3, a vent shut-off assembly 1022A constructed in accordance to one example of the present disclosure is shown. As can be appreciated, the vent shut-off assembly 1022A can be used as part of an evaporative emissions control system 1020 in the fuel tank system 1010 described above with respect to FIG. 1. The vent shut-off assembly 1022A includes two pair of solenoid banks 1050A and 1050B. The first solenoid bank 1050A includes first and second solenoids 1052A and 1052B. The second solenoid bank 1050B includes third and fourth solenoids 1052C and 1052D.

The first and second solenoids (solenoid valves) 1052A and 1052B can be fluidly connected to the vapor tube 1040. The third and fourth solenoids (solenoid valves) 1052C and 1052D can be fluidly connected to the vapor tube 1042. The control module 1030 can be adapted to regulate the operation of the first, second, third and fourth solenoids 1052A, 1052B, 1052C and 1052D to selectively open and close pathways in the manifold assembly 1024, in order to provide over-pressure and vacuum relief for the fuel tank 1012. The evaporative emissions control assembly 1020 can additionally comprise a pump 1054, such as a venturi pump and a safety rollover valve 1056. A conventional sending unit 1058 is also shown.

The control module 1030 can further include or receive inputs from system sensors, collectively referred to at reference 1060. The system sensors 1060 can include a tank pressure sensor 1060A that senses a pressure of the fuel tank 1012, a canister pressure sensor 1060B that senses a pressure of the canister 1032, a temperature sensor 1060C that senses a temperature within the fuel tank 1012, a vehicle grade sensor 1060D that senses a grade of the vehicle and a three axis accelerometer 1060E that senses acceleration in an x, y and z axis. It will be appreciated that while the system sensors 1060 are shown as a group, that they may be located all around the fuel tank system 1010.

The control module 1030 can additionally include fill level signal reading processing, fuel pressure driver module functionality and be compatible for two-way communications with a vehicle electronic control module (not specifically shown). The vent shut-off assembly 1022 and manifold assembly 1024 can be configured to control a flow of fuel vapor between the fuel tank 1012 and the purge canister 1032. The purge canister 1032 adapted to collect fuel vapor emitted by the fuel tank 1012 and to subsequently release the fuel vapor to the engine. The control module 1030 can also be configured to regulate the operation of evaporative emissions control system 1020 in order to recapture and recycle the emitted fuel vapor. The fuel level sensor 1048 can provide fill level indications of the fuel tank 1012 to the control module 1030.

When the evaporative emissions control system 1020 is configured with the vent shut-off assembly 1022A, the control module 1030 can close individual solenoids 1052A-1052D or any combination of solenoids 1052A-1052D to vent the fuel tank system 1010. For example, the solenoid 1052A can be actuated to close the vent 1040 when the float level sensor assembly 1048 provides a signal indicative of a full fuel level state. While the control module 1030 is shown in the figures generally remotely located relative to the solenoid banks 1050A and 1050B, the control module 1030 may be located elsewhere in the evaporative emissions control system 1020 such as adjacent the canister 1032 for example.

With continued reference to FIGS. 1-3, additional features of the evaporative emissions control system 1020 will be described. In one configuration, the vent tubes 1040 and 1042 can be secured to the fuel tank 1012 with clips. The inner diameter of the vent tubes 1040 and 1042 can be 3-4 mm. The vent tubes 1040 and 1042 can be routed to high points of the fuel tank 1012. In other examples, external lines and tubes may additionally or alternatively be utilized. In such examples, the external lines are connected through the tank wall using suitable connectors such as, but not limited to, welded nipple and push-through connectors.

As identified above, the evaporative emissions control system 1020 can replace conventional fuel tank systems that require mechanical components including in-tank valves with an electronically controlled module that manages the complete evaporative system for a vehicle. In this regard, some components that may be eliminated using the evaporative emissions control system 1020 of the instant disclosure can include in-tank valves such as GVV's and FLVV's, canister vent valve solenoid and associated wiring, tank pressure sensors and associated wiring, fuel pump driver module and associated wiring, fuel pump module electrical connector and associated wiring, and vapor management valve(s) (system dependent). These eliminated components are replaced by the control module 1030, vent shut-off assembly 1022, manifold 1024, solenoid banks 1050A, 1050B and associated electrical connector 1044. Various other components may be modified to accommodate the evaporative emissions control system 1020 including the fuel tank 1012. For example, the fuel tank 1012 may be modified to eliminate valves and internal lines to pick-up points. The flange of the FDM 1046 may be modified to accommodate other components such as the control module 1030 and/or the electrical connector 1044. In other configurations, the fresh air line of the canister 1032 and a dust box may be modified. In one example, the fresh air line of the canister 1032 and the dust box may be connected to the control module 1030.

Figure 4:
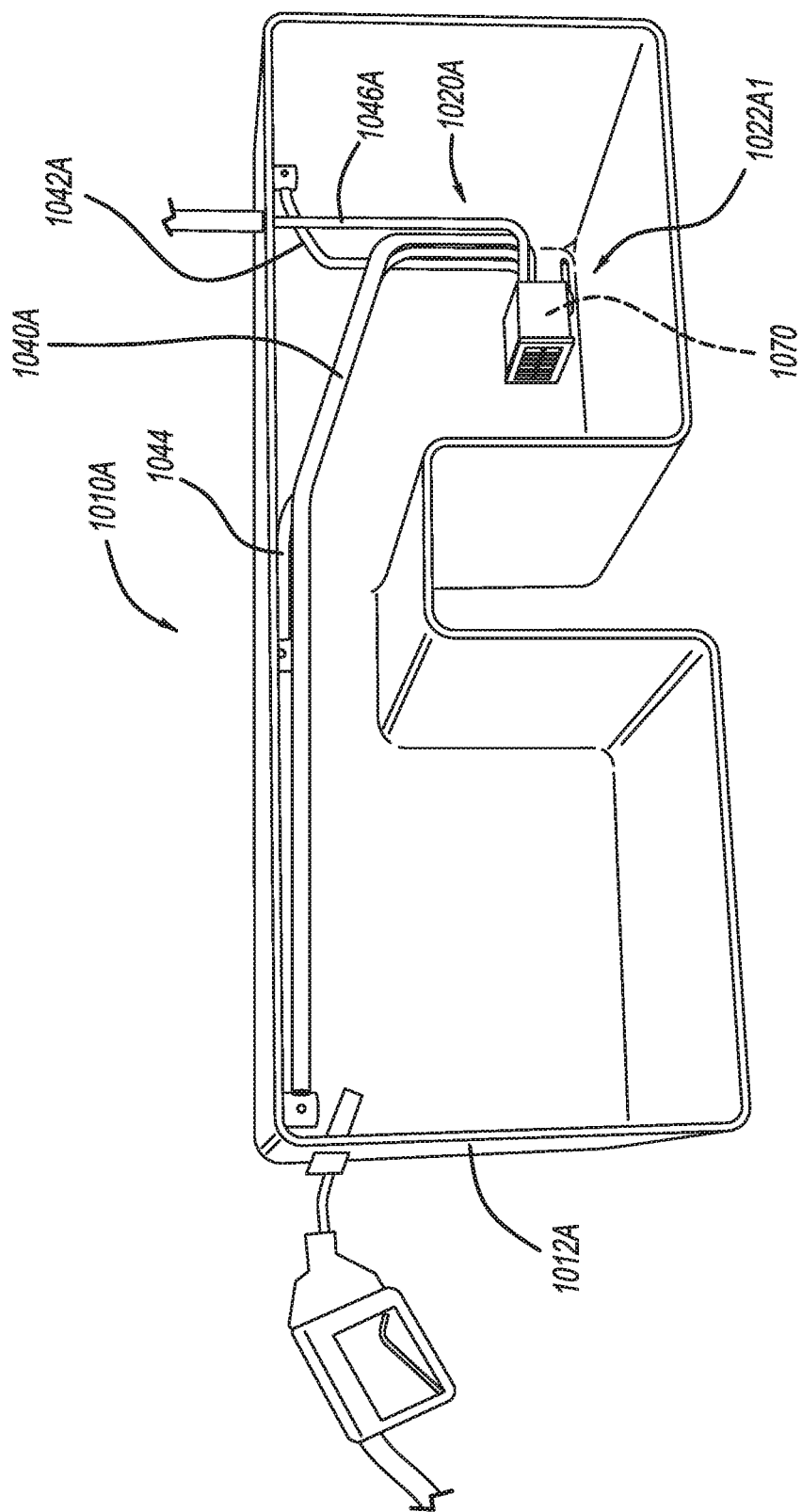
FIG. 4 is a perspective view of a fuel tank system having a vent shut-off assembly and configured for use on a saddle fuel tank according to another example of the present disclosure and shown with the fuel tank in section view.
Figure 5:
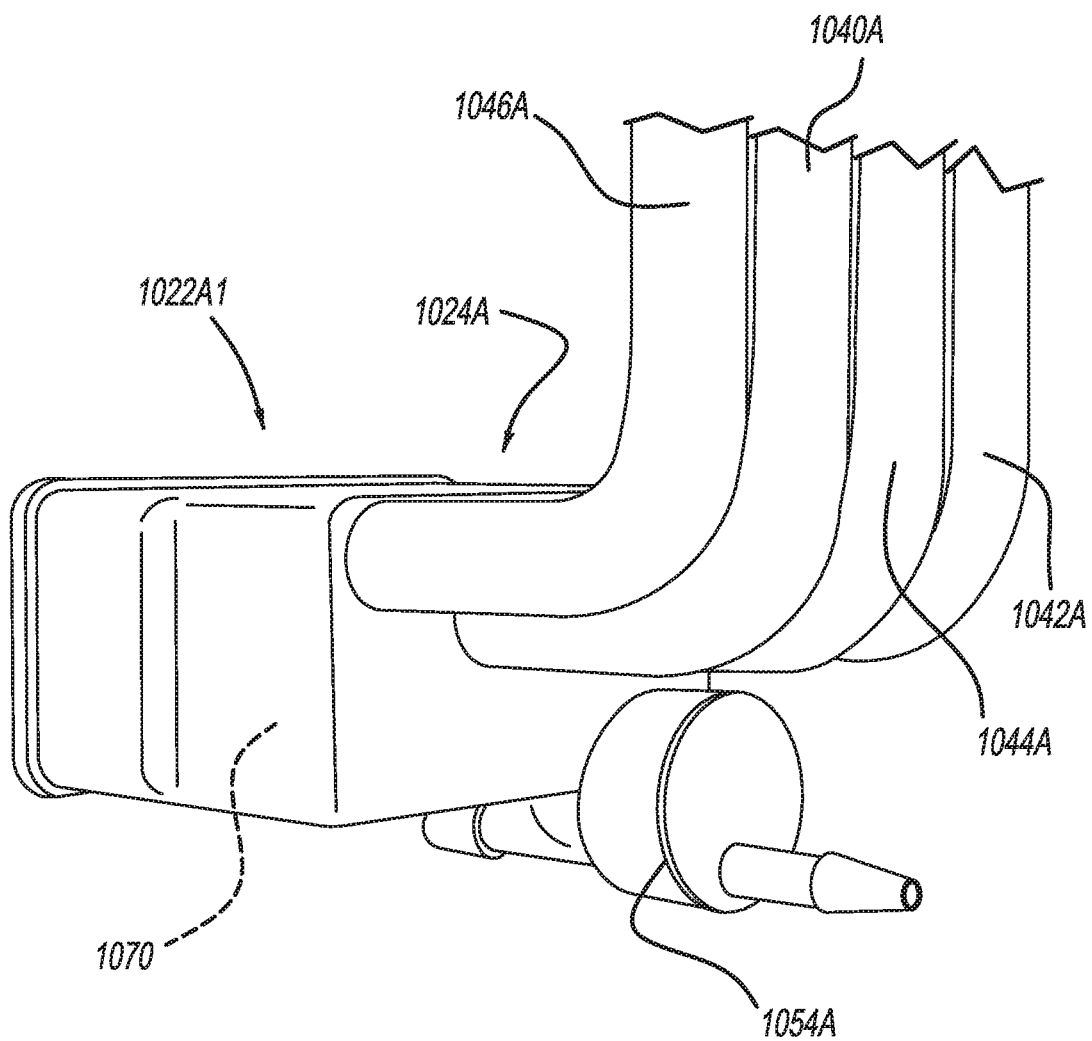
FIG. 5 is a perspective view of the vent shut-off assembly of the fuel tank system of FIG. 4.

Turning now to FIGS. 4 and 5, a fuel tank system 1010A constructed in accordance with another example of the present disclosure will be described. Unless otherwise described, the fuel tank system 1010A can include an evaporative emissions control system 1020A that incorporate features described above with respect to the fuel tank system 1010. The fuel tank system 1010A is incorporated on a saddle type fuel tank 1012A. A vent shut-off assembly 1022A1 can include a single actuator 1070 that communicates with a manifold 1024A to control opening and closing of three or more vent point inlets. In the example shown, the manifold assembly 1024A routs to a first vent 1040A, a second vent line 1042A and a third vent line 1044A. A vent 1046A routs to the canister (see canister 1032, FIG. 1). A liquid trap 1052A and a drain 1054A are incorporated on the manifold assembly 1024A. The fuel tank system 1010A can perform fuel tank isolation for high pressure hybrid applications without requiring a fuel tank isolation valve (FTIV). Further, the evaporative emissions control system 1020A can achieve the highest possible shut-off at the vent points. The system is not inhibited by conventional mechanical valve shut-off or reopening configurations. Vapor space and overall tank height may be reduced.

Figure 6:
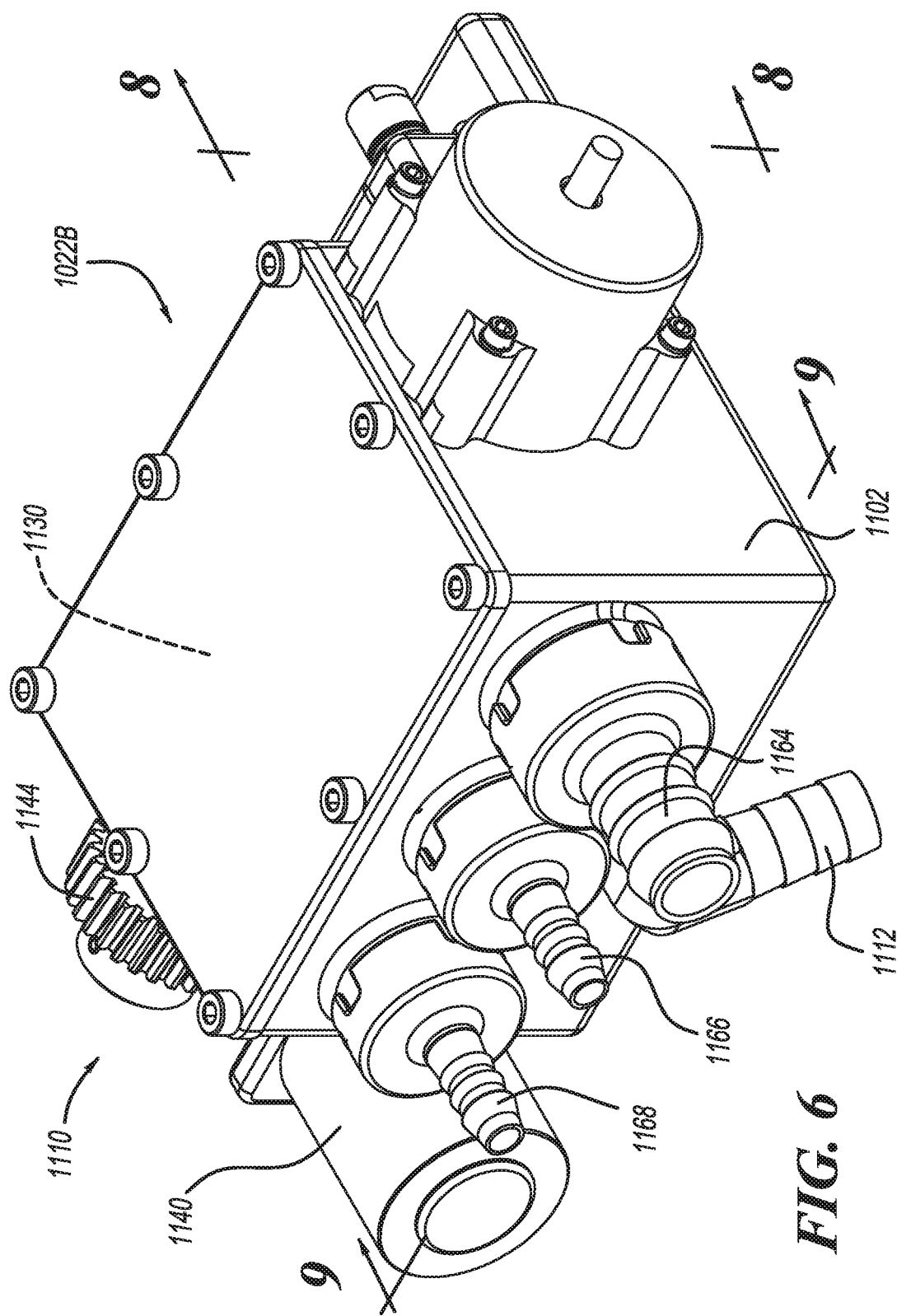
FIG. 6 is a top perspective view of a vent shut-off assembly constructed in accordance to additional features of the present disclosure.
Figure 7:
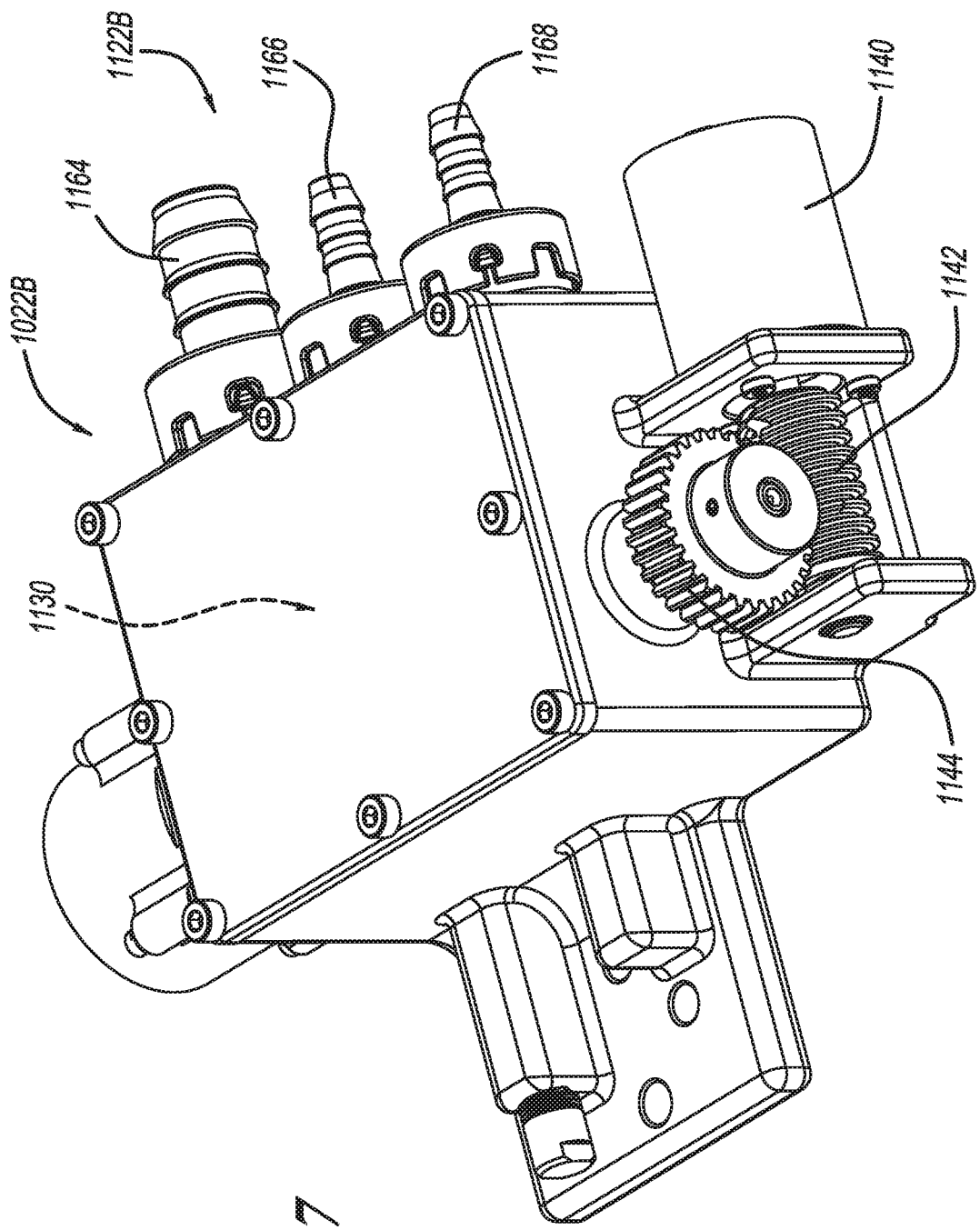
FIG. 7 is a bottom perspective view of the vent shut-off assembly of FIG. 6.

Turning now to FIGS. 6-7, a vent shut-off assembly 1022B constructed in accordance to another example of the present disclosure will be described. The vent shut-off assembly 1022B includes a main housing 1102 that at least partially houses an actuator assembly 1110. A canister vent line 1112 routs to the canister (see canister 1032, FIG. 1). The actuator assembly 1110 can generally be used in place of the solenoids described above to open and close selected vent lines. The vent shut-off assembly 1022B includes a cam assembly 1130. The cam assembly 1130 includes a cam shaft 1132 that includes cams 1134, 1136 and 1138. The cam shaft 1132 is rotatably driven by a motor 1140. In the example shown the motor 1140 is a direct current motor that rotates a worm gear 1142 that in turn drives a drive gear 1144. The motor 1140 is mounted outboard of the main housing 1102. Other configurations are contemplated. The cams 1134, 1136 and 1138 rotate to open and close valves 1154, 1156 and 1158, respectively. The valves 1154, 1156 and 1158 open and close to selectively deliver vapor through ports 1164, 1166 and 1168, respectively. In one example the motor 1140 can alternately be a stepper motor. In other configurations, a dedicated DC motor may be used for each valve. Each DC motor may have a home function. The DC motors can include a stepper motor, a bi-directional motor, a uni-directional motor a brushed motor and a brushless motor. The home function can include a hard stop, electrical or software implementation, trip switches, hard stop (cam shaft), a potentiometer and a rheostat.

In one configuration the ports 1164 and 1166 can be routed to the front and back of the fuel tank 1012. The port 1164 can be configured solely as a refueling port. In operation, if the vehicle is parked on a grade where the port 1166 is routed to a low position in the fuel tank 1012, the cam 1136 is rotated to a position to close the port 1164. During refueling, the valve 1154 associated with port 1164 is opened by the cam 1134. Once the fuel level sensor 1048 reaches a predetermined level corresponding to a "Fill" position, the controller 1030 will close the valve 1154. In other configurations, the cam 1134, valve 1154 and port 1162 can be eliminated leaving two cams 1136 and 1138 that open and close valves 1156 and 1158. In such an example, the two ports 1164 and 1166 can be 7.5 mm orifices. If both ports 1164 and 1166 are open, refueling can occur. If less flow is required, a cam position can be attained where one of the valves 1156 and 1158 are not opened all the way.

Turning now to FIGS. 10-13, a vent shut-off assembly 1022C constructed in accordance to another example of the present disclosure will be described. The vent shut-off assembly 1022C includes a main housing 1202 that at least partially houses an actuator assembly 1210. A canister vent line 1212 routs to the canister (see canister 1032, FIG. 1). The actuator assembly 1210 can generally be used in place of the solenoids described above to open and close selected vent lines. The vent shut-off assembly 1022C includes a cam assembly 1230. The cam assembly 1230 includes a cam shaft 1232 that includes cams 1234, 1236 and 1238. The cam shaft 1232 is rotatably driven by a motor 1240. In the example shown the motor 1240 is received in the housing 1202. The motor 1240 is a direct current motor that rotates a worm gear 1242 that in turn drives a drive gear 1244. Other configurations are contemplated. The cams 1234, 1236 and 1238 rotate to open and close valves 1254, 1256 and 1258, respectively. The valves 1254, 1256 and 1258 open and close to selectively deliver vapor through ports 1264, 1266 and 1268, respectively. In one example the motor 1240 can alternately be a stepper motor. A drain 1270 can be provided on the housing 1202.

In one configuration the ports 1264 and 1266 can be routed to the front and back of the fuel tank 1012. The port 1264 can be configured solely as a refueling port. In operation, if the vehicle is parked on a grade where the port 1266 is routed to a low position in the fuel tank 1012, the cam 1236 is rotated to a position to close the port 1264. During refueling, the valve 1254 associated with port 1264 is opened by the cam 1234. Once the fuel level sensor 1048 reaches a predetermined level corresponding to a "Fill" position, the controller 1030 will close the valve 1254. In other configurations, the cam 1234, valve 1254 and port 1262 can be eliminated leaving two cams 1236 and 1238 that open and close valves 1256 and 1258. In such an example, the two ports 1264 and 1266 can be 7.5 mm orifices. If both ports 1264 and 1266 are open, refueling can occur. If less flow is required, a cam position can be attained where one of the valves 1256 and 1258 are not opened all the way.

Turning now to FIGS. 14-17, a vent shut-off assembly constructed in accordance to another example of the present disclosure is shown and generally identified at reference 1300. The vent shut-off assembly 1300 can be incorporated for use with any of the evaporative emissions control systems described herein. The vent shut-off assembly 1300 generally comprises a first cam shaft 1302 and a second cam shaft 1304. The first and second cam shafts 1302 and 1304 are coaxial and configured for relative rotation. The first cam shaft 1302 includes a first cam 1312 and a second cam 1314. The second cam shaft 1304 includes a third cam 1316. A first vent 1322 is actuated based on rotation of the first cam 1312. A second vent 1324 is actuated based on rotation of the second cam 1314. A third vent 1326 is actuated based on rotation of the third cam 1316. The first cam shaft 1302 has a first tab 1330. The second cam shaft 1304 has a second tab 1332. The first cam shaft 1302 controls the venting of the first and second vents 1322 and 1324. The second cam shaft 1304 rotates on the first cam shaft 1302. The second cam shaft 1304 is driven by the engagement of the first and second tabs 1330, 1332.

In one exemplary configuration, the third vent 1326 can be associated with a refueling vent. Under normal driving conditions, the first cam shaft 1302 may rotate to open and close the first and second vents 1322, 1324. The second cam shaft 1304 may move while the first cam shaft 1302 is moving but insufficiently to cause actuation of the third vent 1326. The third vent 1326 is actuated by rotation of the tab 1332 to an open position. The third vent 1326 is closed by further pushing the tab 1332 past the open position. In this regard, actuation of the first and second vents 1322 and 1324 can be accomplished discretely from actuation of the third vent 1326.

Turning now to FIGS. 18-21, a vent shut-off assembly constructed in accordance to another example of the present disclosure is shown and generally identified at reference 1400. The vent shut-off assembly 1400 can be incorporated for use with any of the evaporative emissions control systems described herein. The vent shut-off assembly 1400 generally provides solenoid controlled linear actuation of two vent points. The vent shut-off assembly 1400 generally includes a solenoid 1402 that actuates a valve member assembly 1404 relative to a valve body 1410. The valve body 1410 generally includes a first inlet 1420, a second inlet 1422 and an outlet 1424. By way of example, the first and second inlets 1420 and 1422 can be fluidly coupled to first and second vent tubes as disclosed herein.

Figure 18:
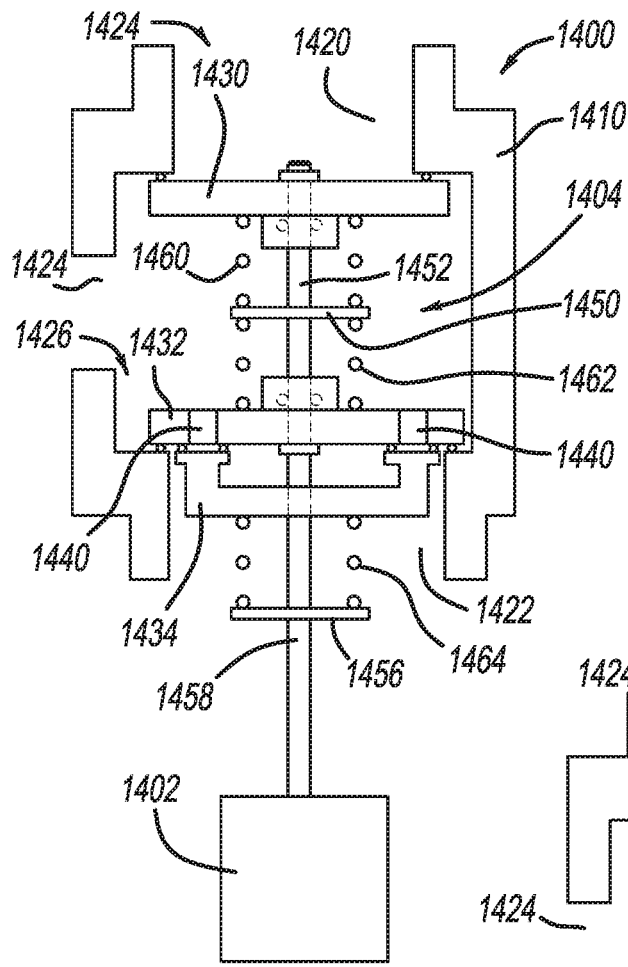
FIG. 18 is a sectional view of a vent shut-off assembly constructed in accordance to additional features of the present disclosure and shown with the valve member assembly in a first position wherein first and second inlets are closed.

The valve member assembly 1404 collectively comprises a first vent valve 1424 and a second vent valve 1426. The first vent valve 1424 includes a first valve closing element or disk 1430. The second vent valve 1426 collectively comprises a second valve closing element or disk 1432 and a third closing element or disk 1434. The second disk 1432 defines apertures 1440 therethrough. A first spring support 1450 is disposed on a distal shaft 1452. A second spring support 1456 is disposed on a proximal shaft 1458. A first biasing member 1460 is arranged between the first spring support 1450 and first disk 1430 for biasing the first disk 1430 toward a closed position (FIG. 18). A second biasing member 1462 is arranged between the first spring support 1450 and the second disk 1432 for biasing the second disk 1432 toward a closed position (FIG. 18). A third biasing member 1464 is arranged between the second spring support 1456 and the third disk 1434 for biasing the third disk 1434 toward the second disk 1432. A first seal member 1470 is disposed on the first disk 1430. A second seal member 1472 and third seal member 1474 is disposed on the second disk 1432.

Operation of the vent shut-off assembly 1400 will now be described. In FIG. 18, the first and second inlets 1420 and 1422 and the outlet 1424 are all closed relative to each other. The first disk 1430 is closed, closing the first inlet 1420. The first disk 1430 is sealingly engaged to the valve body 1410. The second disk 1432 is closed and the third disk 1434 is closed. The second disk 1432 is sealingly engaged to the valve body 1410 closing the outlet 1424. The third disk 1434 is sealingly engaged to the second disk 1432 closing the second inlet 1422.

Figure 19:
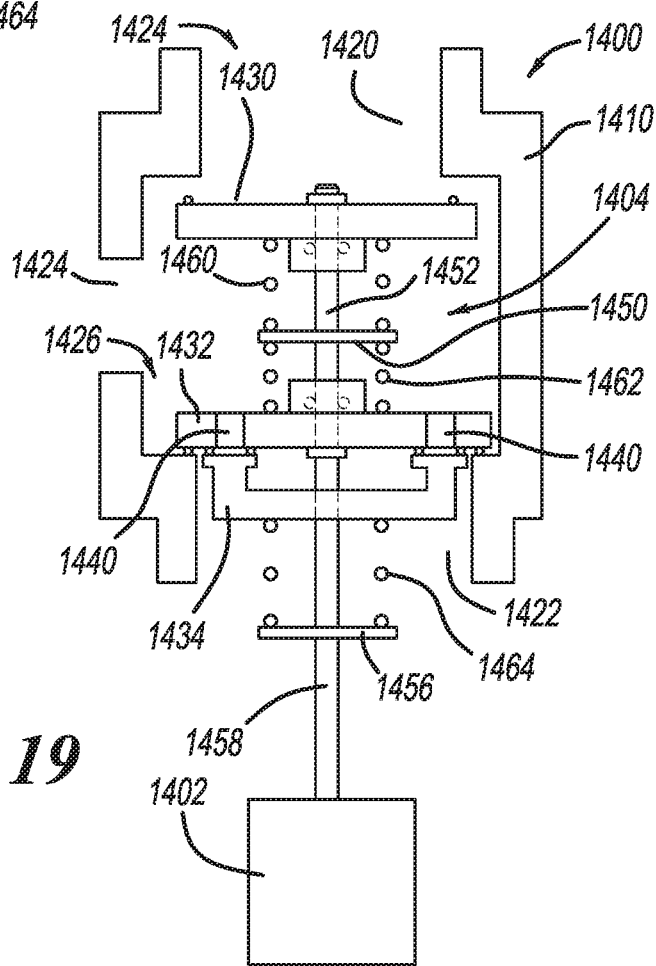
FIG. 19 is a sectional view of the vent shut-off assembly of FIG. 18 and shown with the valve member assembly in a second position wherein the first inlet is open and the second inlet is closed.

In FIG. 19, the first inlet 1420 is open to the outlet 1424. The second inlet 1422 is closed. The solenoid 1402 urges the first disk 1430 away from seating on the valve body 1410. In FIG. 20, the second inlet 1422 is open to the outlet 1424. The first inlet 1420 is closed. The solenoid 1402 urges the third disk 1434 and therefore the second disk 1432 upward. In FIG. 21, the first inlet 1420 is open to the outlet 1424. The second inlet 1422 is also open to the outlet 1424.

With additional reference now to FIGS. 22-26, a vent shut-off or control assembly constructed in accordance to one example of the present disclosure is shown and generally identified at reference 1510. The vent control assembly 1510 can be used in a fuel system such as fuel system 1010 and cooperate with evaporative emissions control system 1020 to open and close identified vents. It will be appreciated that the vent control assembly 1510 can be used in other fuel systems or systems in general to regulate fluid flow.

The vent control assembly 1510 generally includes shaft assembly 1512, a block 1516, actuation assembly 1520 and an input source 1522. The shaft assembly 1512 can include a split shaft having a first shaft portion 1530 and a second shaft portion 1532. The actuation assembly 1520 includes a cam assembly 1534. As will be explained herein, the first and second shaft portions 1530 and 1532 can move relative to each other based on rotation of the cam assembly 1534. The shaft assembly 1512 (split shaft) can have internal and external splines between the respective first and second shaft portions 1530 and 1532. The second shaft portion 1532 can be formed of externally molded rubber. The block 1516 can be formed of metal. The second shaft portion 1532 has a first shaft passage 1536. The block 1516 has first and second block passages 1540, 1542. The cam assembly 1534 generally includes a cam plate 1544 and a plurality of protrusions 1546. The second shaft 1532 can include a spring loaded probe assembly 1550 thereon. The spring loaded probe assembly 1550 generally includes cam followers 1552 that are biased by respective biasing members 1554. The input source 1522 can include a servo motor. Other actuation sources are contemplated.

During operation, the actuation source 1522 rotates the first shaft 1530 causing the protrusions 1546 on the cam plate to urge the cam followers 1546 on the spring loaded probe assembly 1550 to move rightward ultimately causing the second shaft 1532 to translate rightward. In this regard, in the unactuated position (FIG. 22), the first shaft passage 1536 is not aligned with the first and second block passages 1540, 1542. In the actuated position (FIG. 23), the first shaft passage 1536 is aligned with the first and second block passages 1540, 1542. A biasing member 1556 can urge the second shaft 1532 back toward the unactuated position. The biasing members 1554 and 1556 can be used to return the second shaft 1532 to be available for subsequent indexing.

Figure 22:
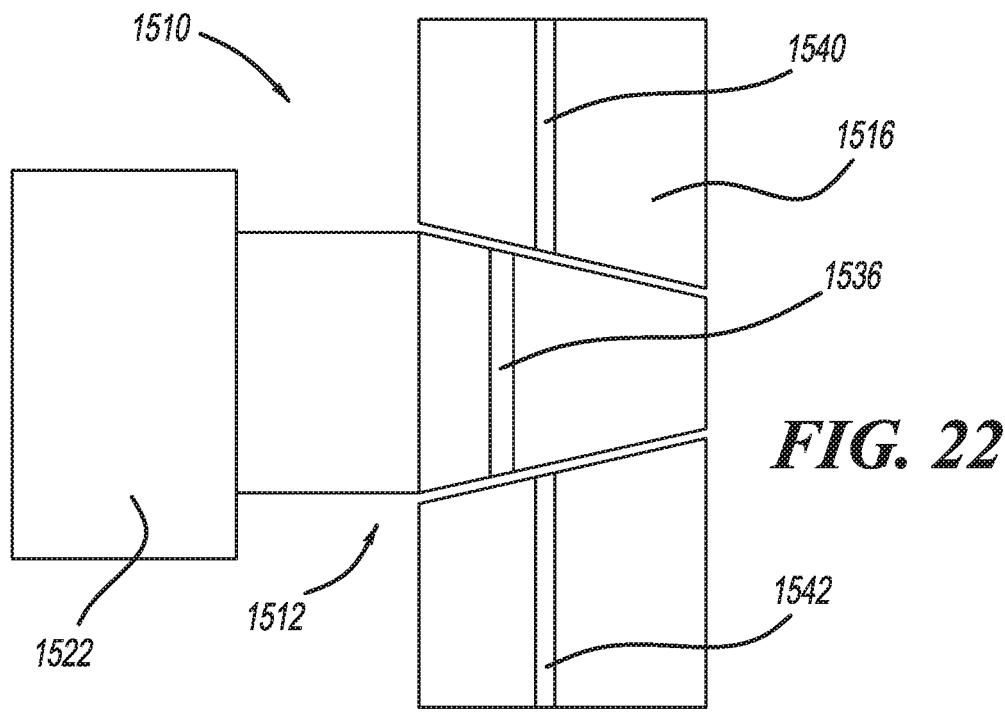
FIG. 22 is a schematic illustration of a valve control assembly for use on a fuel tank system having an evaporative emissions control system in accordance to one example of the present disclosure and show prior to actuation.
Figure 23:
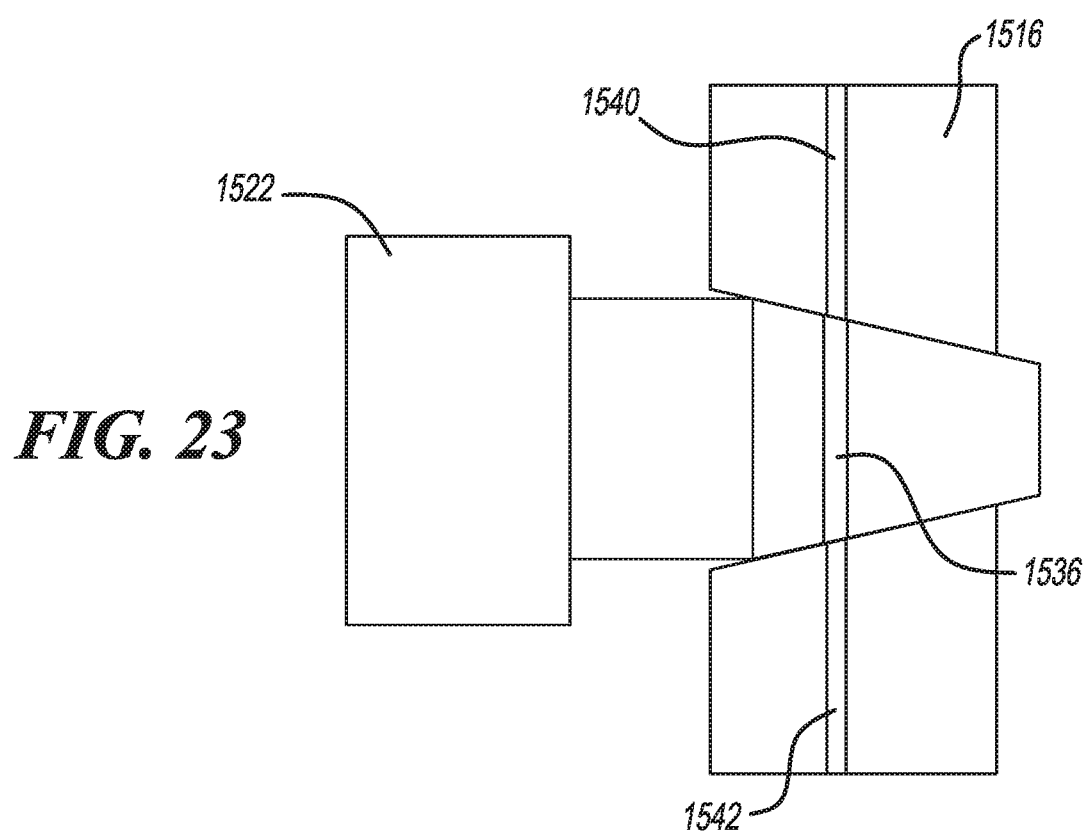
FIG. 23 is a schematic illustration of the valve control assembly of FIG. 22 and shown subsequent to valve actuation.
Figure 24:
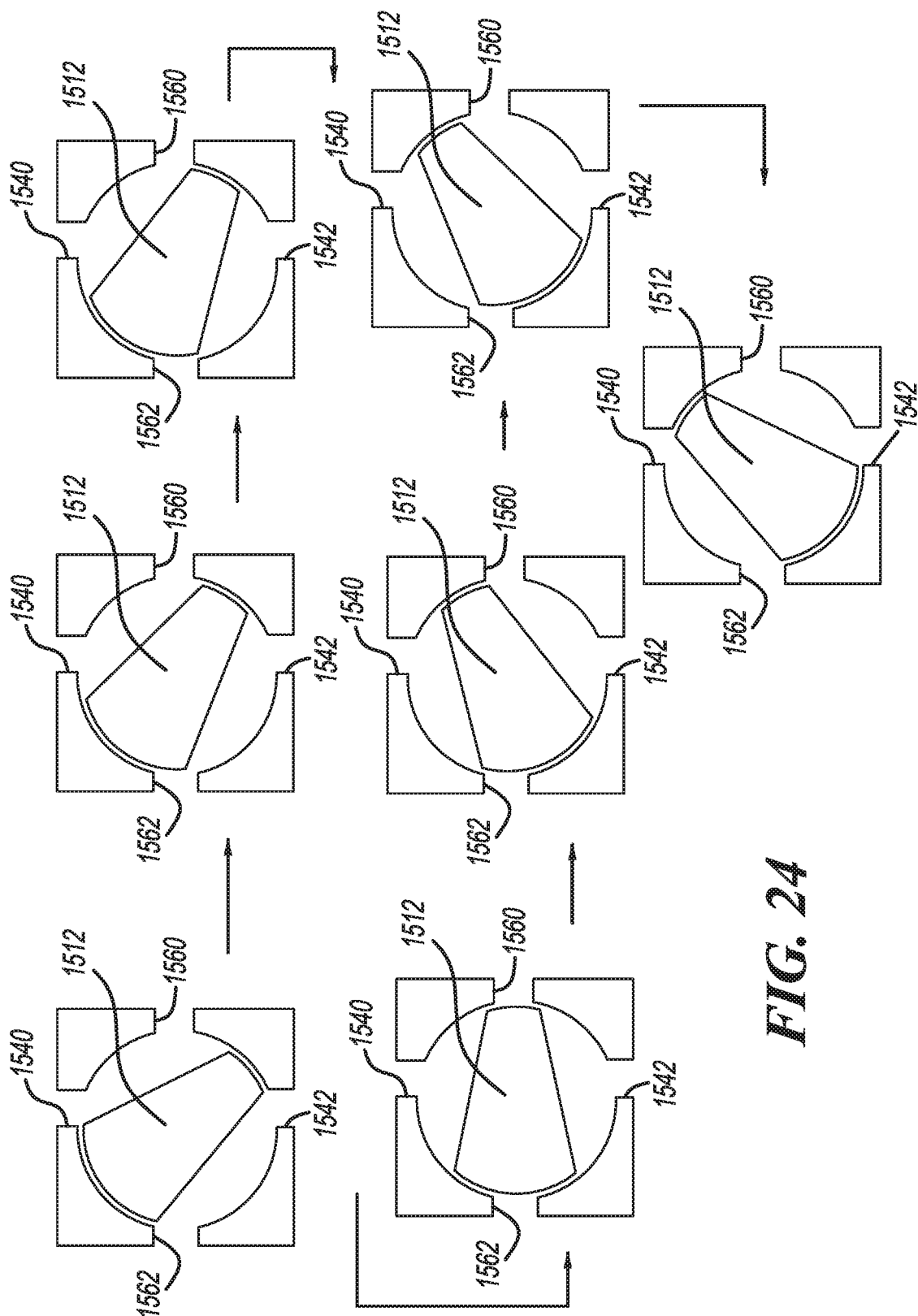
FIG. 24 is a sectional sequential view of the valve control assembly of FIG. 22.
Figure 25:
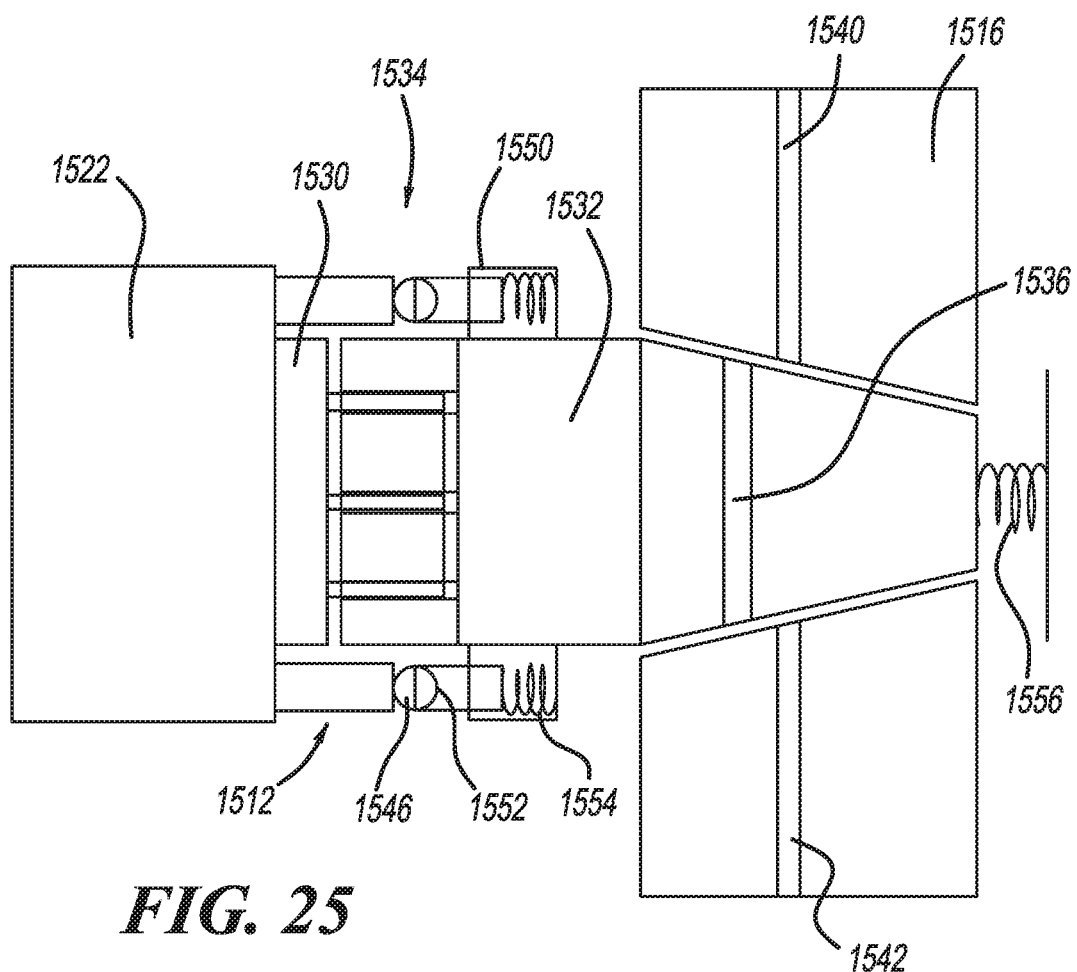
FIG. 25 is another schematic illustration of the valve control assembly of FIGS. 22 and 23.
Figure 26:
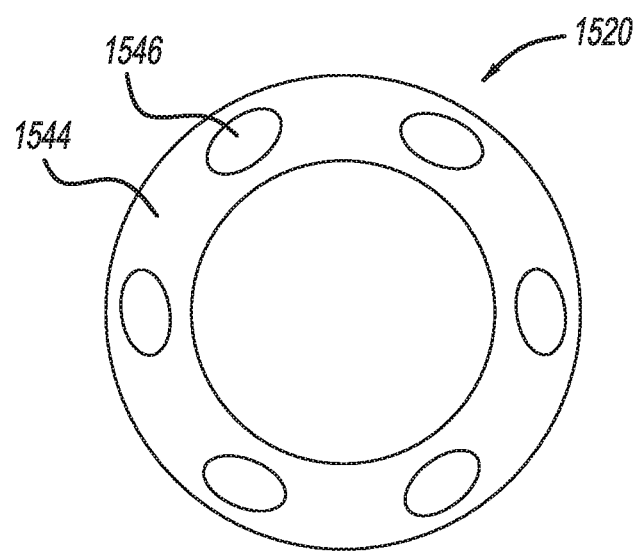
FIG. 26 is a top view of a cam mechanism of the valve control assembly of FIG. 25.
Figure 28:
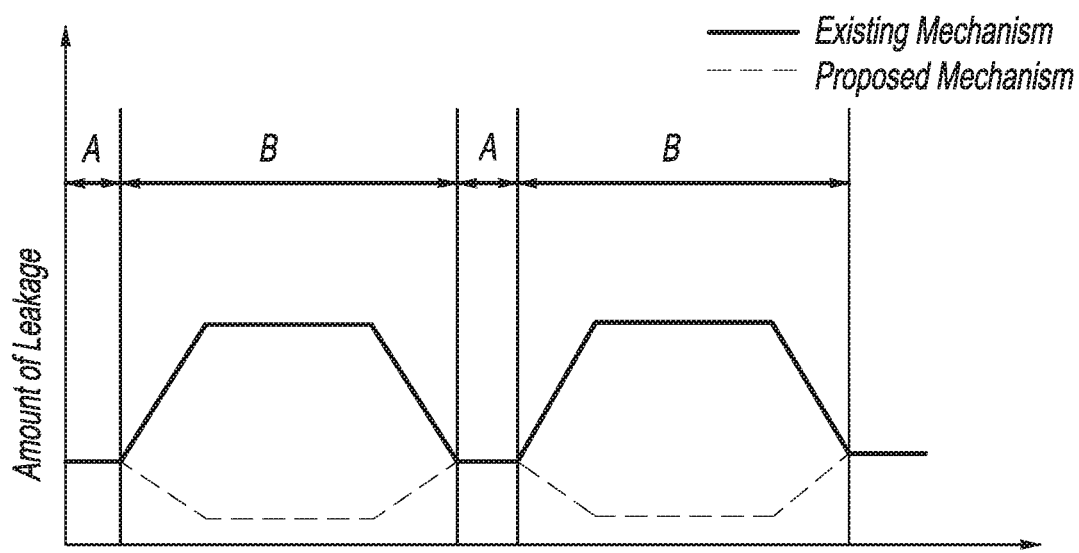
FIG. 28 is a plot of leakage versus time for the valve control assemblies of the present disclosure.

In the example shown in FIGS. 22 and 23, the block 1516 has first and second block passages 1540, 1542. As shown in FIG. 24 however the block 1516 may incorporate additional passages such as third and fourth block passages 1560, 1562. In one example it is contemplated that the passages 1540, 1542, 1560, 1562 can be fluidly connected to vent lines in the fuel tank. The second shaft portion 1532 is generally wedge shaped. The valve control assembly 1510 can be used for a dynamic state and a steady state, as shown in FIG. 28. In the dynamic state, the second shaft 1532 is in dynamic state. Leakage is not critical and will not be significant due to low fluid pressure and short transition times. In steady state, the second shaft 1532 is in steady state for significant operation time. Leakage is not desired. During steady state, the proposed leakage control is most effective.

Figure 27:
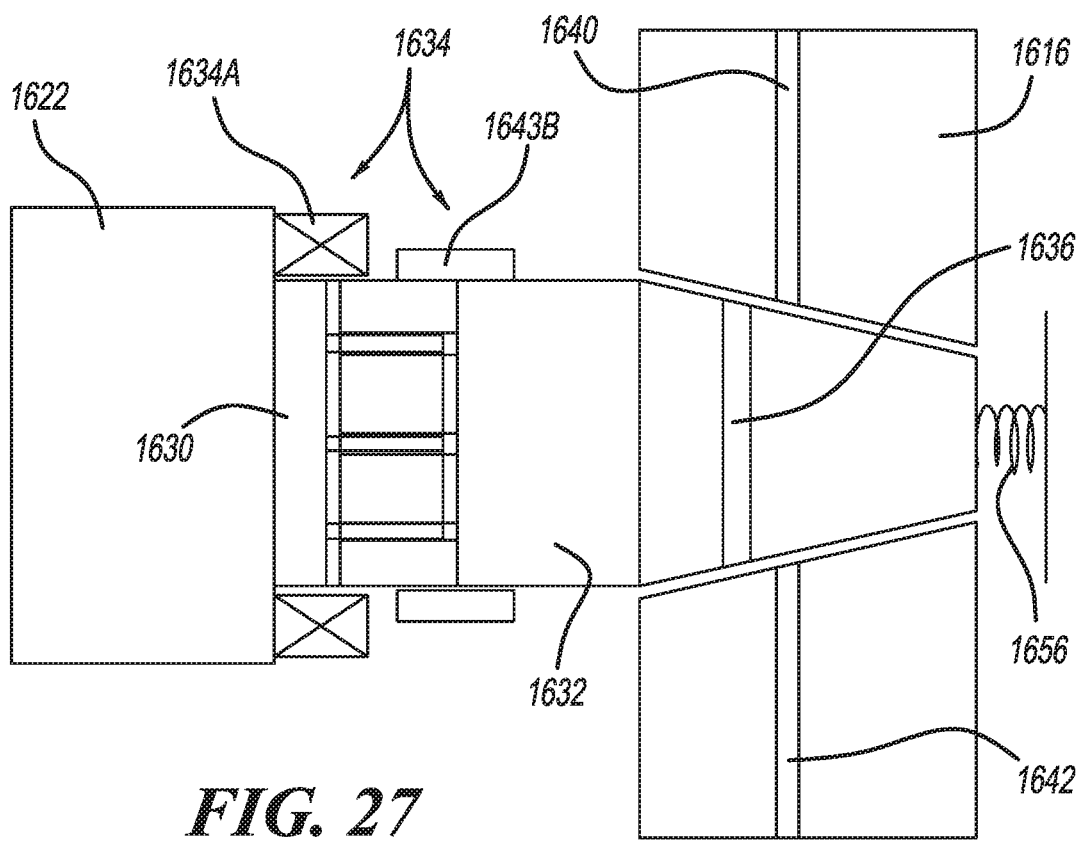
FIG. 27 is a schematic illustration of a valve control assembly constructed in accordance to another example of the present disclosure.

With additional reference now to FIG. 27, a vent control assembly constructed in accordance to one example of the present disclosure is shown and generally identified at reference 1610. The vent control assembly 1610 can be used in a fuel system such as fuel system 1010 and cooperate with evaporative emissions control system 1020 to open and close identified vents. It will be appreciated that the vent control assembly 1610 can be used in other fuel systems or systems in general to regulate fluid flow.

The vent control assembly 1610 generally includes shaft assembly 1612, a block 1616, actuation assembly 1620 and an input source 1622. The shaft assembly 1612 can include a split shaft having a first shaft portion 1630 and a second shaft portion 1632. The actuation assembly 1620 includes an electromagnetic assembly 1634. The electromagnetic assembly 1634 includes electromagnetic coils 1634A and a magnet portion 1634B. As will be explained herein, the first and second shaft portions 1630 and 1632 can move relative to each other when the electromagnetic assembly 1634 is energized. When the electromagnetic coils 1634A are energized, the magnet portion 1634B moves toward the electromagnetic coils 1634A.

The second shaft portion 1632 can be formed of externally molded rubber. The block 1616 can be formed of metal. The second shaft portion 1632 has a first shaft passage 1636. The block 1616 has first and second block passages 1640, 1642. The input source 1622 can include a servo motor. Other actuation sources are contemplated.

During operation, the second shaft 1632 occupies a first position where the first shaft passage 1636 is not aligned with the first and second block passages 1640, 1642. In a second position, the first shaft passage 1636 is aligned with the first and second block passages 1640, 1642. A biasing member 1656 can urge the second shaft 1632 back toward the unactuated position to be available for subsequent indexing.

Figure 29:
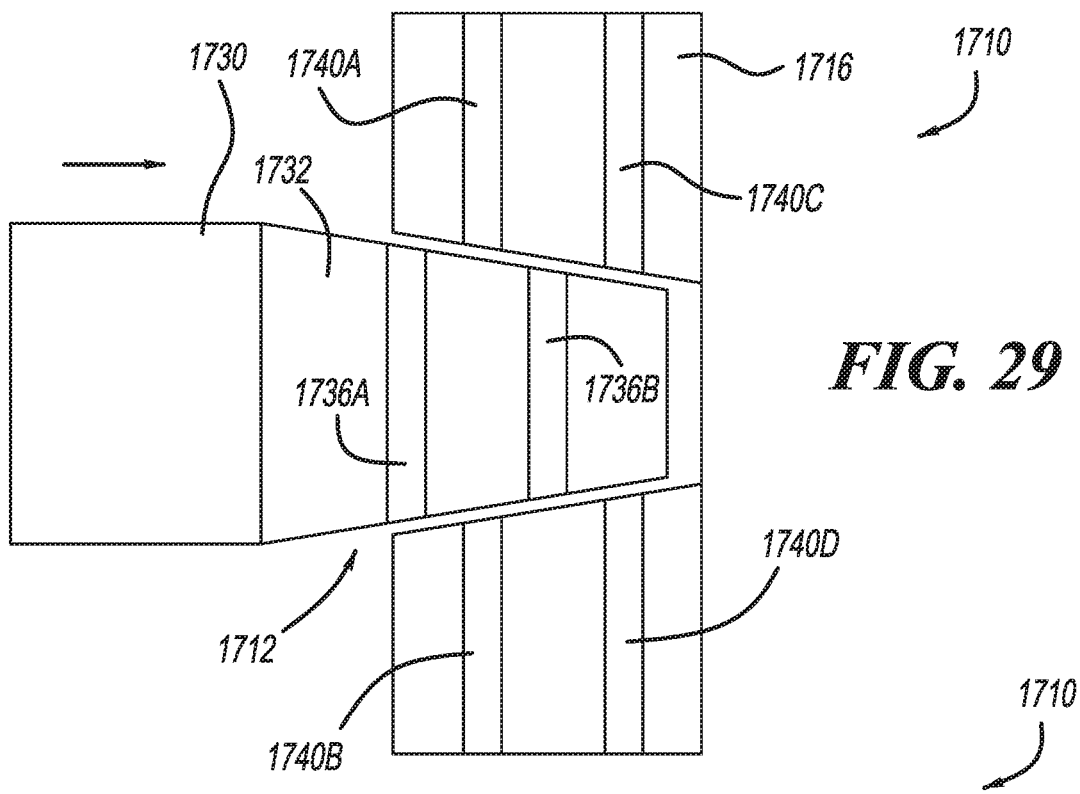
FIG. 29 is a schematic illustration of a valve control assembly constructed in accordance to another example of the present disclosure and shown prior to actuation.
Figure 30:
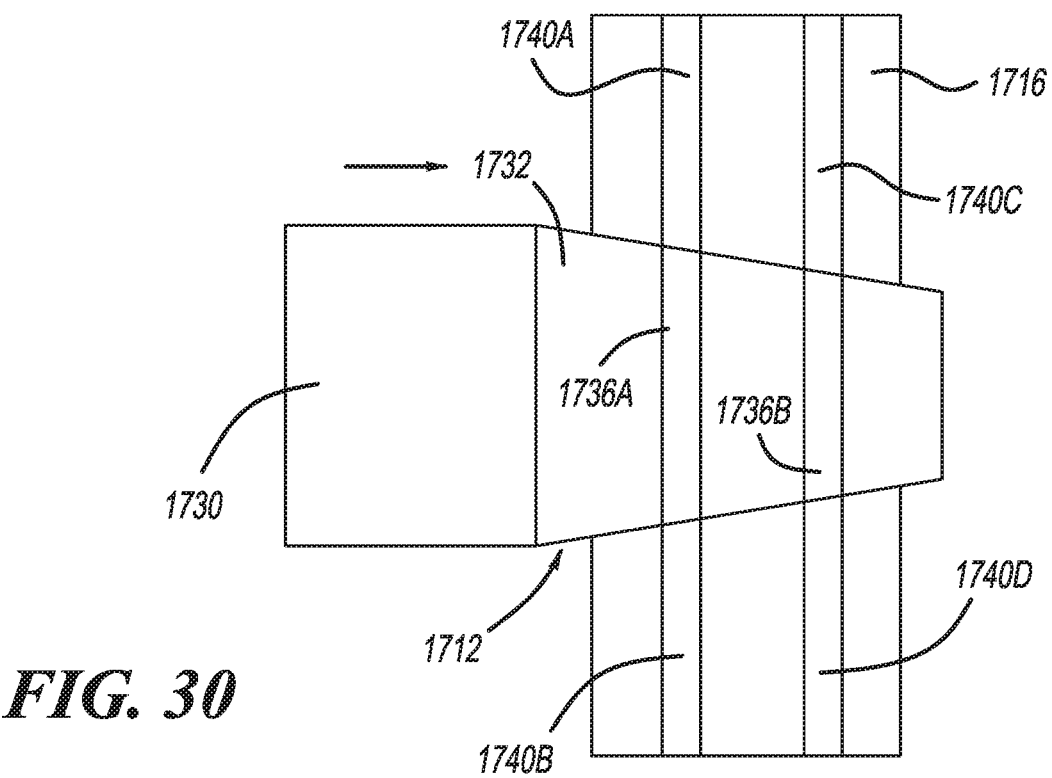
FIG. 30 is a schematic illustration of the valve control assembly of FIG. 29 and shown subsequent to actuation.

Turning now to FIGS. 29 and 30, a vent shut-off or control assembly constructed in accordance to one example of the present disclosure is shown and generally identified at reference 1710. The vent control assembly 1710 can be used in a fuel system such as fuel system 1010 and cooperate with evaporative emissions control system 1020 to open and close identified vents. It will be appreciated that the vent control assembly 1710 can be used in other fuel systems or systems in general to regulate fluid flow.

The vent control assembly 1710 generally includes shaft assembly 1712 and a block 1716. The vent control assembly 1710 can be configured for use with any of the actuation assemblies described above. The shaft assembly 1712 can include a split shaft having a first shaft portion 1730 and a second shaft portion 1732. In this example, the second shaft has first and second shaft passages 1736A, 1736B. The block has first, second, third and fourth block passages 1740A, 1740B, 1740C and 1740D. Based on this configuration, the second shaft 1732 can be translated from the position shown in FIG. 29 to a position shown in FIG. 30. As can be appreciated, multiple passages may be connected at a time. In the example shown in FIG. 30, the first shaft passage 1736A is aligned with the first and second block passages 1740A, 1740B. The second shaft passage 17368 is also aligned with third and fourth block passages 1740C, 1740D.

Figure 31:
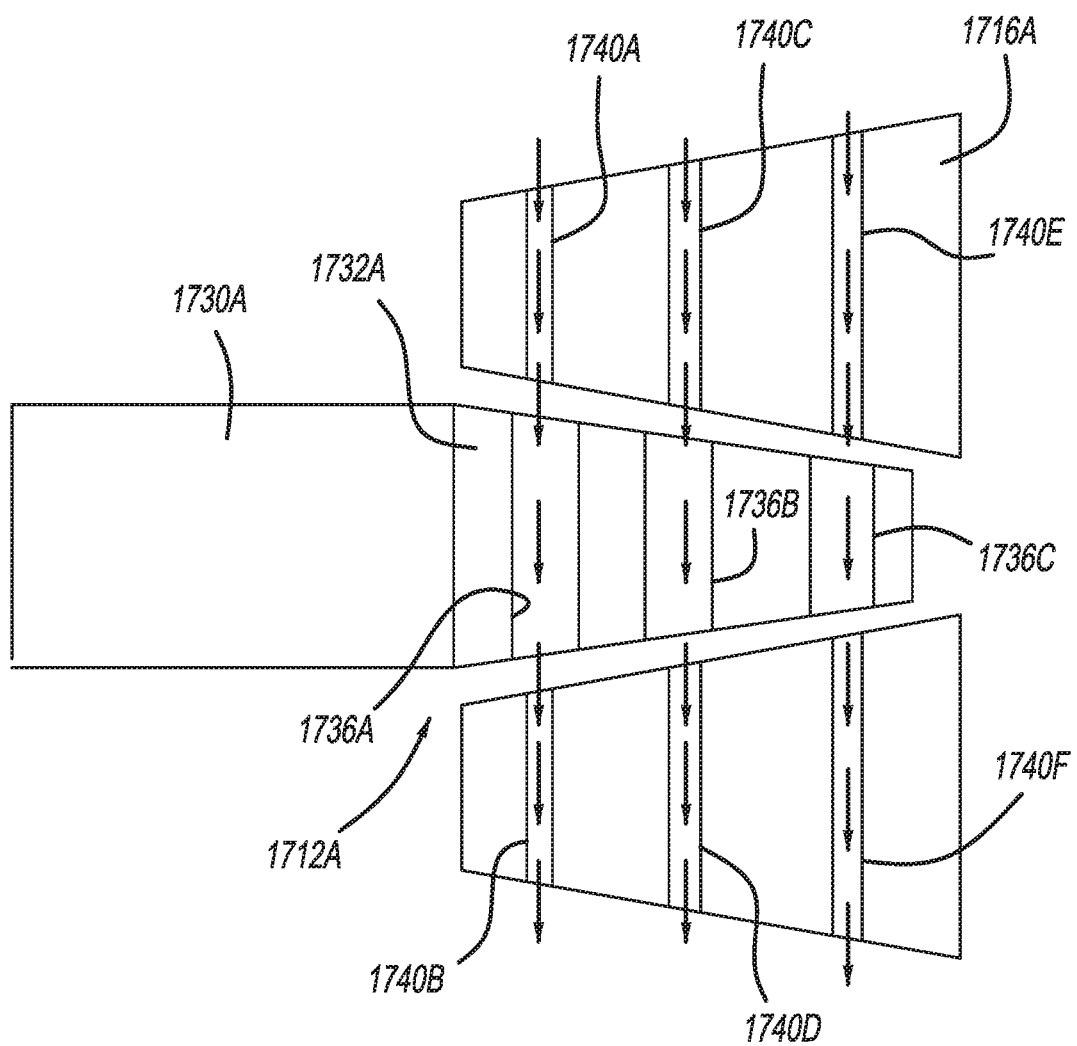
FIG. 31 is a schematic illustration of a valve control assembly constructed in accordance to another example.

In some examples, the second shaft 1732 can be formed at least in part with molded rubber. Specifically, molded rubber can be provided on an outer conical surface 1744 of the second shaft 1732 to encourage sealing with the complementary conical surface on the block 1716. In some examples, the block 1716 can additionally or alternatively include molded rubber. The conical geometry of the second shaft 1732 can minimize the wear observed on the rubber material used on the second shaft. The configuration wears at a reduced rate as compared to traditional o-ring materials. Explained further, the relative motion between contacting surfaces and friction resulting therefrom is reduced due to axial displacement of the second shaft 1732. Friction is reduced by 70% or more. A similar configuration may be implemented for incorporating molded rubber on the second shaft 1532 (FIG. 25), the second shat 1632 (FIG. 27) and the second shaft 1732A (FIG. 31). In some instances the block 1516, 1616 and 1717 can additionally or alternatively include molded rubber.

FIG. 31 illustrates a shaft assembly 1712A having a first shaft 1730A and a second shaft 1732A. In this example, the second shaft 1732A has a third shaft passage 1736C. The block 1716A includes a fifth and sixth block passage 1740E and 1740F.

With reference now to FIGS. 32-35, a vent shut-off assembly 1822 constructed in accordance to additional features of the present disclosure will be described. The vent shut-off assembly 1822 can be used with any of the actuator assemblies described herein for actuating two vent points (such as a front tank vent and a rear tank vent) with a single cam. The vent shut-off assembly 1822 generally includes a cam 1830 having a first cam lobe 1832 and a second cam lobe 1834. Rotation of the cam 1830 causes selective actuation of a first vent poppet valve 1840 and a second vent poppet valve 1842. In one example, the first vent poppet valve 1840 has a first roller 1850 disposed at a distal end for engaging the cam 1830. The first vent poppet valve 1840 actuates to open and close a first port 1852. The second vent poppet valve 1842 has a second roller 1860 disposed at a distal end for engaging the cam 1830. The second vent poppet valve 1842 actuates to open and close a second port 1862. A first venting state is shown in FIG. 32 where the first and second vent poppet valves 1840 and 1842 are closed. A second venting state is shown in FIG. 33 where first poppet valve 1840 is open and the second poppet valve 1842 is closed. A third venting state is shown in FIG. 34 where the first and second poppet valves 1840 and 1842 are open. A fourth venting state is shown in FIG. 35 where the first poppet valve 1840 is closed and the second poppet valve 1842 is open.

Figure 36:
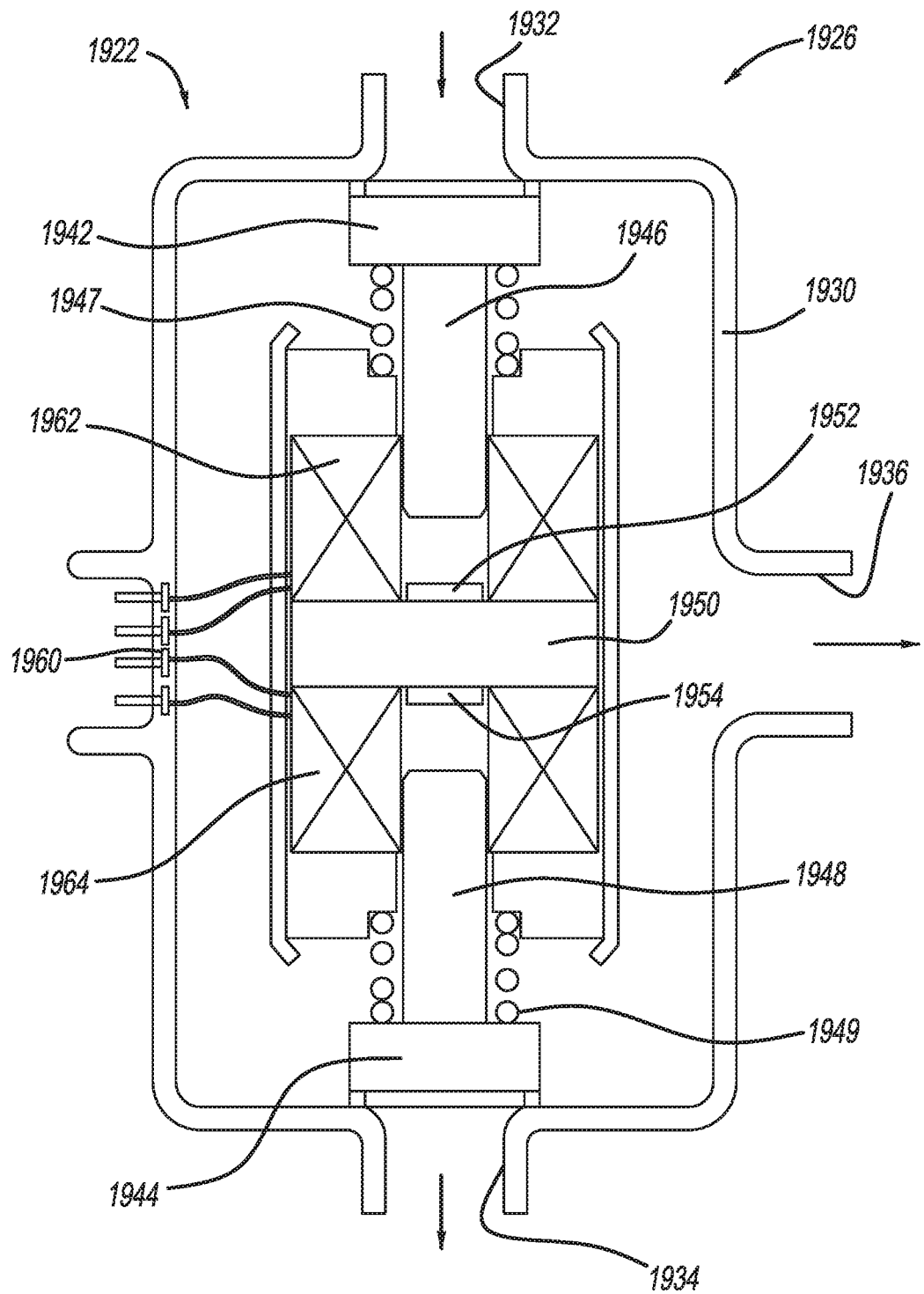
FIG. 36 is a sectional view of a vent shut-off assembly constructed in accordance to another example of the present disclosure.

Turning now to FIG. 36, a vent shut-off assembly 1922 constructed in accordance to another example of the present disclosure will be described. The vent shut-off assembly 1922 can be used with any of the actuator assemblies described herein for opening and closing various vent ports. In the example shown, the vent shut-off assembly 1922 includes a three port, four position latching fuel vapor solenoid valve 1926. The solenoid valve 1926 generally includes a valve body 1930 that defines a first port 1932, a second port 1934 and a third port 1936. A first seal assembly 1942 selectively opens and closes the first port 1932. A second seal assembly 1944 selectively opens and closes the second port 1934. A first armature 1946 extends from the first seal assembly 1942. A first biasing member 1947 biases the first seal assembly 1942 to a closed position. A second armature 1948 extends from the second seal assembly 1944. A second biasing member 1949 biases the second seal assembly 1944 to a closed position.

A pole piece 1950 can be centrally arranged in the solenoid valve 1926. A first and second permanent magnet 1952 and 1954 are disposed on opposite sides of the pole piece 1950. An electrical connector 1960 is electrically coupled to a first encapsulated coil 1962 and a second encapsulated coil 1964. The solenoid valve 1926 can have an electrical termination or connector that plugs into a valve body electrical breakout connector instead of using a pig tail connection. A seal assembly can be assembled to an armature using a variety of retention methods such as, but not limited to over-mold configurations and snap-fit arrangements. The permanent magnets 1952 and 1954 can be overmolded into the first and second coils 1962 and 1964 or assembled into small detents on the pole piece 1950. The first and/or second coils 1962 and 1964 can be energized to move the first and/or second seal assemblies 1942 and 1944 thereby opening or closing the first and second ports 1932, 1934.

Figure 37:
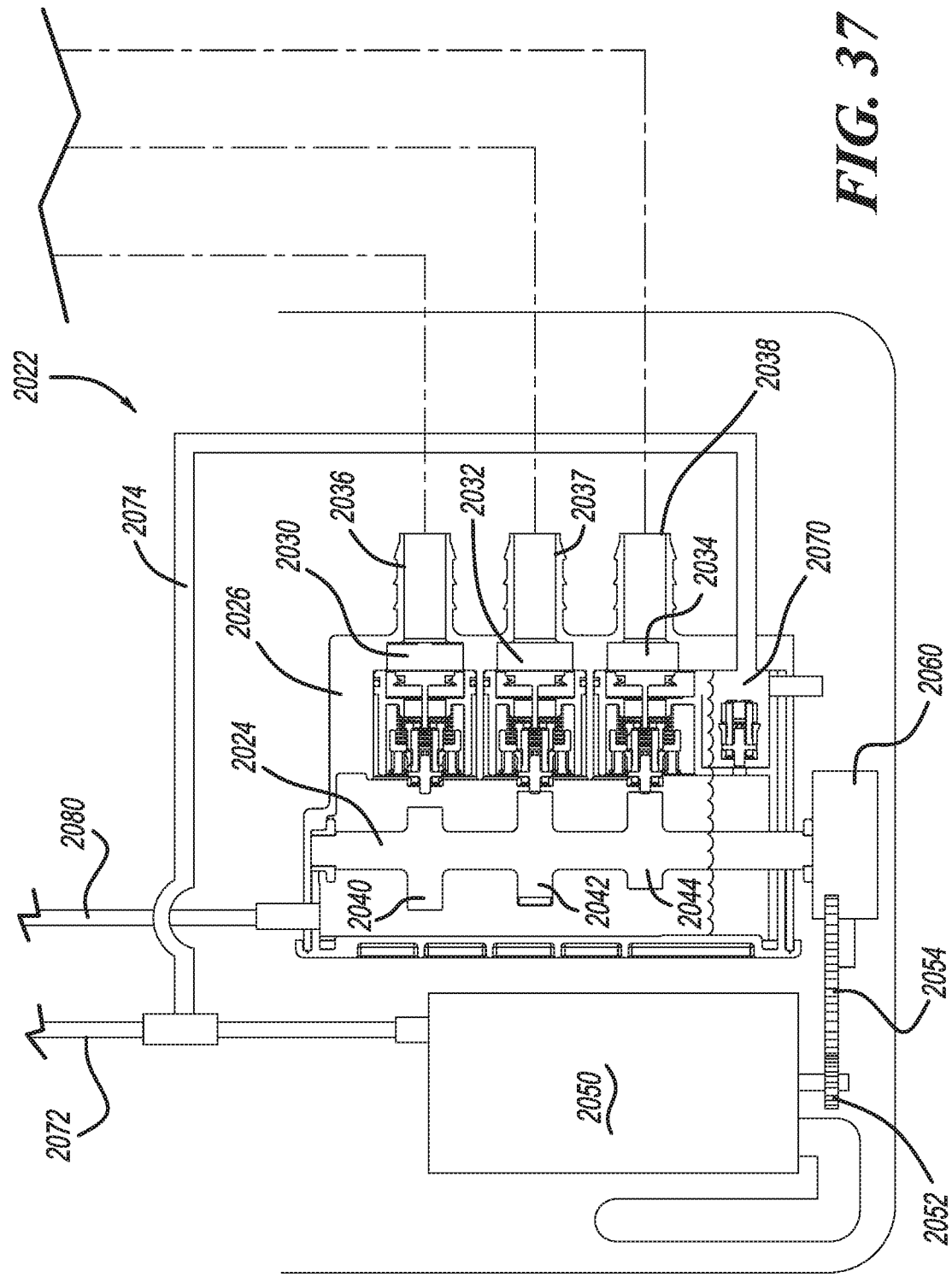
FIG. 37 is a partial sectional view of a vent shut-off assembly constructed in accordance to another example of the present disclosure.

Turning now to FIG. 37, a vent shut-off assembly 2022 constructed in accordance to another example of the present disclosure will be described. The vent shut-off assembly 2022 generally includes a vent box cam 2024 rotatably disposed in a vent box 2026 and that actuates respective first, second and third valves 2030, 2032 and 2034. The first valve 2030 opens and closes a first vapor port 2036. The second valve 2032 opens and closes a second vapor port 2037. The third valve 2034 opens and closes a third vapor port 2038. The first, second and third vapor ports 2036, 2037 and 2038 can be routed to various locations on the fuel tank as disclosed herein. The vent box cam 2024 includes a first cam 2040 that actuates the first valve 2030, a second cam 2042 that actuates the second valve 2032 and a third cam 2044 that actuates the third valve 2034.

The vent box cam 2024 is driven by a fuel pump 2050. Specifically, the fuel pump 2050 drives a first gear 2052 that drives a reduction gear 2054 that in turn drives a clutch mechanism 2060 that rotates the vent box cam 2024. An active drain liquid trap 2070 can be fluidly connected to a fuel feed line 2072 by a connection tube 2074. A vapor vent line 2080 is fluidly connected to the canister (see canister 1032, FIG. 1). A fuel pick up sock 2084 is arranged adjacent to the fuel pump 2050.

Figure 38:
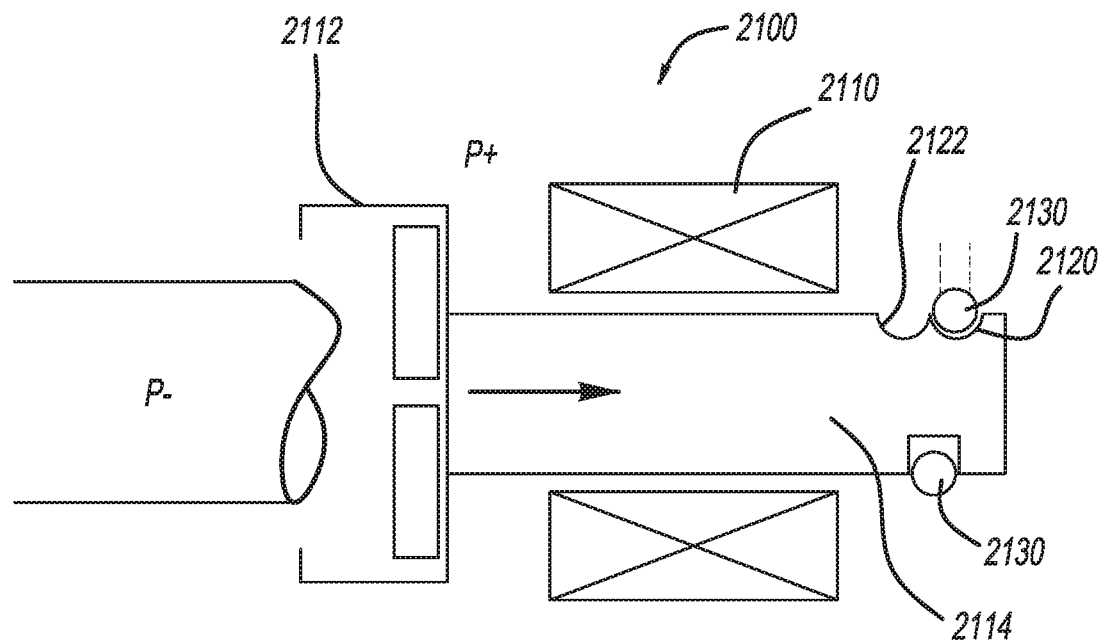
FIG. 38 is a partial sectional view of a valve arrangement configured for use with two-stage actuation, the valve arrangement shown in a first position.
Figure 39:
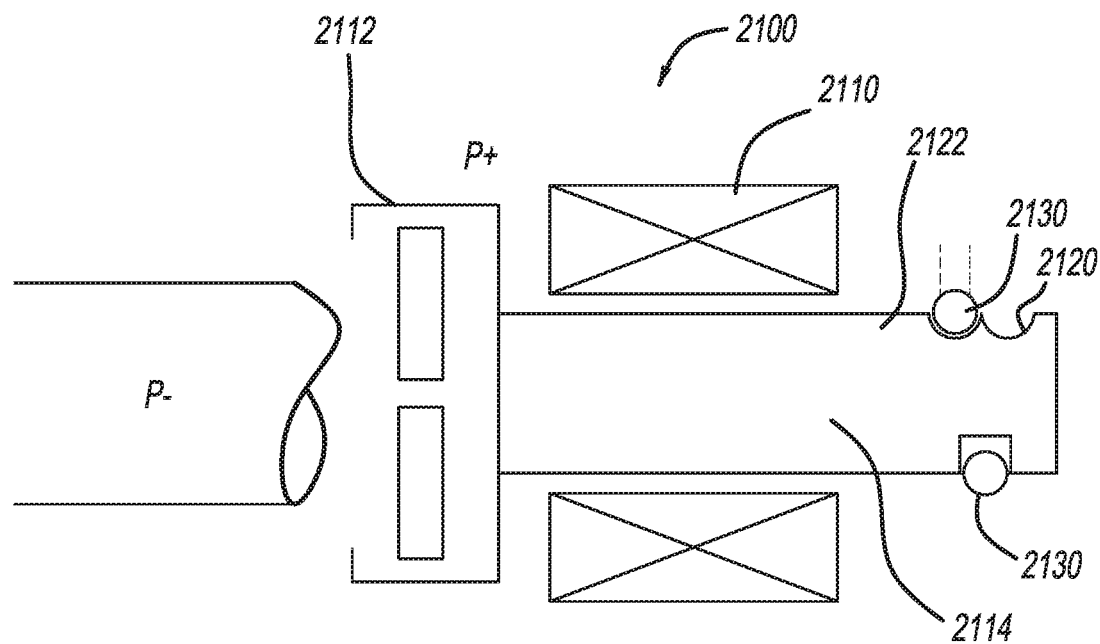
FIG. 39 is a partial sectional view of the valve arrangement of FIG. 38 and shown in a second position.

FIGS. 38 and 39 illustrate a valve arrangement 2100 that can be used in any of the valves disclosed herein. The valve arrangement 2100 is two-staged such that a smaller orifice is first opened to relieve pressure and then less force is required to subsequently open a larger orifice. The valve arrangement 2100 includes a coil 2110 and armature 2112. A shaft 2114 has a first groove 2120 and a second groove 2122. A locating member 2130 locates first into the first groove 2120 and subsequently into the second groove 2122 for sequential, staged opening of the valve.

Figure 40:
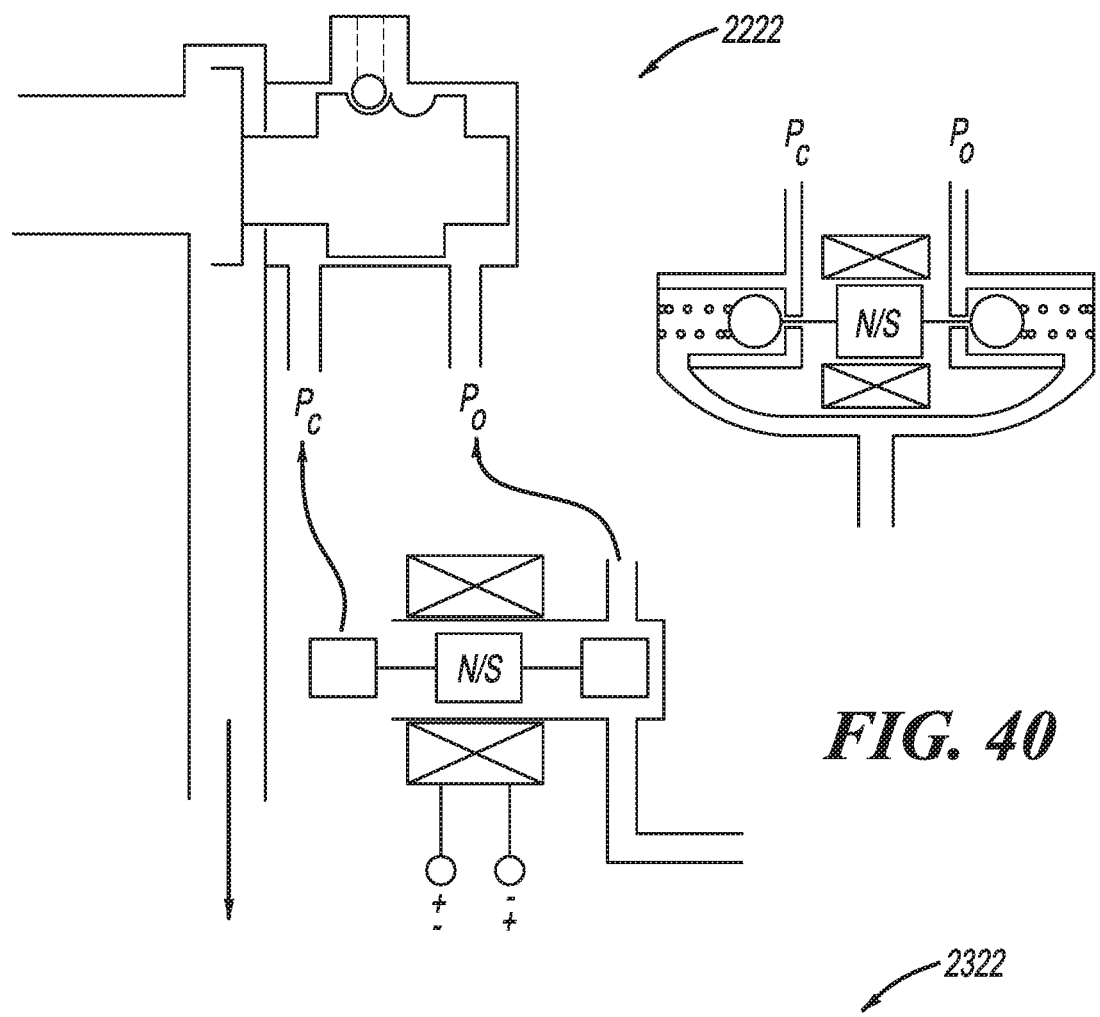
FIG. 40 is a schematic illustration of a vent shut-off assembly constructed in accordance to additional features of the present disclosure.
Figure 41:
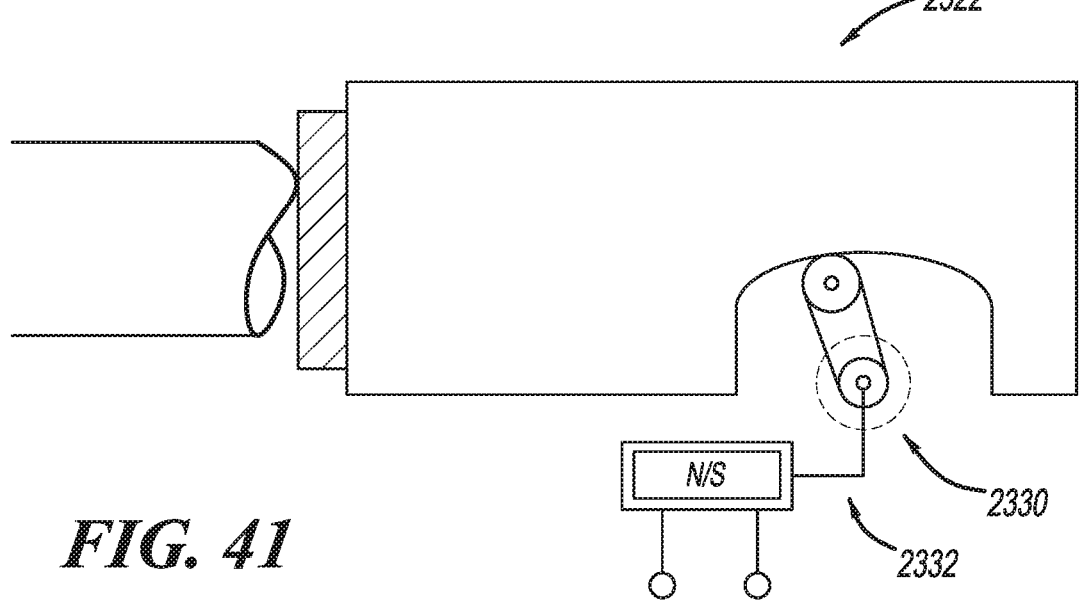
FIG. 41 is a schematic illustration of a vent shut-off assembly constructed in accordance to additional features of the present disclosure.

FIG. 40 illustrates a vent shut-off assembly 2222 constructed in accordance to additional features of the present disclosure. The vent shut-off assembly 2222 can be used in conjunction with any of the systems described herein. The vent shut-off assembly 2222 uses hydraulic force to drive the vent lines open and closed. FIG. 41 illustrates a vent shut-off assembly 2322. The vent shut-off assembly 2322 can be used in conjunction with any of the systems described herein. The vent shut-off assembly 2322 includes a motor 2330 that sends a switch 2332 back and forth to shuttle the vent points open and closed.

Figure 42:
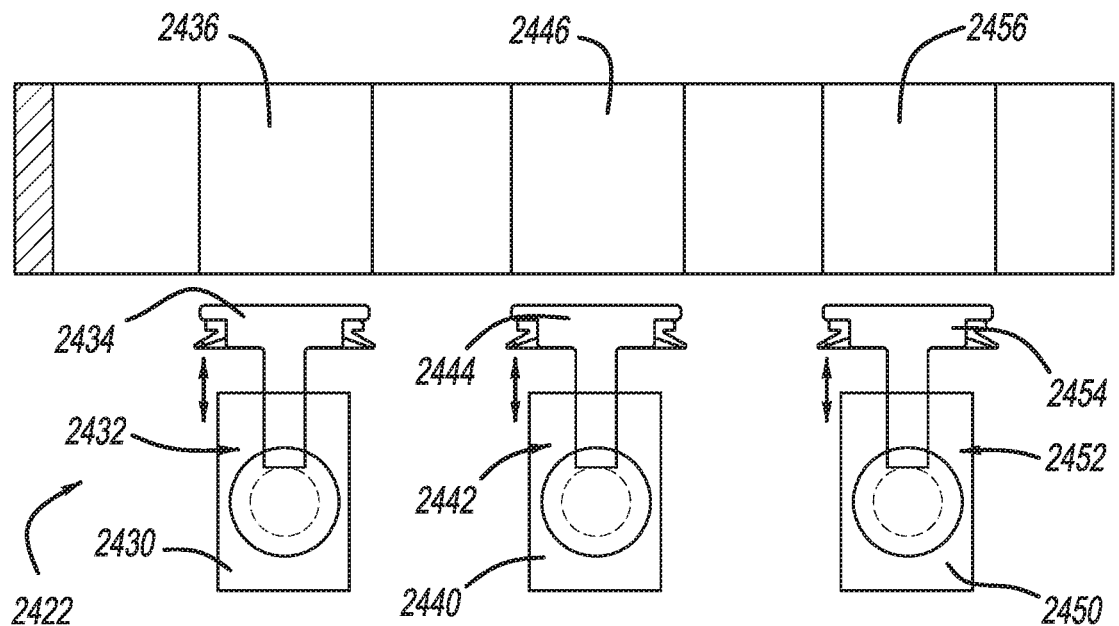
FIG. 42 is a schematic illustration of a vent shut-off assembly constructed in accordance to additional features of the present disclosure and shown having valves in an open position.
Figure 43:
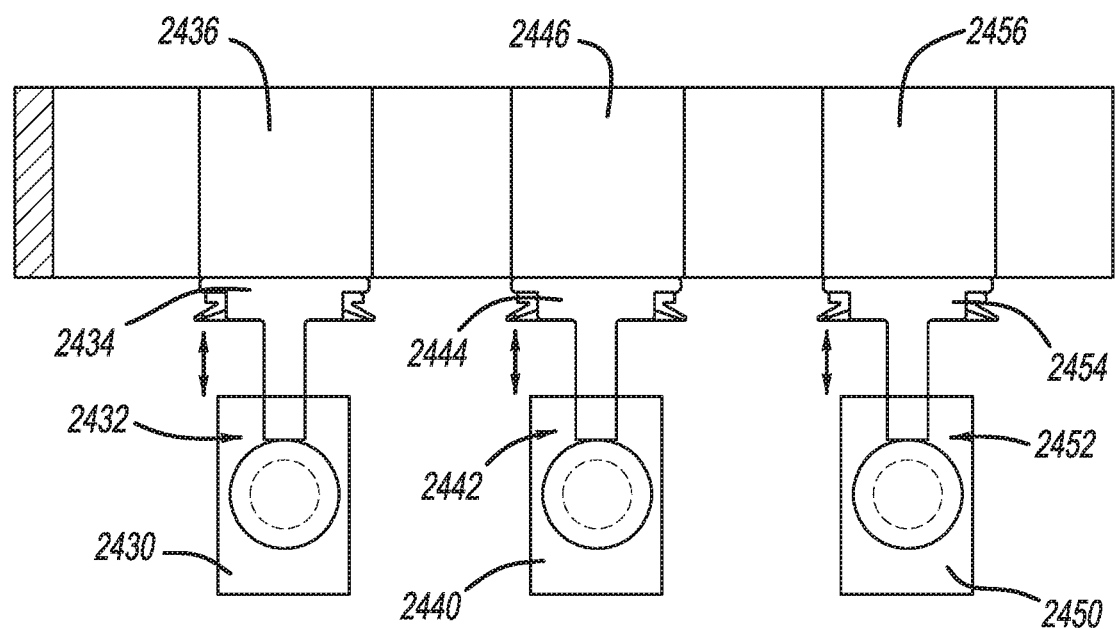
FIG. 43 is a schematic illustration of the vent shut-off assembly of FIG. 42 and shown with the valves in a closed position.
Figure 44:
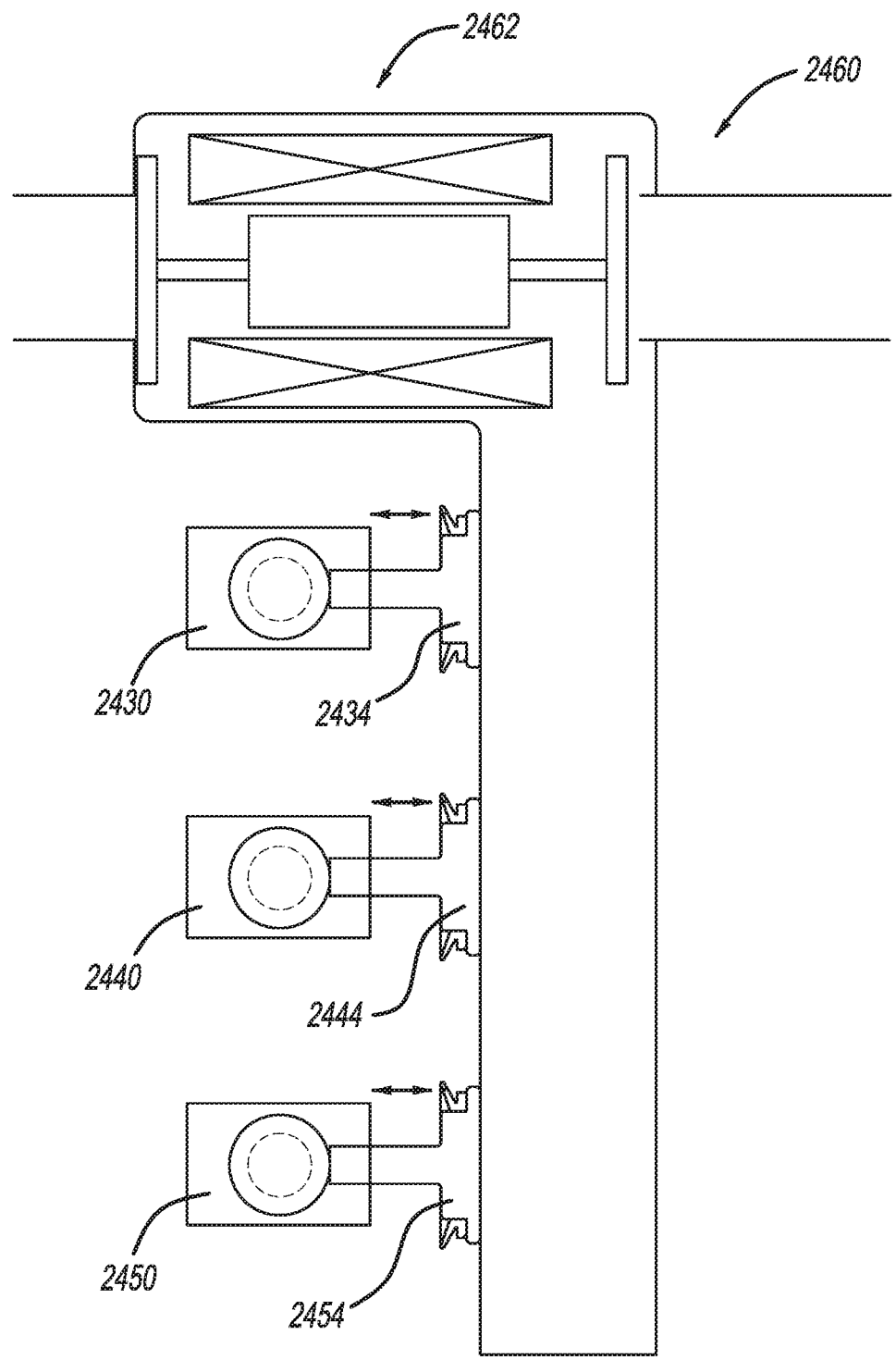
FIG. 44 is a schematic illustration of a vent shut-off assembly constructed in accordance to additional features of the present disclosure.

FIGS. 42-44 illustrate a vent shut-off assembly 2422 constructed in accordance to other features of the present disclosure. The vent shut-off assembly 2422 can be used in conjunction with any of the systems described herein. The vent shut-off assembly 2422 includes a first motor 2430 having a first linear screw drive 2432 that opens (FIG. 42) and closes (FIG. 43) a first vent 2434 associated with a first port 2436. A second motor 2440 has a second linear screw drive 2442 that opens (FIG. 68) and closes (FIG. 43) a second vent 2444 associated with a second port 2446. A third motor 2450 has a third linear screw drive 2452 that opens (FIG. 42) and closes (FIG. 43) a third valve 2454 associated with a third port 2456. FIG. 44 shows a manifold 2460 that can be associated with the vent shut-off assembly 2422. A solenoid 2462 can further open and close vent pathways in the manifold 2460.

Figure 45:
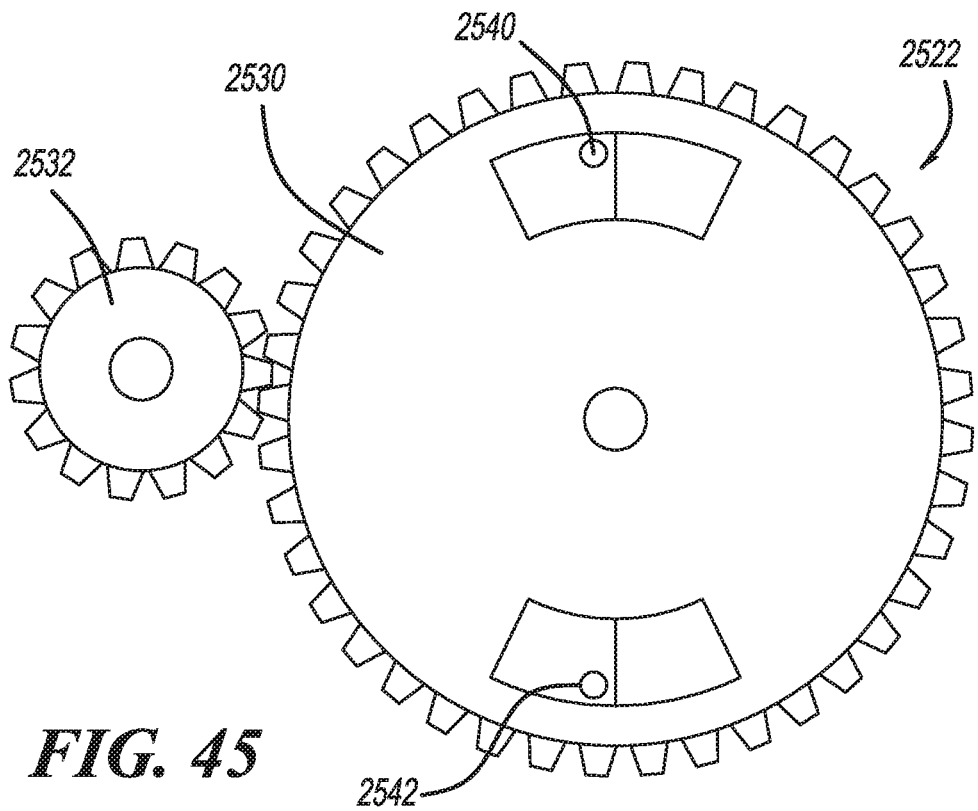
FIG. 45 is a schematic illustration of a vent shut-off assembly constructed in accordance to additional features of the present disclosure and shown with a central disc in a first position.
Figure 46:
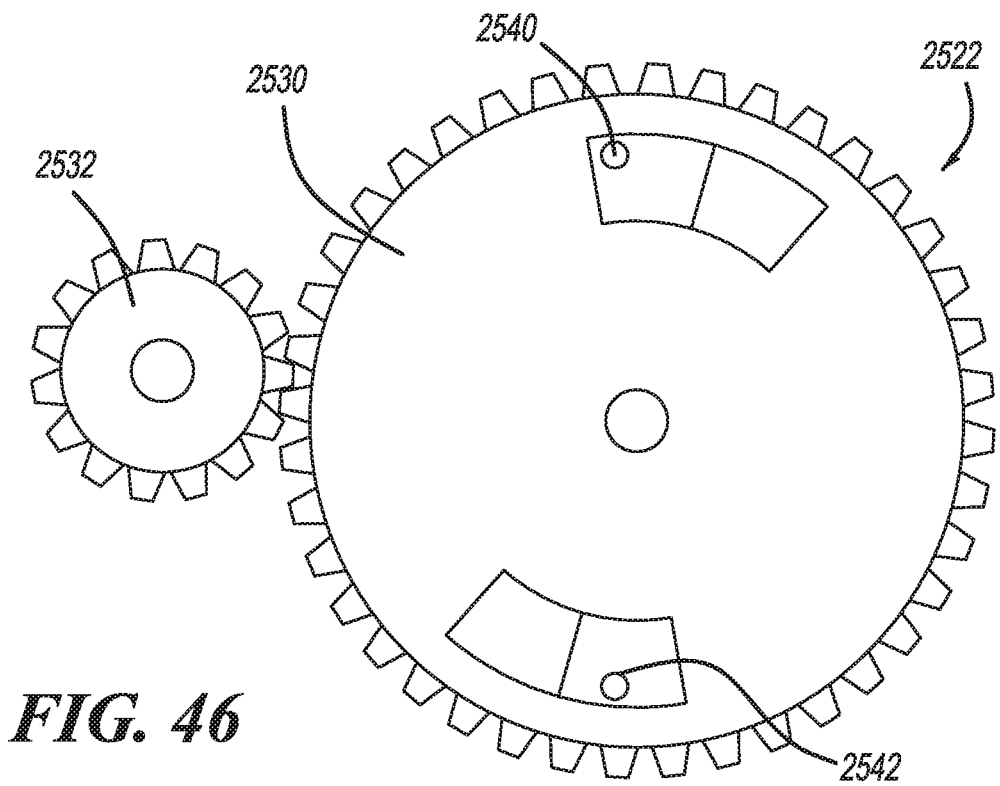
FIG. 46 is a schematic illustration of the vent shut-off assembly of FIG. 45 and shown with the central disc in a second position.
Figure 47:
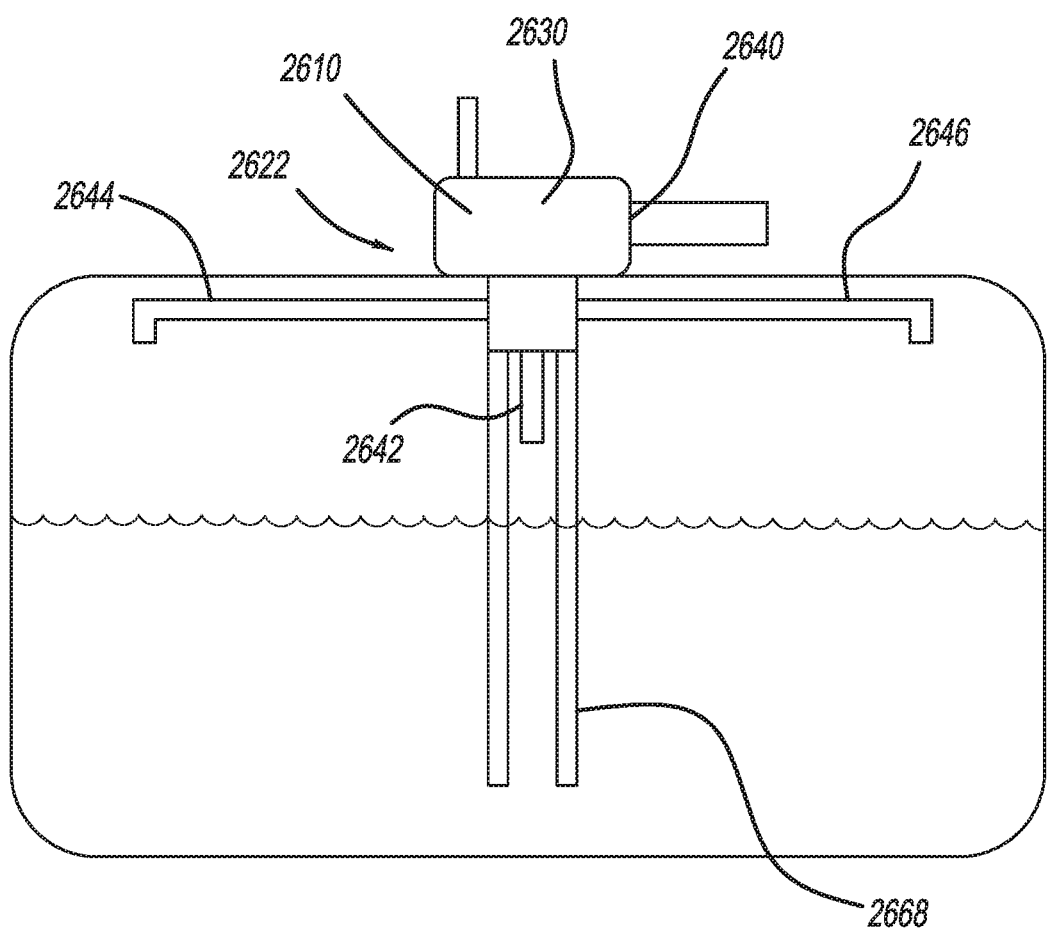
FIG. 47 is a schematic illustration of a valve control assembly constructed in accordance to one example of the present disclosure.
Figure 49:
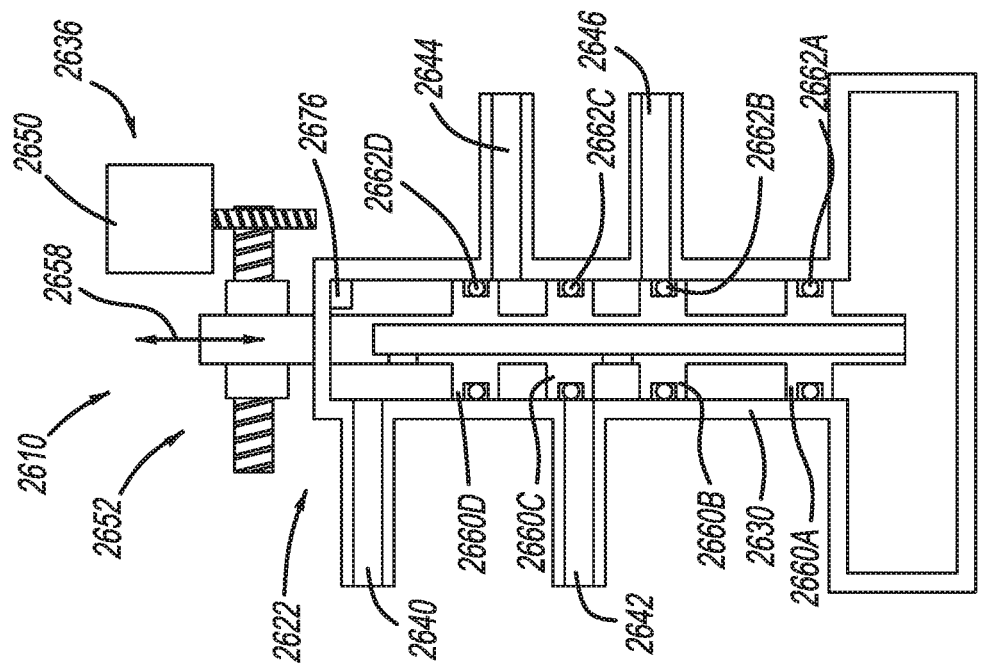
FIG. 49 is a sectional view of the valve shuttle and main housing of FIG. 48 and shown with the valve shuttle in a second position.
Figure 48:
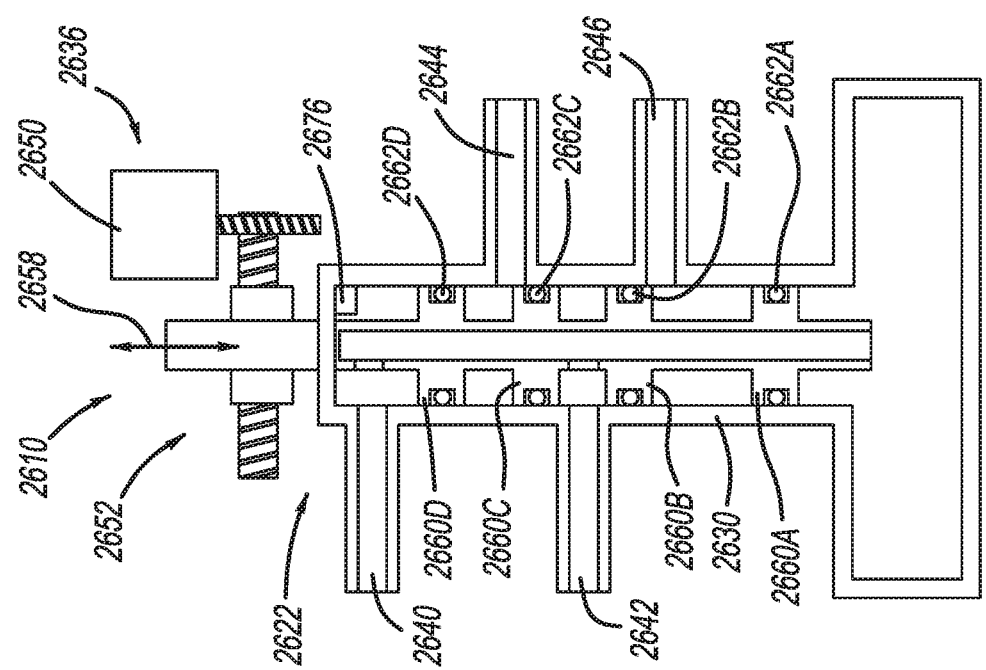
FIG. 48 is a sectional view of a valve shuttle and main housing shown with the valve shuttle in a first position.

FIGS. 45 and 46 illustrate a vent shut-off assembly 2522 constructed in accordance to additional features of the present disclosure. The vent shut-off assembly 2522 can be used in conjunction with any of the systems described herein. The vent shut-off assembly 2522 can includes a central disc 2530 that is rotated by a motor 2532. Push pins 2540 and 2542 are actuated open and closed as the central disc 2530 is rotated. The actuation can also be done linearly.

With reference now to FIGS. 47-59, a valve control assembly constructed in accordance to yet another example of the present disclosure is shown and generally identified at reference 2610. The valve control assembly 2610 includes a vent shut-off assembly 2622. The vent shut-off assembly 2622 can be used as part of an evaporative emissions control system in a fuel tank system. The vent shut-off assembly 2622 includes a main housing 2630, a valve shuttle 2632 that translates within the main housing 2630, and an actuator assembly 2636. The main housing 2630 can have a first vent port 2640 that is fluidly connected to the canister 1032, a second port 2642 that is fluidly connected to an FLVV, a third port 2644 that is fluidly connected to a first grade vent valve (GVV) and a fourth port 2646 that is fluidly connected to a second grade vent valve (GVV).

The actuator assembly 2636 can include a motor 2650, such as a DC motor that actuates a ball screw mechanism 2652. Actuation of the ball screw mechanism 2652 translates the valve shuttle 2632 in the direction of arrows 2658. In the example shown, the valve shuttle 2632 includes radially extending collars 2660A, 2660B, 2660C and 2660D that receive respective seal members or O-rings 2662A, 2662B, 2662C and 2662D therearound. A capacitor level sensor 2668 is shown in FIG. 46 that senses fuel level.

During driving mode, a first grade vent valve and FLVV can be partially opened in a saddle tank arrangement. During refueling mode, only the FLVV will be opened. The actuator assembly 2636 including ball screw mechanism 2652 can cooperate with a position sensor 2676 to provide precise linear movement response of the valve shuttle 2632. The capacitor 2668 level sensor can be a two capacitor level sensor that is fitted to measure level an also to evaluate pitch and roll angle. Based on fuel level and angle (roll/pitch) sensing, the electronic control unit will give signal to the actuator assembly 2636 to open one of the ports 2640, 2642, 2644 and 2646 through directional control valves. During electric mode on a hybrid vehicle, all ports 2640, 2642, 2644 and 2646 are closed. A liquid trap can be included to trap the fuel which can be drained back through a directional control valve opening.

Figure 50:
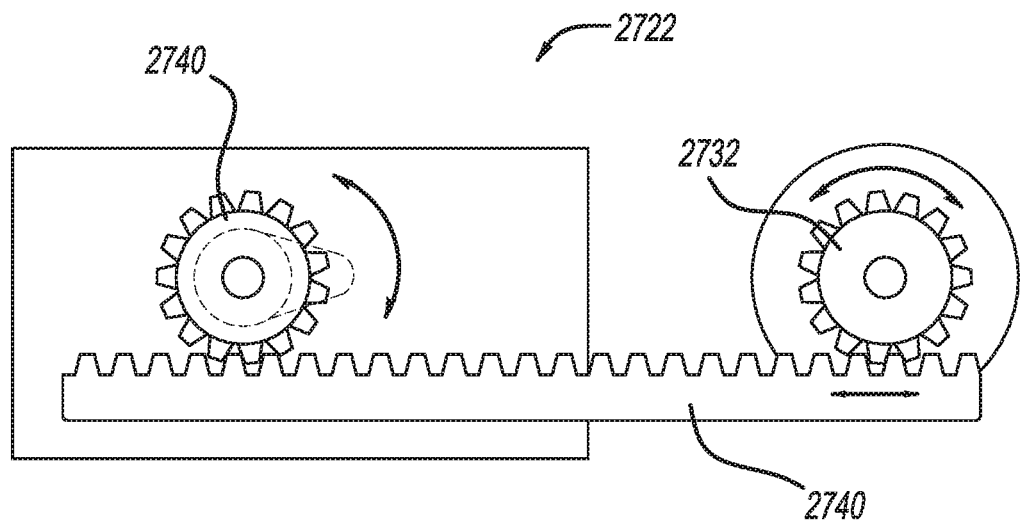
FIG. 50 is a sectional view of a vent shut-off assembly constructed in accordance to another example of the present disclosure and shown with a rack and driven gear in a first position.
Figure 51:
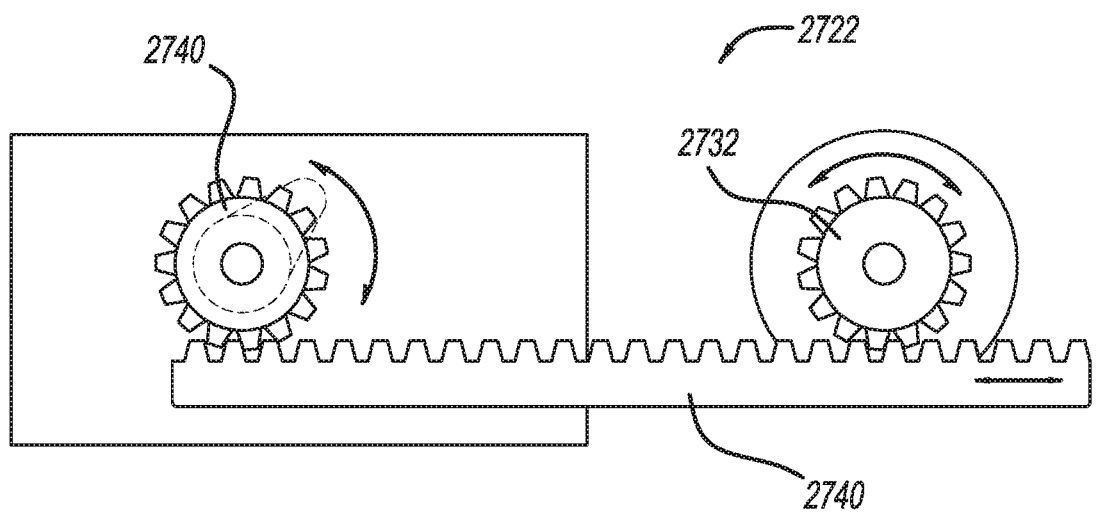
FIG. 51 is a sectional view of the vent shut-off assembly of FIG. 50 and shown with the rack and driven gear in a second position.

FIGS. 50 and 51 illustrate a vent shut-off assembly 2722 constructed in accordance to additional features of the present disclosure. The vent shut-off assembly 2722 can be used in conjunction with any of the systems described herein. In particular, the vent shut-off assembly 2722 may be used in place of the valve actuation assembly 1110 described above with respect to FIG. 6. In this regard, instead of a central rotating camshaft, the vent shut-off assembly 2722 includes a rack and pinion assembly 2730 having a drive gear 2732 driven by a motor 2734 and a driven gear 2740. A rack 2740 is meshingly engaged to both of the drive gear 2732 and the driven gear 2740. Rotation of the drive gear 2732 causes translation of the rack 2740 and consequently rotation of the driven gear 2740. The driven gear 2740 can rotate a single cam or a collection of cams such as described above with respect to FIG. 6.

Figure 52:
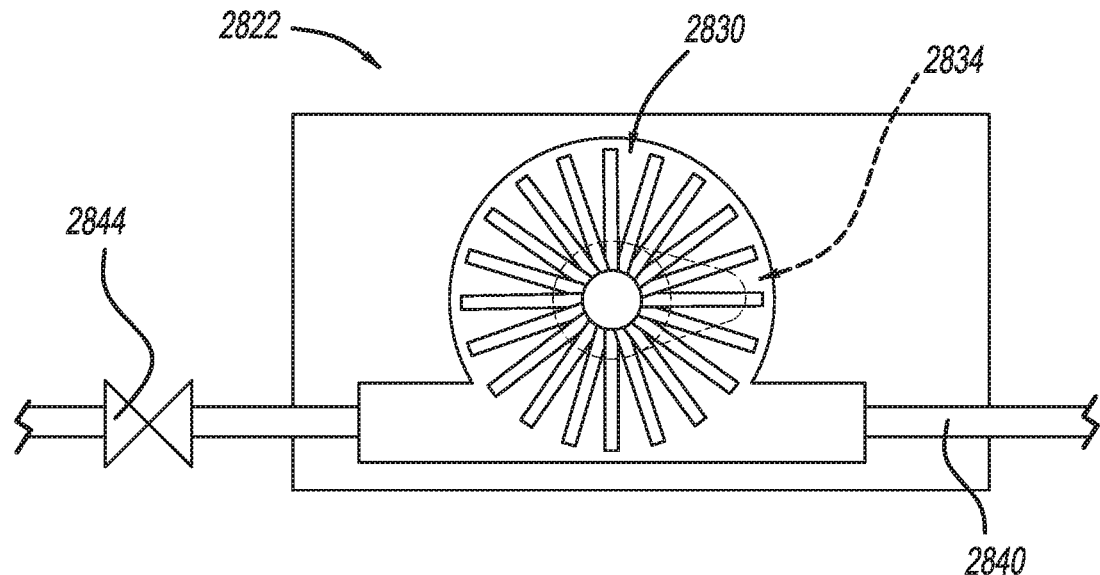
FIG. 52 is a schematic illustration of a hydraulically driven vent shut-off assembly constructed in accordance to another example of the present disclosure and shown with a cam assembly in a first position.
Figure 53:
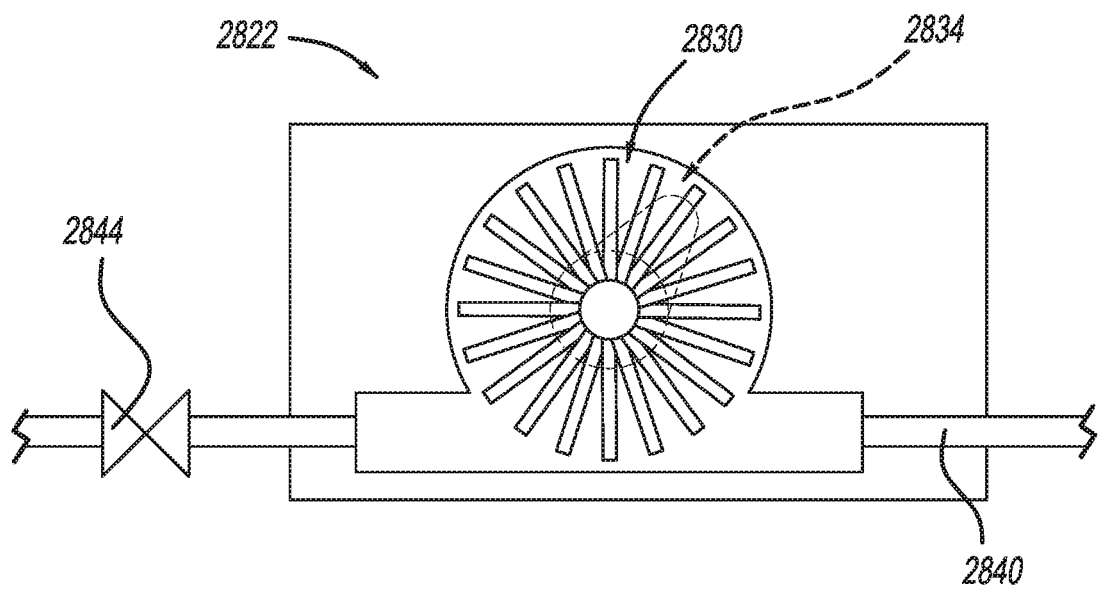
FIG. 53 is a schematic illustration of the vent shut-off assembly of FIG. 52 and shown with the cam assembly in a second position.

FIGS. 52 and 53 illustrate a vent shut-off assembly 2822 constructed in accordance to another example of the present disclosure. The vent shut-off assembly 2822 can be used in conjunction with any of the systems described herein. The vent shut-off assembly 2822 can be pneumatically driven. In this regard, a motor 2830 can drive a cam assembly 2834, such as described in any of the above configurations. An air or vacuum source 2840 can drive the cam assembly 2834. A control valve 2844 can be fluidly connected to the vacuum source 2840. A braking mechanism and/or a position sensing mechanism can further be included.

Figure 54:
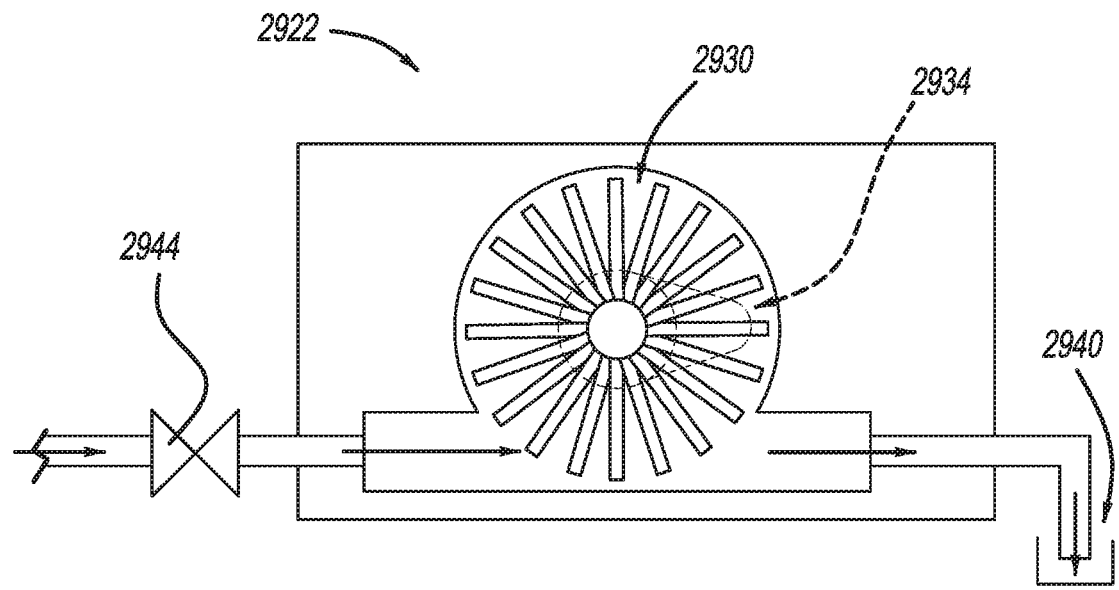
FIG. 54 is a schematic illustration of a pneumatically driven vent shut-off assembly constructed in accordance to another example of the present disclosure and shown with a cam assembly in a first position.
Figure 55:
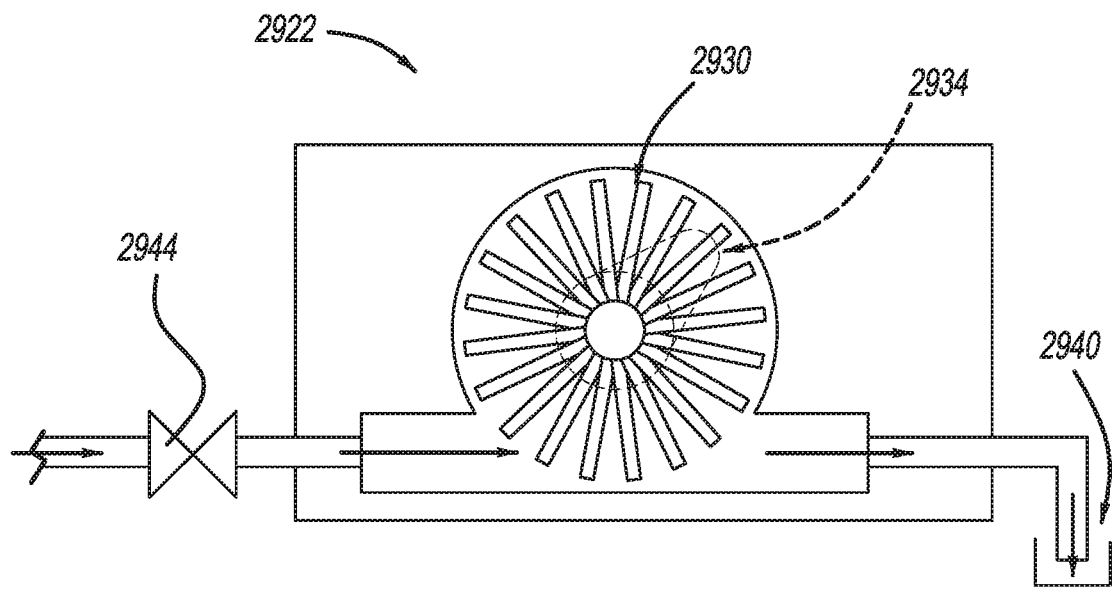
FIG. 55 is a schematic illustration of the vent shut-off assembly of FIG. 54 and shown with the cam assembly in a second position.

FIGS. 54 and 55 illustrate a vent shut-off assembly 2922 constructed in accordance to another example of the present disclosure. The vent shut-off assembly 2922 can be used in conjunction with any of the systems described herein. The vent shut-off assembly 2922 can be hydraulically driven. In this regard, a motor 2930 can drive a cam assembly 2934, such as described in any of the above configurations. A hydraulic source 2940 can drive the cam assembly 2934. A control valve 2944 can be fluidly connected to the hydraulic source 2940. A braking mechanism and/or a position sensing mechanism can further be included.

Figure 56:
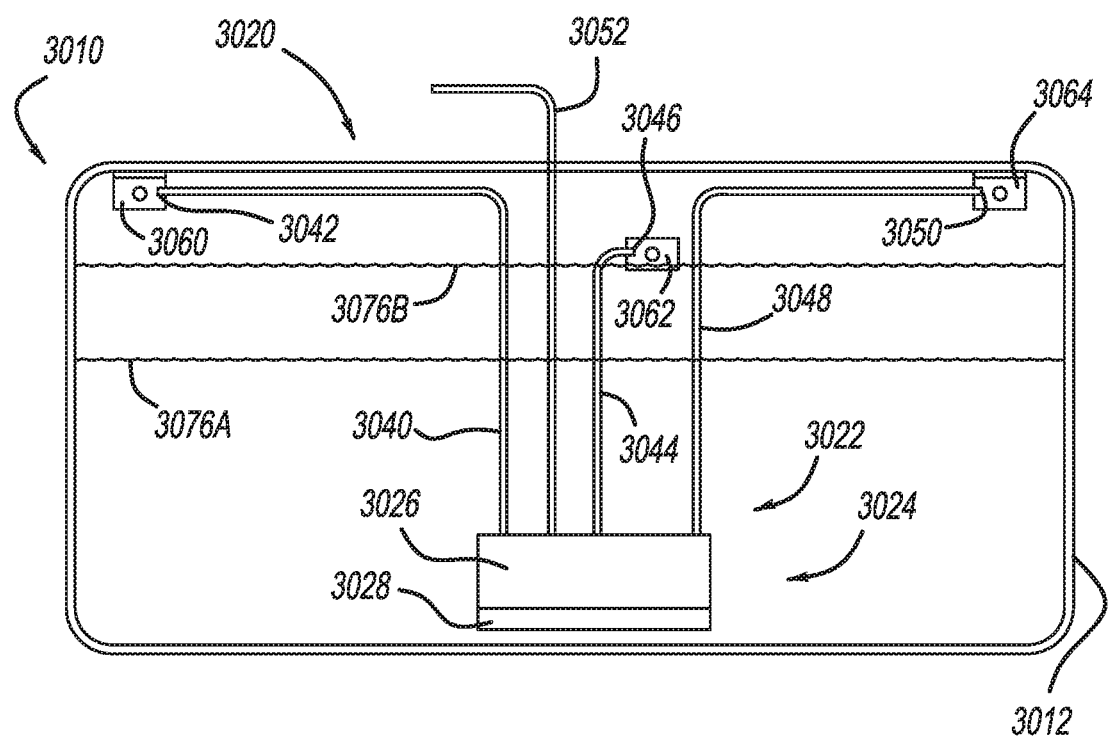
FIG. 56 is a schematic illustration of a fuel tank system constructed in accordance with additional features of the present disclosure and incorporating a refueling baffle.
Figure 57:
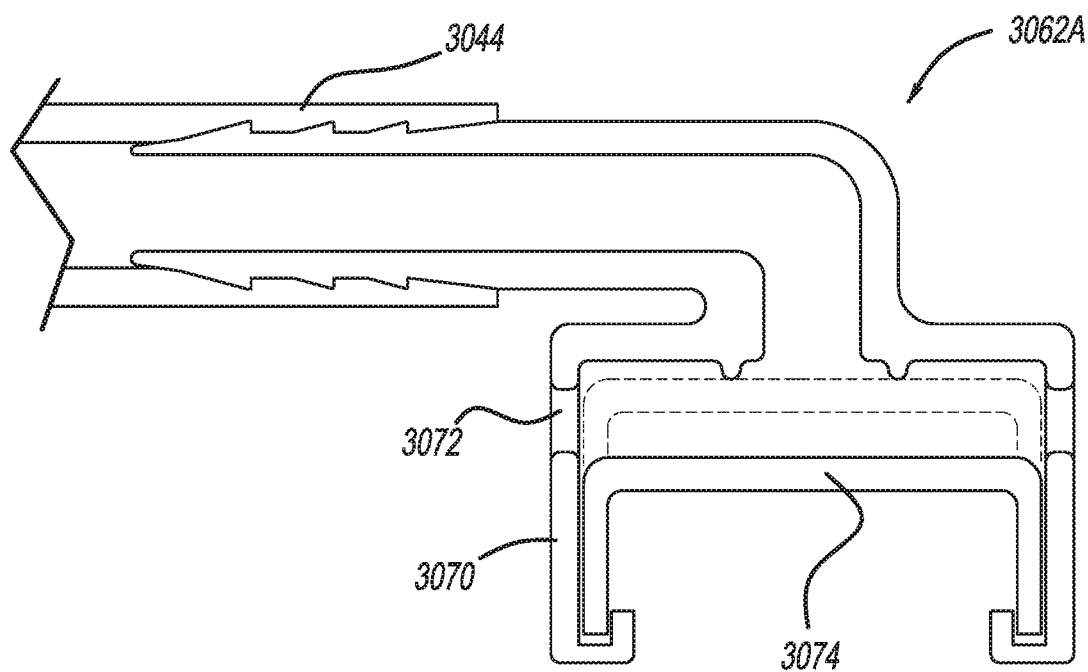
FIG. 57 is a sectional view of a refueling baffle constructed in accordance to one example of the present disclosure and shown with a cut in a first open position (solid line) and a second closed position (phantom line)
Figure 58:
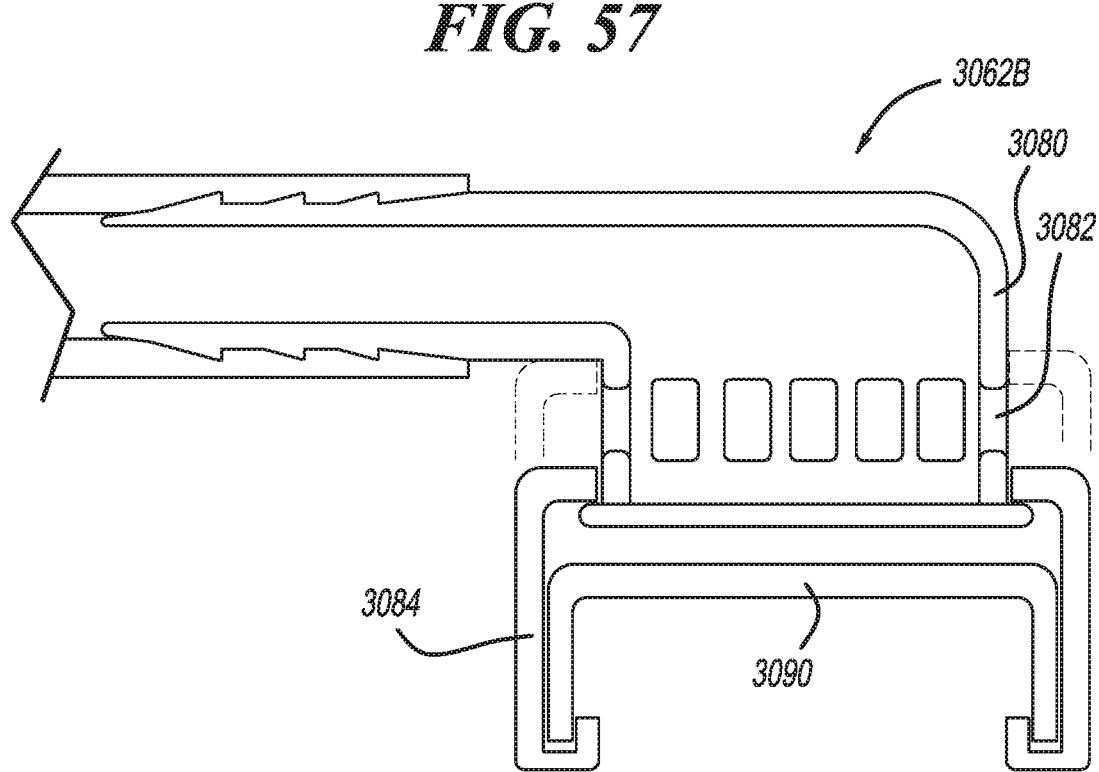
FIG. 58 is a sectional view of a refueling baffle constructed in accordance to another example of the present disclosure and shown with a cut in a first open position (solid line) and a second closed position (phantom line)
Figure 59A:
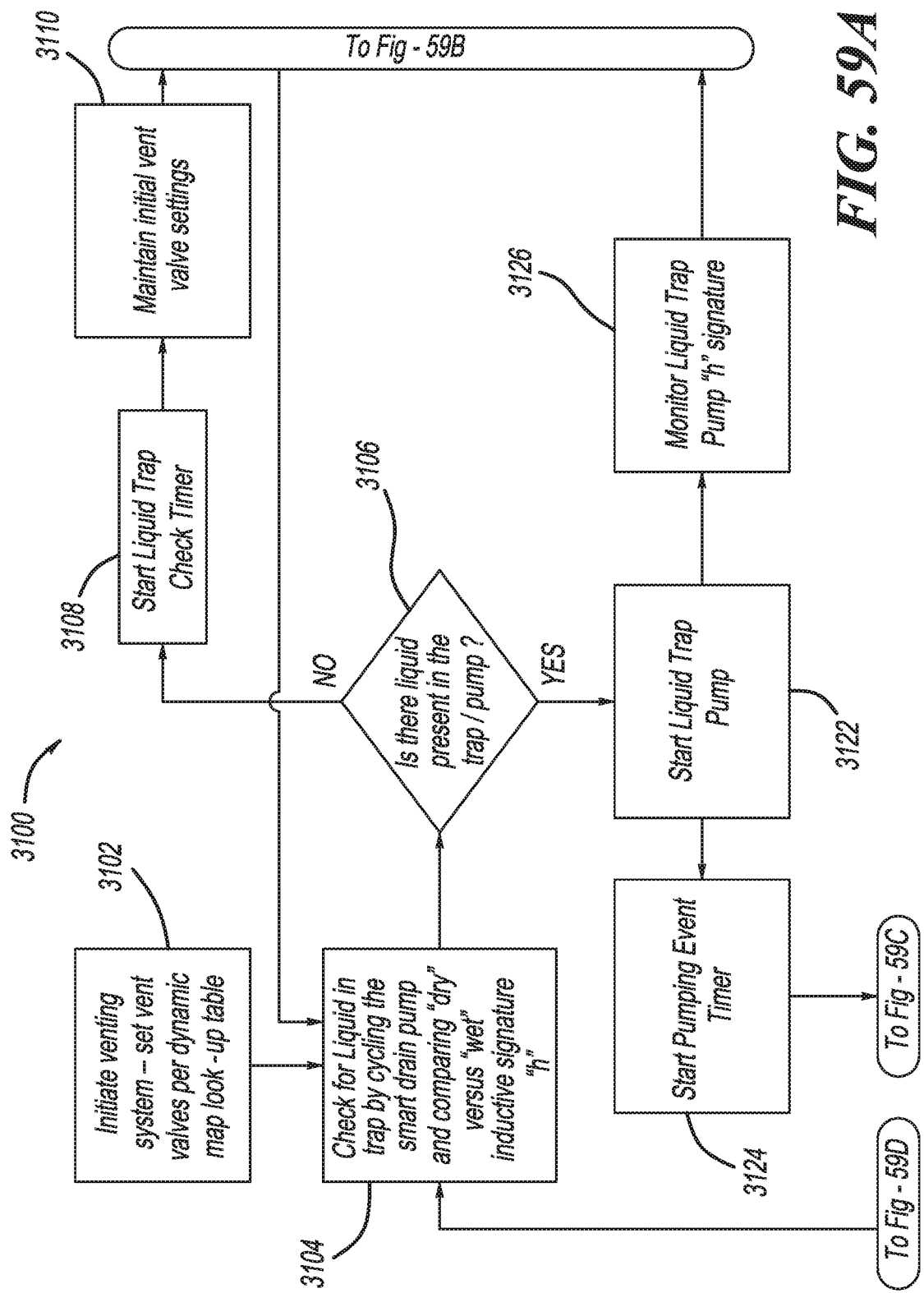
FIGS. 59A-59D illustrate an exemplary method of controlling a fuel tank system according to one example of the present disclosure.
Figure 59B:
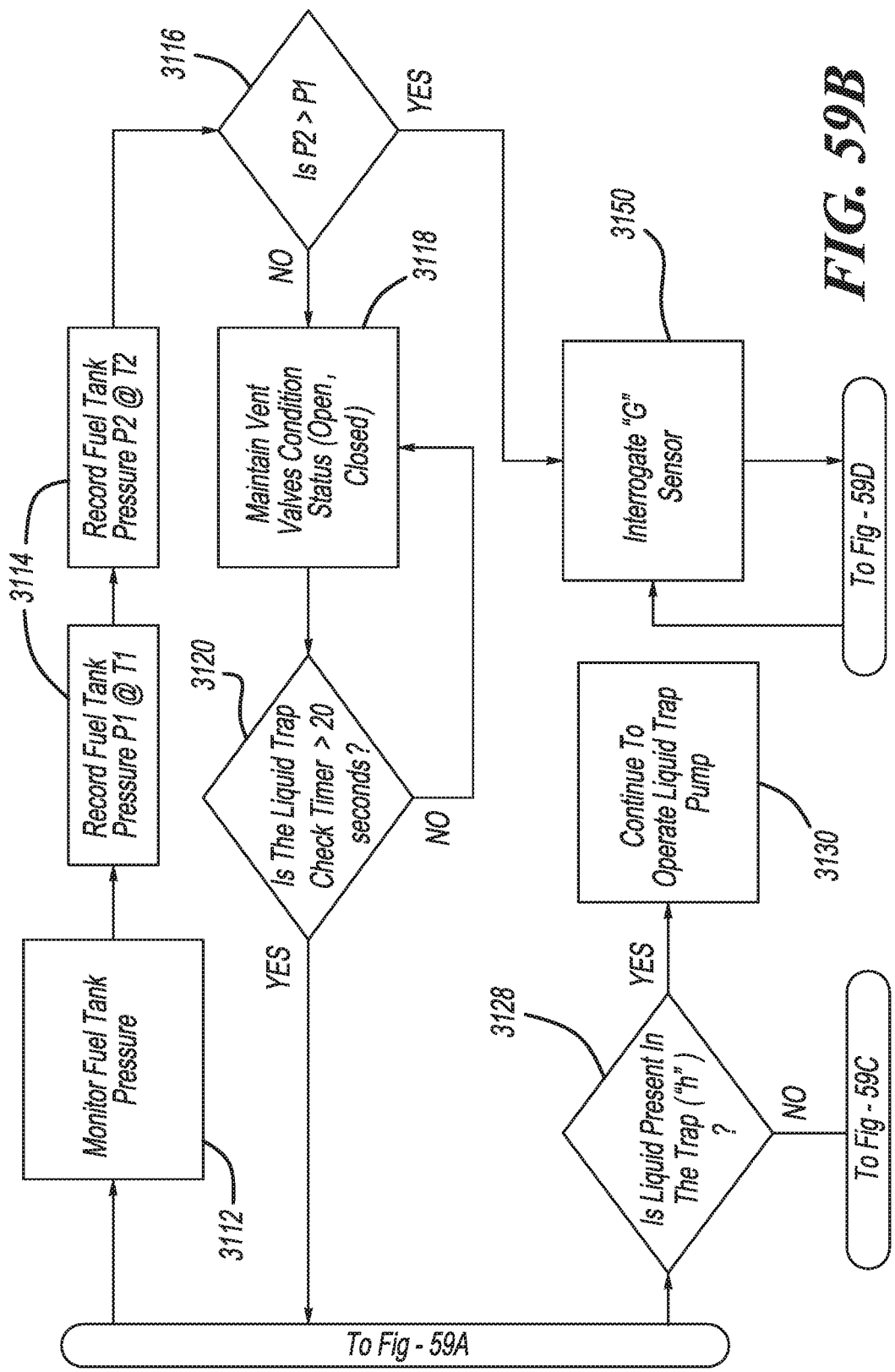
Figure 59C:
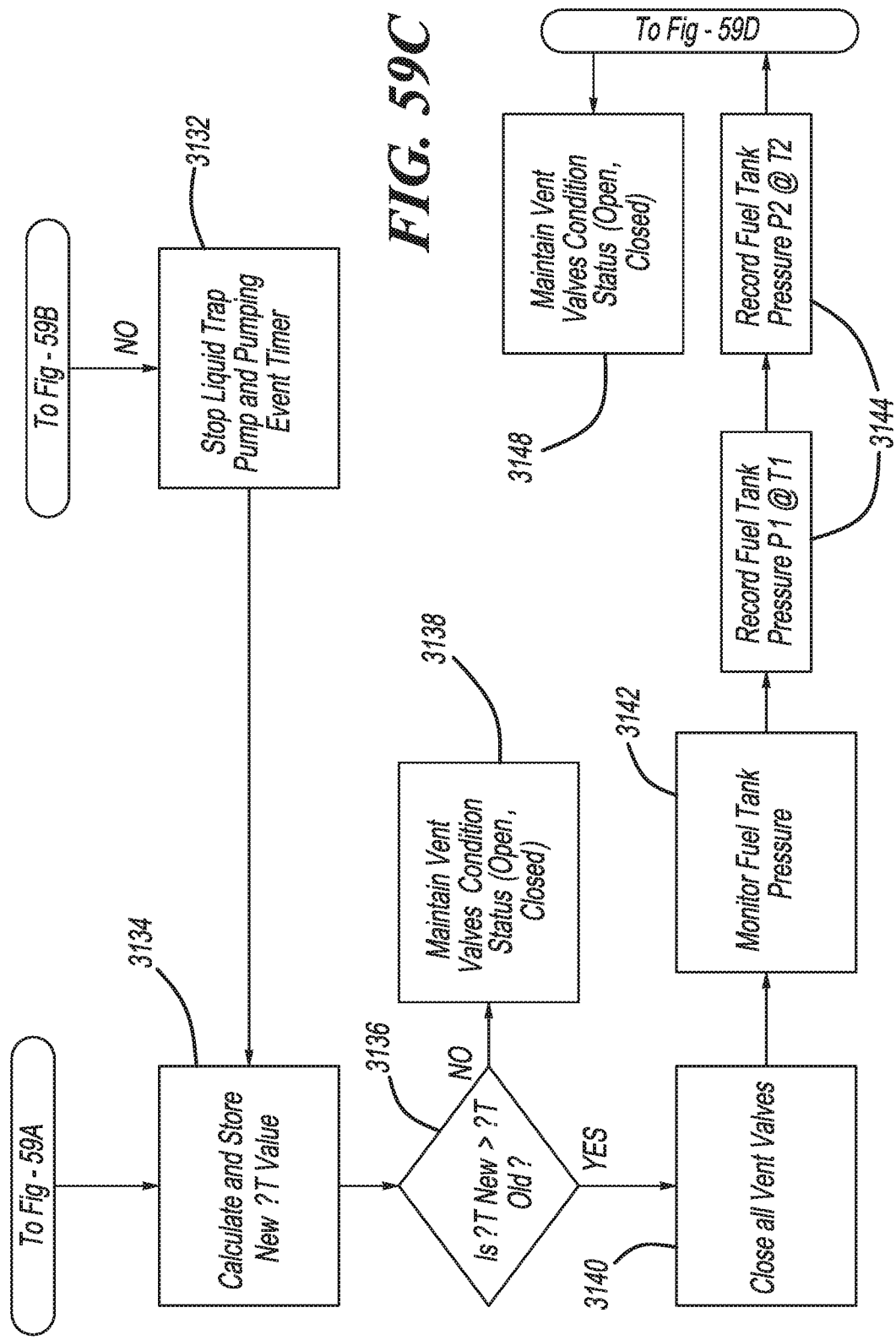
Figure 59D:
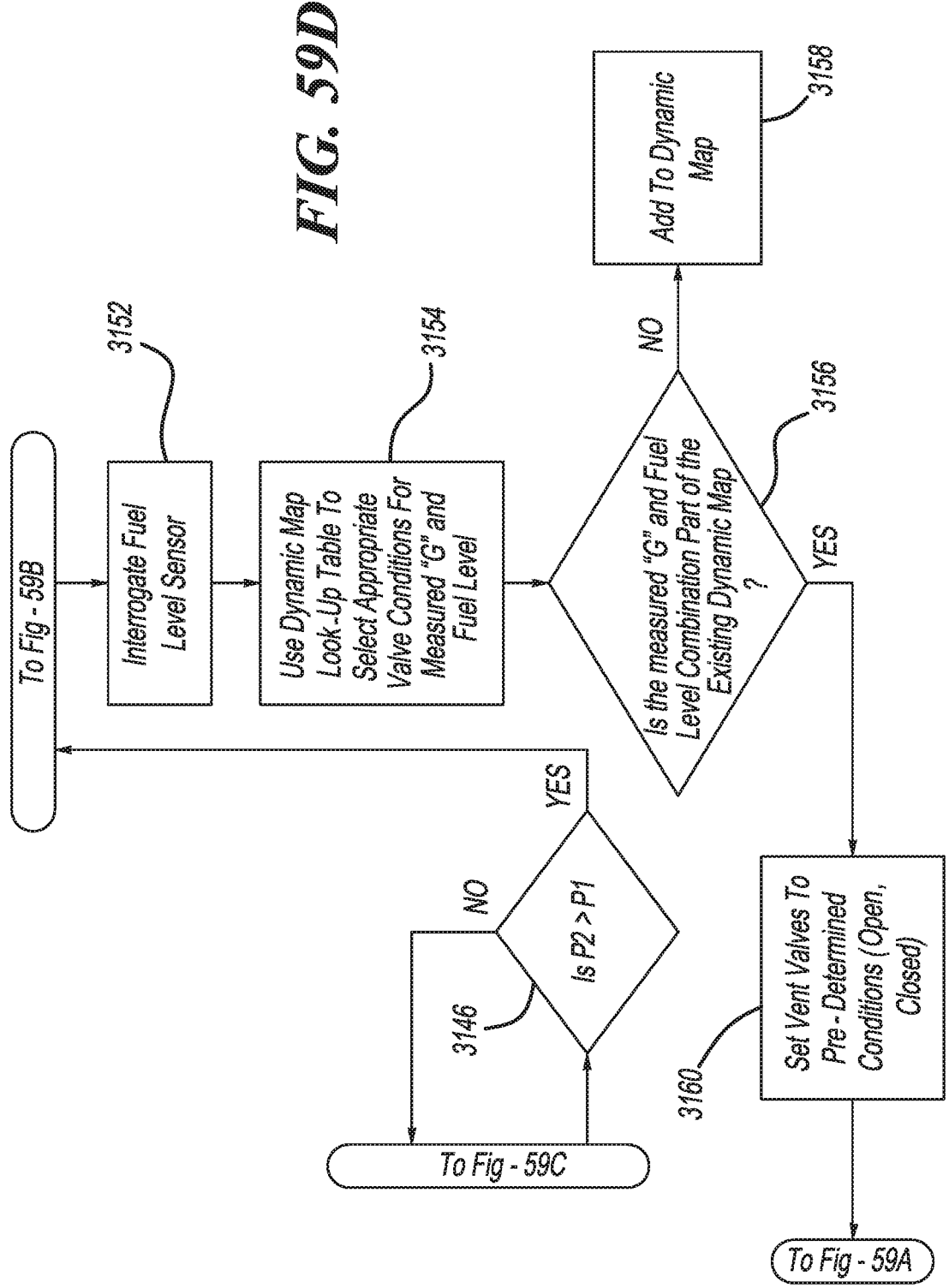
Figure 60:
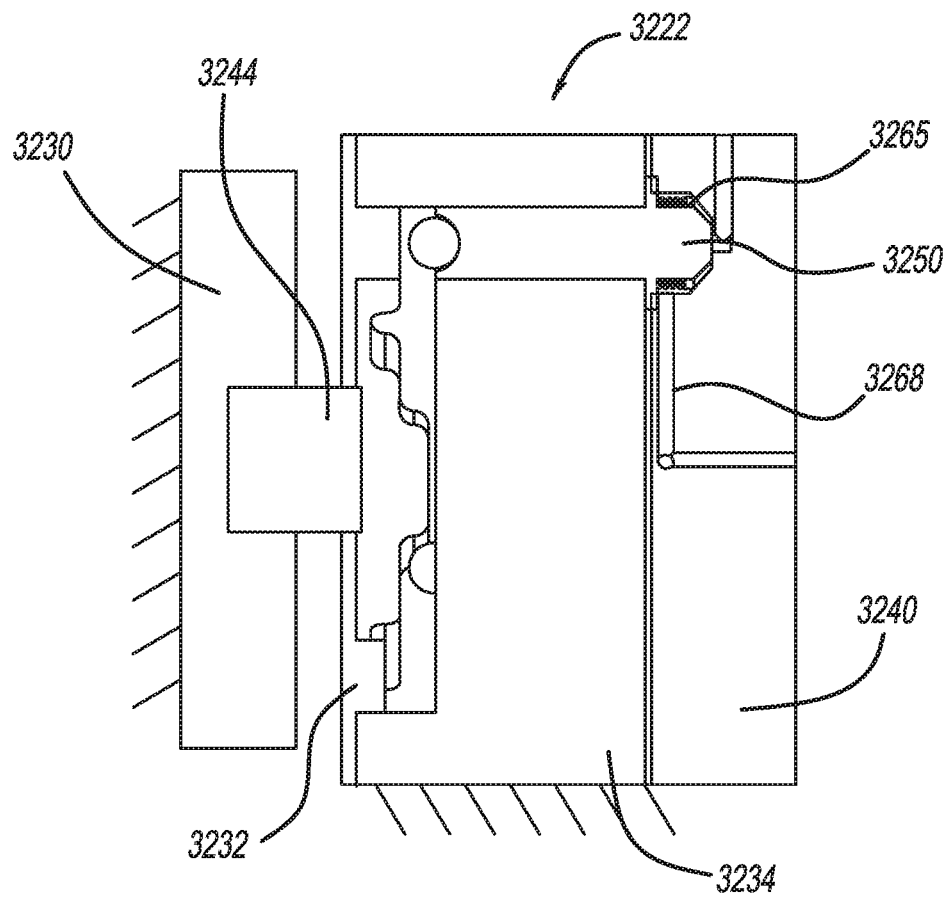
FIG. 60 is a sectional view of a vent shut-off assembly constructed in accordance to another example of the present disclosure.
Figure 63:
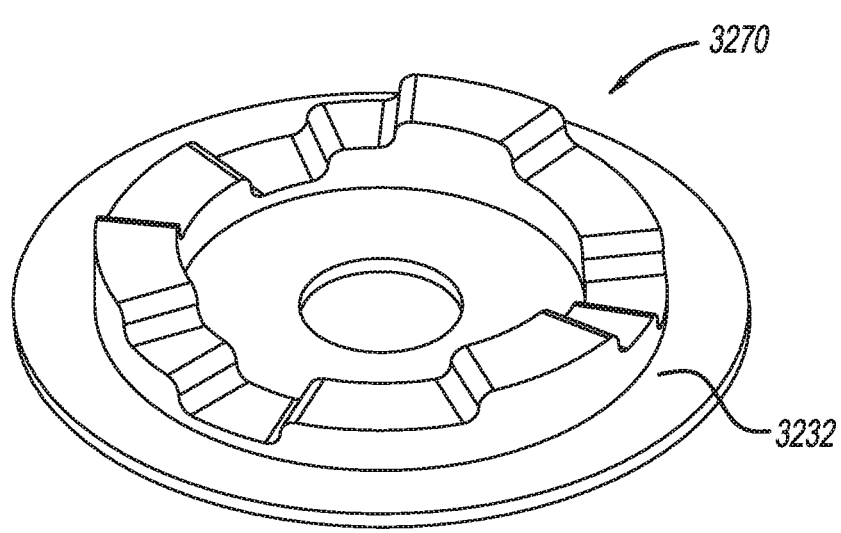
FIG. 63 is a top perspective view of the disk of FIG. 62.
Figure 62:
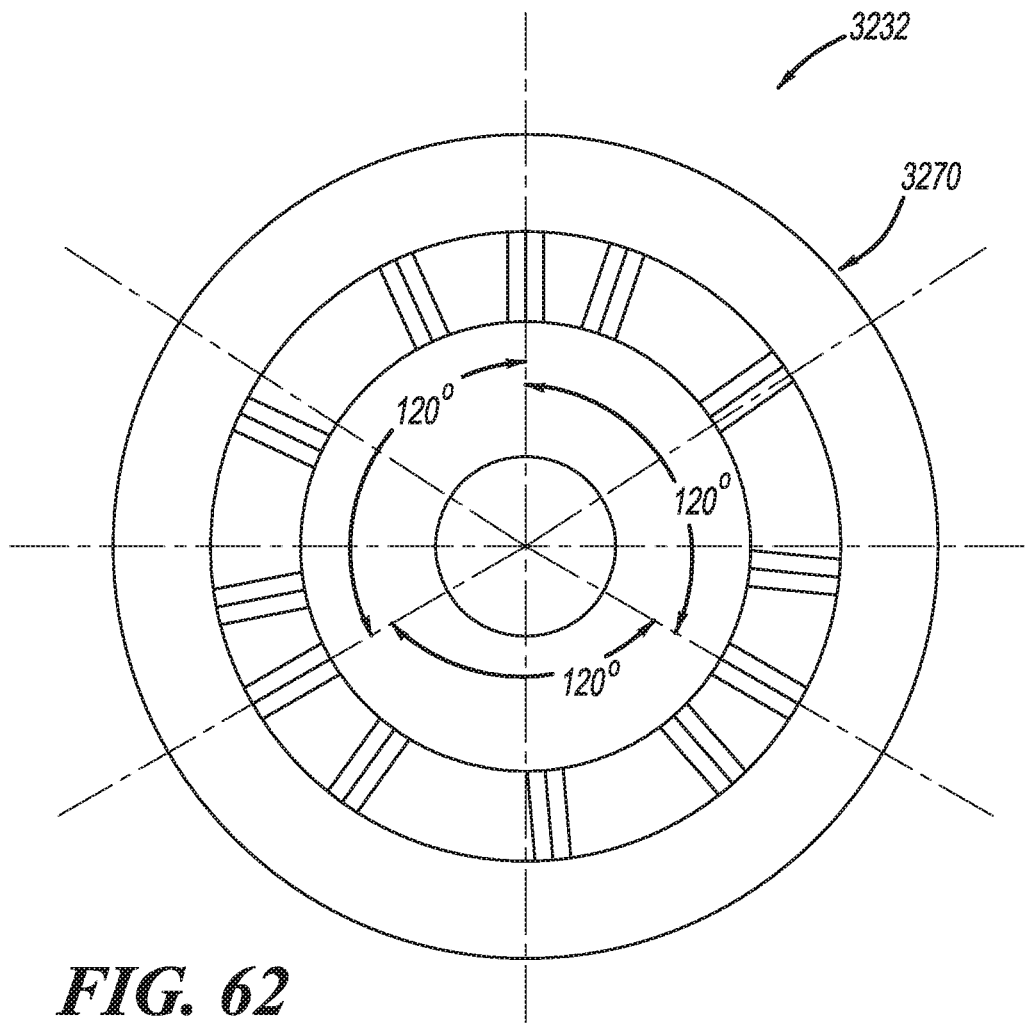
FIG. 62 is a top view of a disk of the vent shut-off assembly of FIG. 60.
Figure 64:
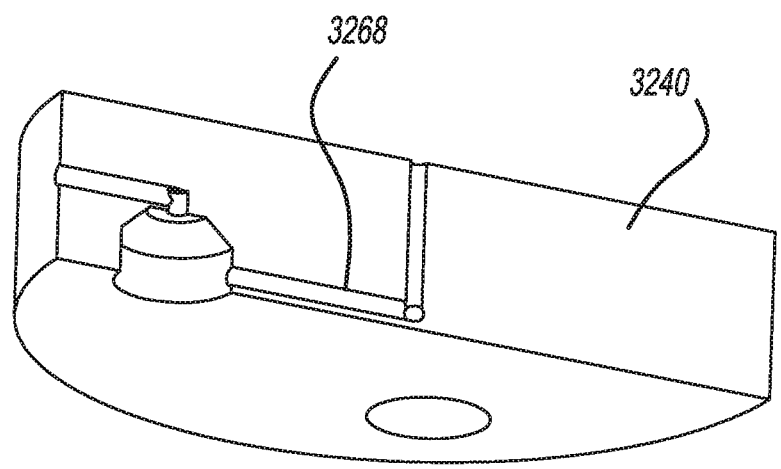
FIG. 64 is a partial sectional view of a manifold of the vent shut-off assembly of FIG. 60.

With reference now to FIGS. 56-58, a fuel tank system 3010 arranged on a fuel tank 3012 having an evaporative emissions control system 3020 constructed in accordance to additional features of the present disclosure will be described. Unless otherwise described, the fuel system 3010 and evaporative emissions control system 3020 can be constructed similarly to the evaporative emissions control system 1020 discussed above. The fuel tank system 3010 provides a mechanical shut-off that will prevent fuel tank overfilling in the case of power loss.

The evaporative emissions control system 3020 generally includes a vent shut-off assembly 3022 having a manifold assembly 3024. A liquid trap 3026 and pump 3028 can be arranged in the manifold assembly 3024. that routs to a first line 3040 having a first outlet 3042, a second vent line 3044 having a second outlet 3046, a third vent line 3048 having a third outlet 3050 and a fourth vent line 3052 that routs to a canister (see canister 1032). Baffles 3060, 3062 and 3064 can be arranged at the first, second and third outlets 3042, 3046 and 3050.

The baffle 3062 is a refueling baffle arranged in elevation lower than the first and third outlets 3042 and 3050. The refueling baffle 3062 includes a flow shut-off mechanism 3066 that moves from an open position to a closed position based on liquid fuel rising.

A baffle 3062A constructed in accordance to one example of the present disclosure is shown in FIG. 57. The baffle 3062A includes a baffle housing 3070 that defines windows 3072 therein. A cup 3074 is slidably received by the baffle housing 3070 and is configured to rise from the solid position shown in FIG. 57 to the phantom position shown in FIG. 57. In the solid position, vapor flow is permitted through the windows 3072 and through the second vent line 3044 to the liquid trap 3026. When fuel rises beyond a desired fuel fill level 3076A to a higher fuel fill level 3076B, the cup 3074 rises to the closed position shown in phantom where vapor flow is inhibited from passing through the windows 3072 and to the second vent line 3044 to the liquid trap 3026.

A baffle 3062B constructed in accordance to another example of the present disclosure is shown in FIG. 58. The baffle 3062B includes a baffle housing 3080 that defines windows 3082 therein. A cup 3084 is slidably mounted to the baffle housing 3080 and is configured to rise from the solid position shown in FIG. 58 to the phantom position shown in FIG. 58. In the solid position, vapor flow is permitted through the windows 3082 and through the second vent line 3044 to the liquid trap 3026. When fuel rises beyond a desired fuel fill level 3076A to a higher fuel fill level 3076B, the cup 3084 rises to the closed position shown in phantom where vapor flow is inhibited from passing through the windows 3082 and to the second vent line 3044 to the liquid trap 3026. A disk 3090 coupled to the cup 3084 can also rise to cover the opening of the baffle housing 3080 in the closed position.

With reference to FIG. 59A-59D, an example method 3100 of controlling a fuel tank system is described in reference to fuel tank system 1010. Method 3100 can enable the control module to learn and adapt from monitored conditions to optimize venting of the fuel tank system and maintain the fuel tank pressure and/or the trap liquid level at acceptable levels.

Method 3100 includes, at step 3102, initiating a venting system or evaporative emissions control 1020 and setting vent valves 1040, 1042 based on a dynamic map look-up table (e.g., a dynamic map holding conditions such as vent solenoid states, G-peak, G-avg., fuel tank pressure, bulk fuel tank temperature, and fuel level). At step 3104, control module 1030 checks for liquid in the liquid trap 1026, for example, by cycling the smart drain pump and comparing a "dry" and "wet" inducting signature "h". At step 3106, control module 1030 subsequently determines if liquid is present in the liquid trap 1026 and/or the jet pump. If liquid is not present, at step 3108, control module 1030 starts a liquid trap check timer.

At step 3110, control module 1030 maintains the initial settings of the vent valves 1040, 1042. At step 3112, control module 1030 monitors fuel tank pressure and, at step 3114, subsequently records fuel tank pressures P1 . . . Pn at a predetermined time intervals T1 . . . Tn. At step 3116, control module 1030 determines if a monitored pressure (e.g., P2) is greater than a previously monitored pressure (e.g., P1). If yes, control proceeds to step 3150 described below. If no, at step 3118, control module 1030 maintains the vent valves 1040, 1042 in the current position. At step 3120, control module 1030 determines if the liquid trap check time has exceeded a predetermined time (e.g., 20 seconds). If not, control returns to step 3118. If yes, control returns to step 3104.

If liquid is detected at step 3106, control moves to step 3122 or step 3124. At step 3122, control module 1030 activates the liquid trap jet pump and proceeds to step 3124 or 3126. At step 3126, control module 1030 monitors the inductive signature "h" of the jet pump. At step 3128, control module determines if liquid is present in the liquid trap based on the inductive signature "h". If liquid is present, control module 1030 continues to operate the jet pump at step 3130. Control then returns to step 3128. If liquid is not present, control proceeds to step 3132.

At step 3132, control module 1030 deactivates jet pump and the pumping event timer. At step 3134, control module 1030 calculates and stores a new ΔT indicative of how long the pump was operated. At step 3136, control module 1030 determines if the new ΔT is greater than a previous ΔT (e.g., "old ΔT"). If no, at step 3138, control module 1030 maintains the vent valves 1040, 1042 in the current position and may subsequently return to step 3104. If yes, at step 3140, control module 1030 closes all vent valves.

At step 3142, control module 1030 monitors pressure in the fuel tank 1012 and proceeds to step 3144, subsequently records fuel tank pressures P1 . . . Pn at a predetermined time intervals T1 . . . Tn. At step 3146, control module 1030 determines if a monitored pressure (e.g., P2) is greater than a previously monitored pressure (e.g., P1). If no, at step 3148, control module 1030 maintains the vent valves 1040, 1042 in the current position. If yes, control proceeds to step 3150.

Returning to step 3150, control module 1030 monitors G-sensor 1060E and determined G-peak and G-avg over a predetermined time (e.g., five seconds). In step 3150, the control module 1030 determines the average "G" force applied to the system and records the G-peak. At step 3152, control module 1030 interrogates the fuel level sensor 1048.

At step 3154, control module 1030 uses a dynamic map look-up table to select appropriate valve conditions for the measured "G" and fuel level. At step 3156, control module 1030 determines if the captured system states are within predetermined limits. If no, control proceeds to step 3158. If yes, at step 3160, control module 1030 sets the vent valves to predetermined conditions at step 3160. If not, the control module 1030 adds to a dynamic map.

Figure 8:
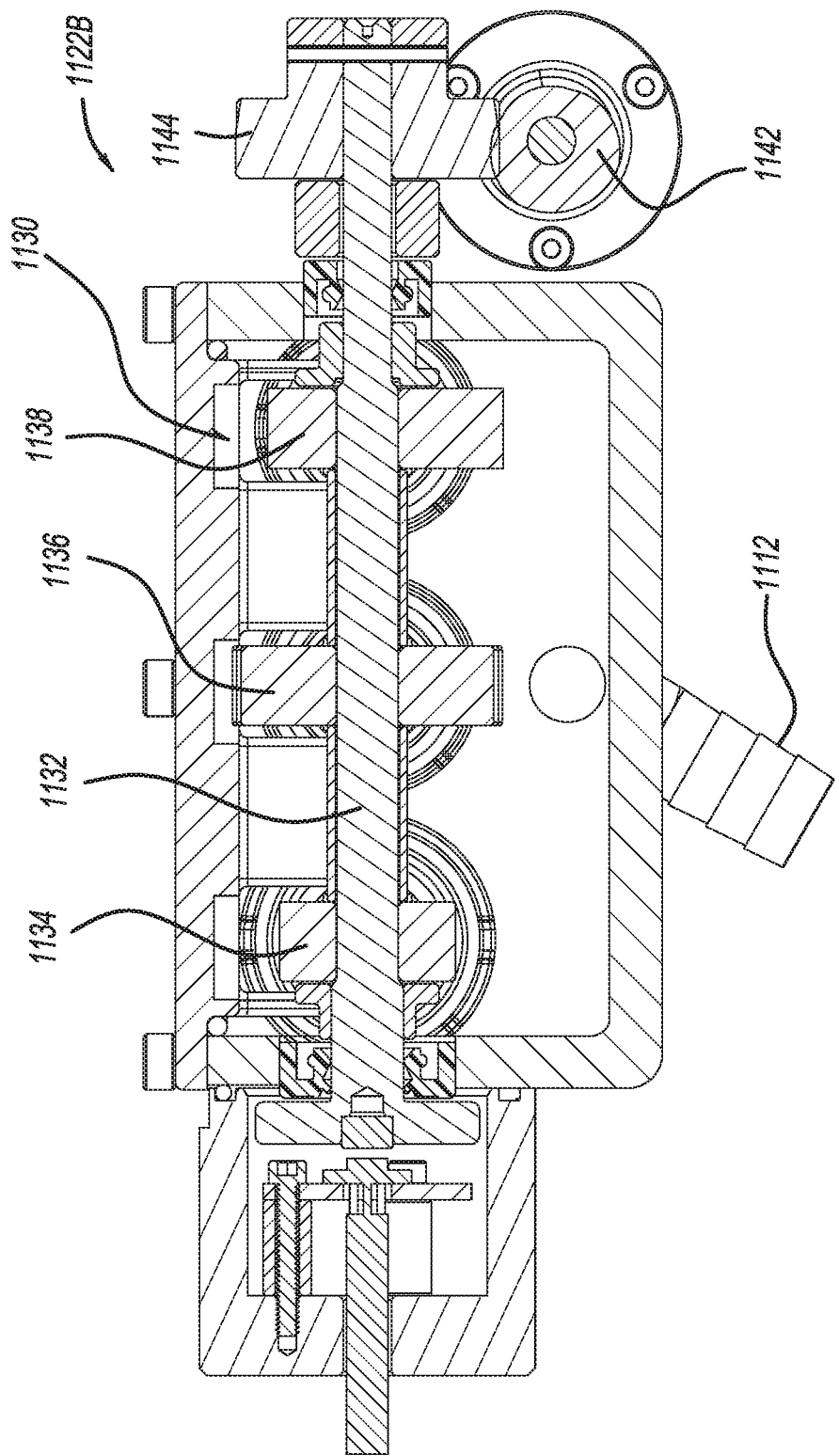
FIG. 8 is a sectional view of the vent shut-off assembly of FIG. 6 taken along lines 8-8.
Figure 9:
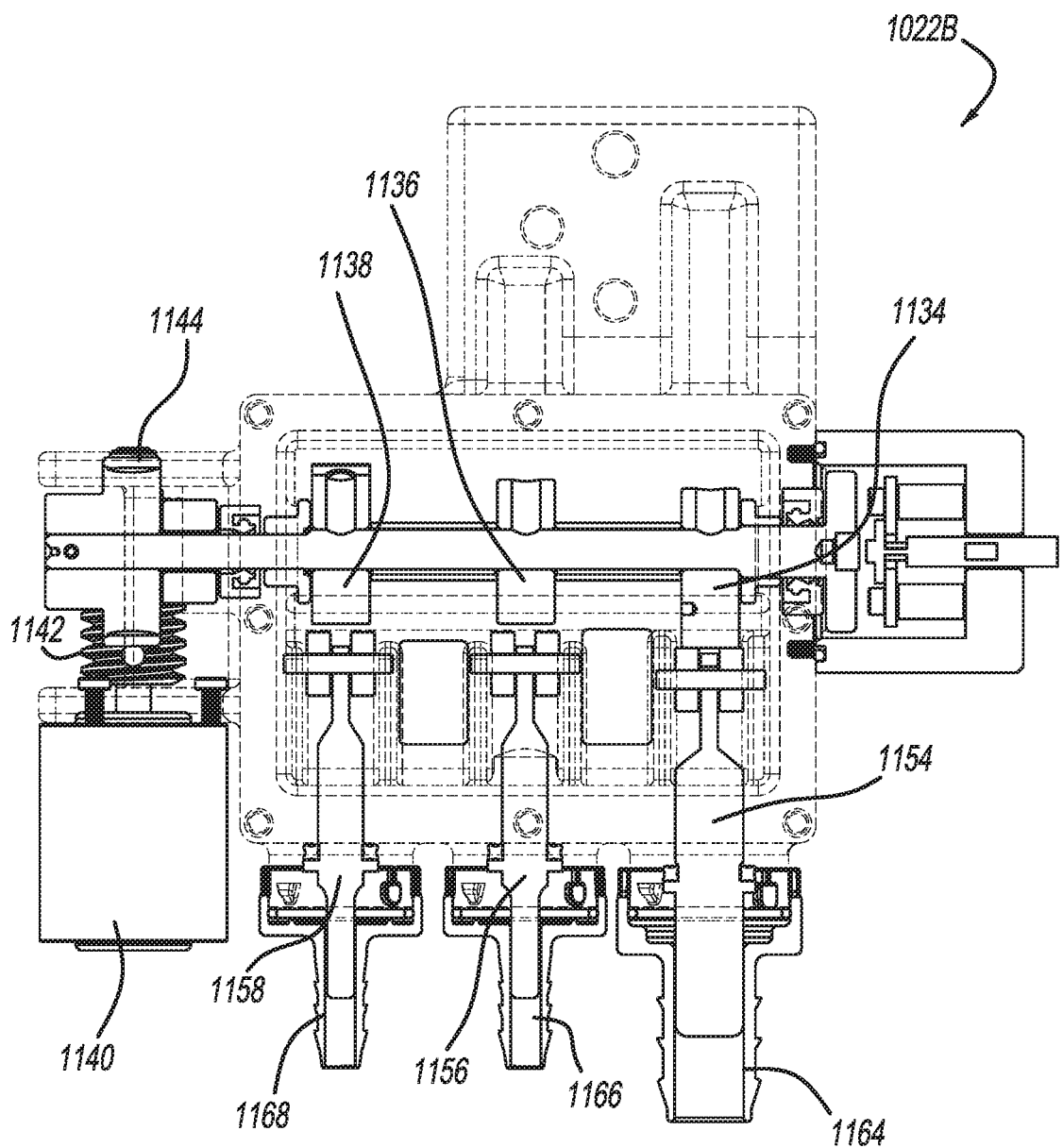
FIG. 9 is a sectional view of the vent shut-off assembly of FIG. 6 taken along lines 9-9.
Figure 10:
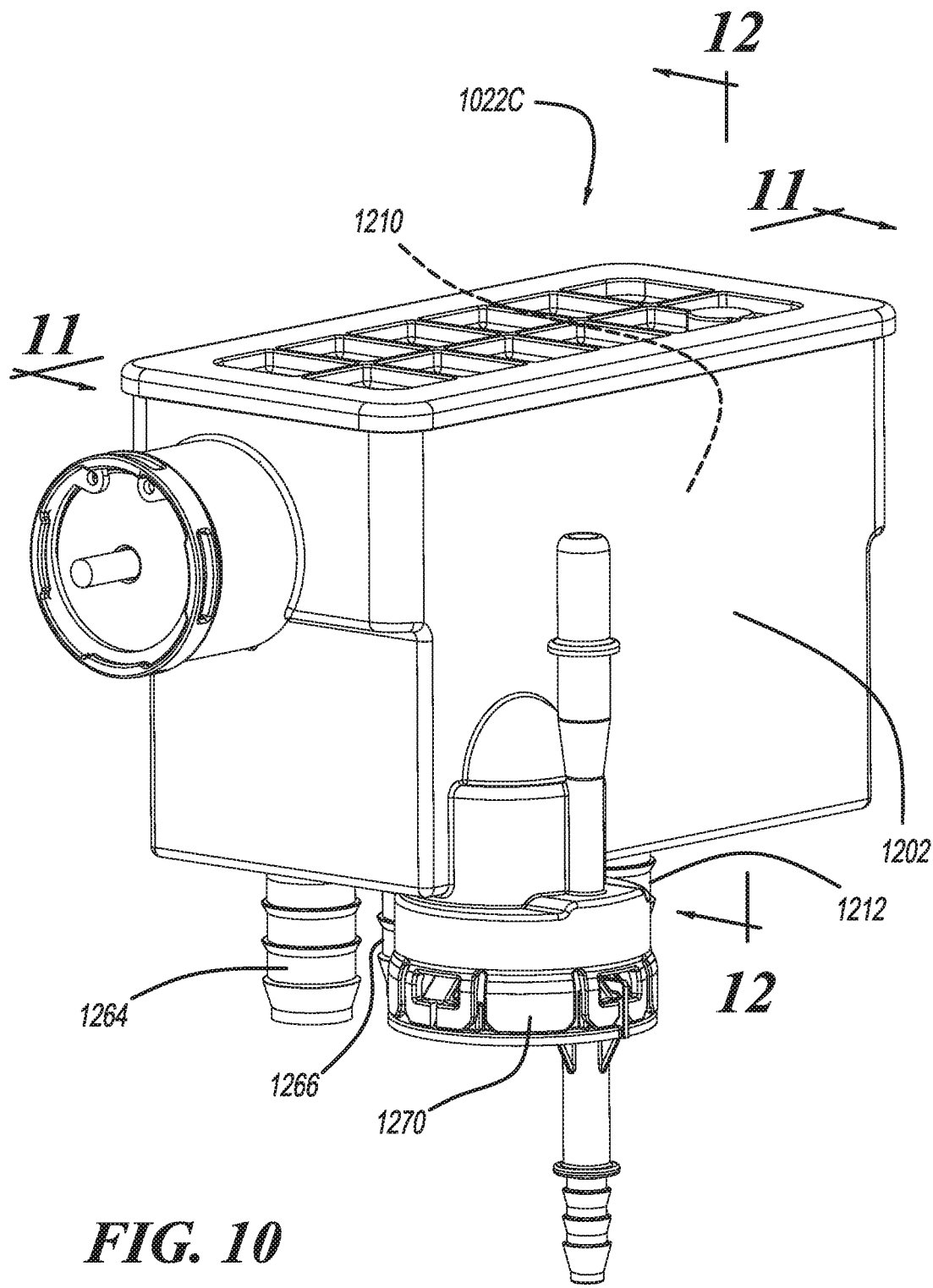
FIG. 10 is a front perspective view of a vent shut-off assembly constructed in accordance to another example of the present disclosure.
Figure 11:
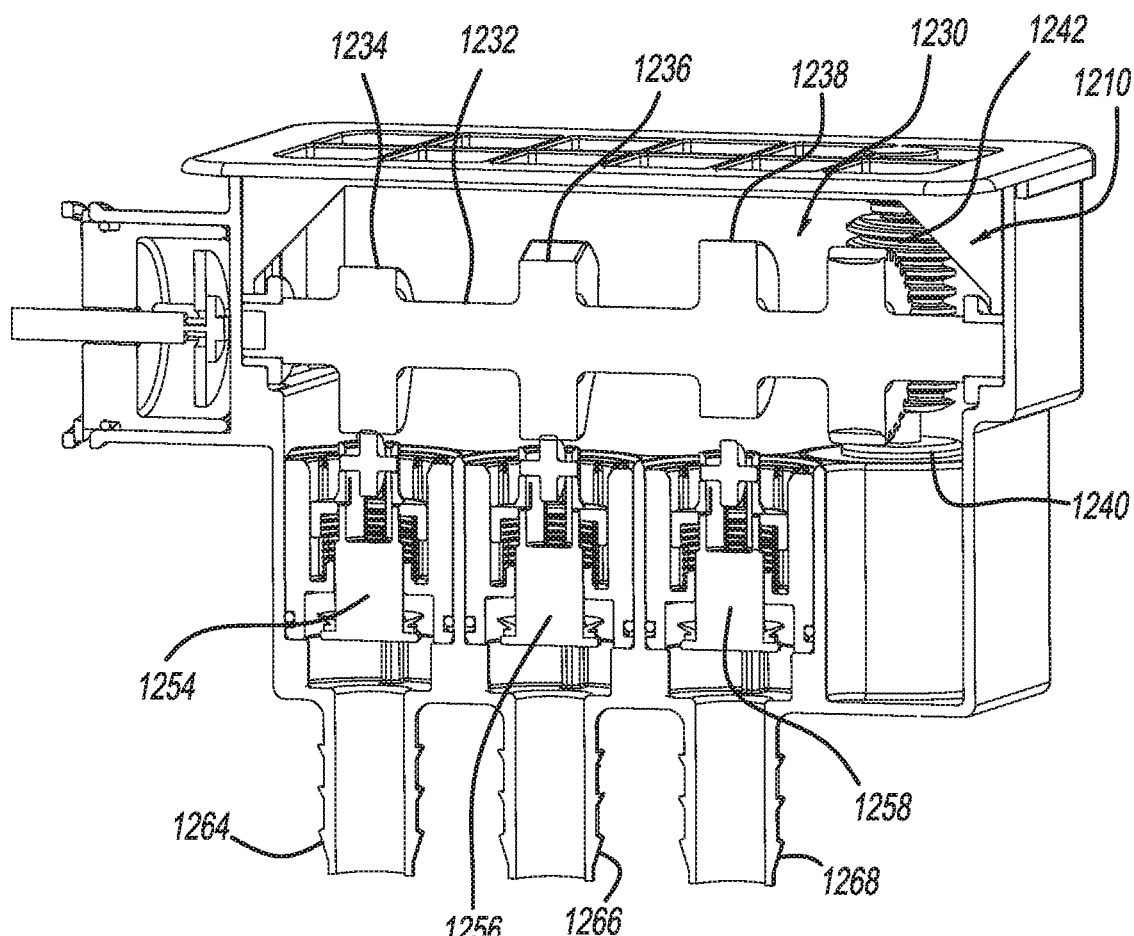
FIG. 11 is a sectional view of the vent shut-off assembly of FIG. 10 taken along lines 11-11.
Figure 12:
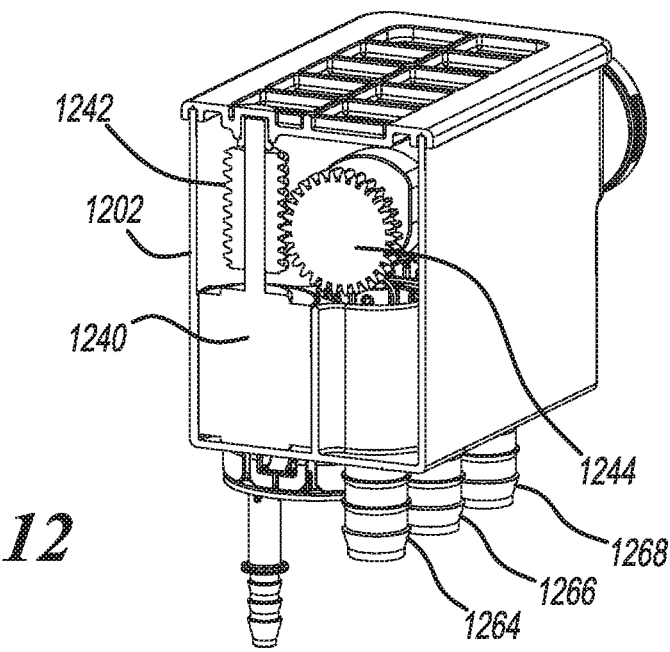
FIG. 12 is a sectional view of the vent shut-off assembly of FIG. 10 taken along lines 12-12.
Figure 14:
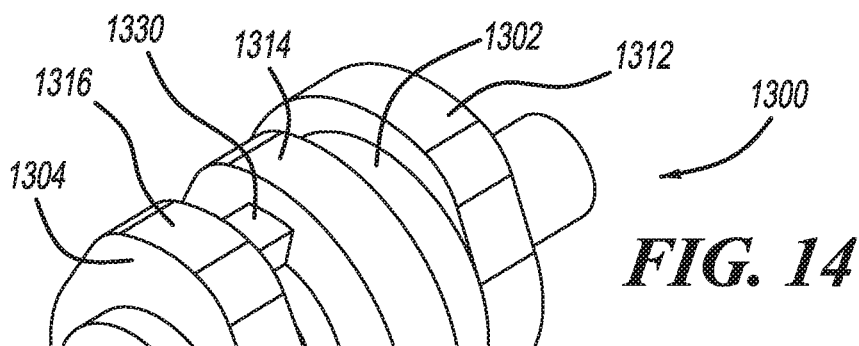
FIG. 14 is a front perspective view of a vent shut-off assembly constructed in accordance to another example of the present disclosure.
Figure 15:
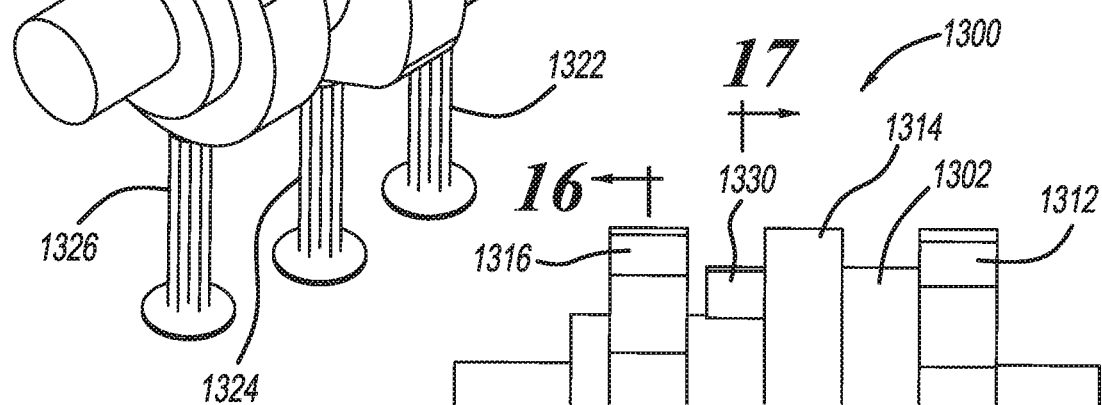
FIG. 15 is a front view of the vent shut-off assembly of FIG. 14.
Figure 16:
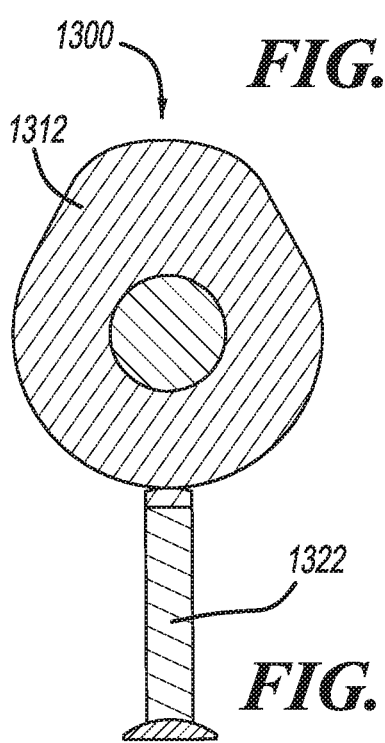
FIG. 16 is a sectional view of the vent shut-off assembly of FIG. 15 taken along lines 16-16.
Figure 17:
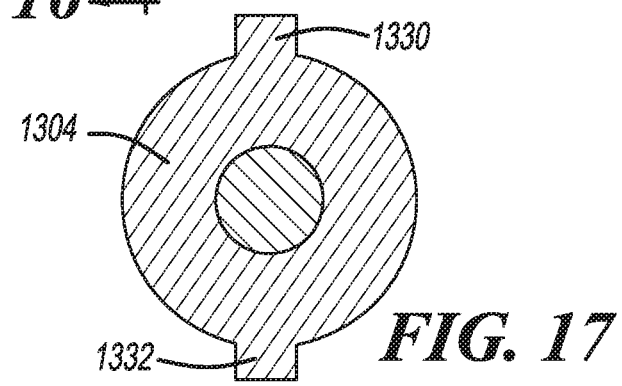
FIG. 17 is a sectional view of the vent shut-off assembly of FIG. 15 taken along lines 17-17.

Returning to FIG. 1, the energy storage device 1034 can include a capacitor, battery, pre-loaded valve or other device. The energy storage device 1034 can be connected to the vent shut-off assembly 1022 for providing power to the associated actuator (solenoids, motor etc.) in the event of power loss. The energy storage device 1034 has sufficient power to rotate the cam assembly 1130 (see FIG. 8) plus have logic that confirms the orientation of the shaft 1132. One example includes reading an encoder or accessing a last recorded angle from memory. Other examples are contemplated. The actuator assembly 1110 will rotate the shaft 1132 to a designated angle where the system will remain until power is restored. If the system is able to access current or recent accelerometer data and or fill volumes, the information can be used to define the state to rotate to. In other examples there may be a universal default state.

Exemplary fault states will now be described. If the accelerometer 1060E identifies the vehicle is upside down, all valves are rotated closed. If the accelerometer 1060E identifies a potential front end collision, valves associated with the front of the fuel tank are closed while valve associated with the rear of the fuel tank are open. If the accelerometer 1060E identifies the vehicle is at rest or cruise and the fuel volume is half-full, the actuator assembly 1110 rotates the shaft 1132 to open the first and second valves.

With reference now to FIGS. 60-64, a vent shut-off assembly 3222 constructed in accordance to another example of the present disclosure will be described. The vent shut-off assembly 3222 can be used with any of the actuator assemblies described herein for opening and closing various vent ports. In the example shown, the vent shut-off assembly 3222 includes an actuator assembly 3230, a cam disk 3232, a follower guide 3234 and a manifold 3240. In the example shown, the actuator assembly 3230 includes a rotary solenoid or stepper motor. The disk 3232 is mounted on an output shaft 3244 of the actuator assembly 3230.

First, second and third poppet valves 3250, 3252 and 3254 are arranged for translation along respective bores defined in the follower guide 3234. Each of the first, second and third poppet valves 3250, 3252 and 3254 have a cam follower 3260, 3262 and 3264, respectively at a terminal end thereof and an overmold rubber seal (identified at 3265) at an opposite end. The manifold 3240 defines various fluid paths such as fluid path 3268 to vent the fuel tank to various vents in the fuel tank such as described herein.

The cam plate 3232 includes a cam profile 3270 that includes various peaks and valleys. When the cam plate 3232 is rotated by the actuation assembly 3230, the cam profile 3270 engages the respective cam followers 3260, 3262 and 3264 and urges the respective first, second and third poppet valves 3250, 3252 and 3254 open and closed.

Figure 65:
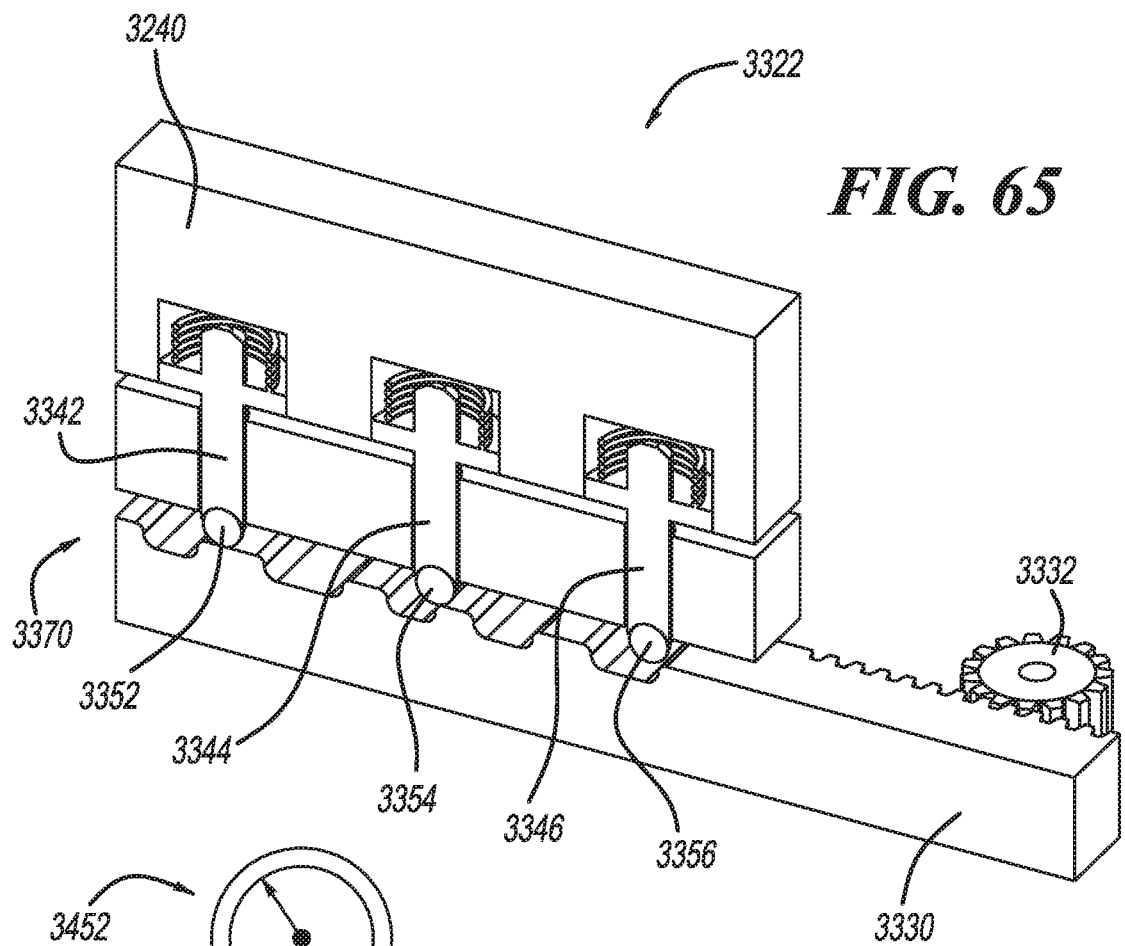
FIG. 65 is a sectional view of a vent shut-off assembly constructed in accordance to additional features of the present disclosure.

With reference to FIG. 65, a vent shut-off assembly 3322 constructed in accordance to another example of the present disclosure will be described. The vent shut-off assembly 3322 can be used with any of the actuator assemblies described herein for opening and closing various vent ports. The vent shut-off assembly 3322 includes a rack and pinion arrangement having a rack 3330 that is caused to translate due to rotation of a pinion 3332. The pinion 3332 can be driven by a DC motor such as disclosed herein. A manifold 3340 includes first, second and third poppet valves 3342, 3344 and 3346. Each of the first, second and third poppet valves 3342, 3344 and 3346 have a respective cam follower 3352, 3354 and 3356 arranged on a distal end for engaging a linear cam profile 3370 arranged on the rack 3330.

Figure 66:
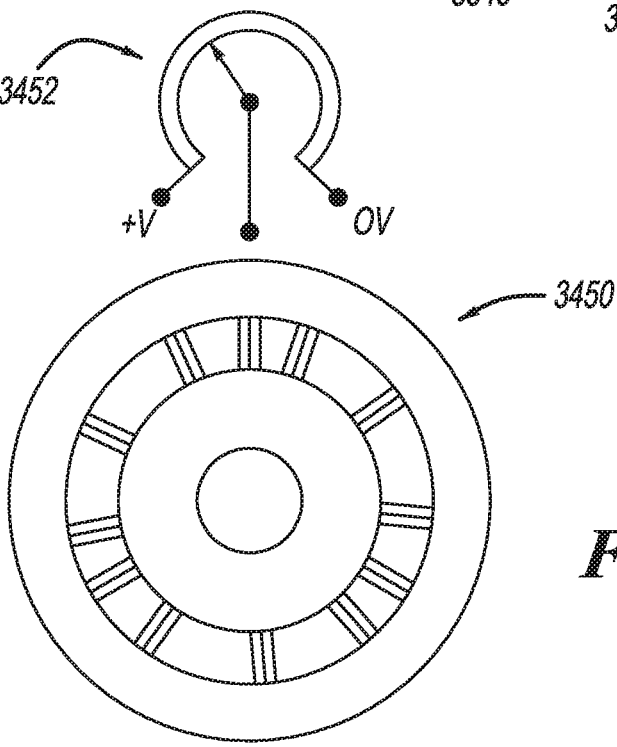
FIG. 66 is a partial schematic view of a sensing arrangement according to one example of the present disclosure.
Figure 67:
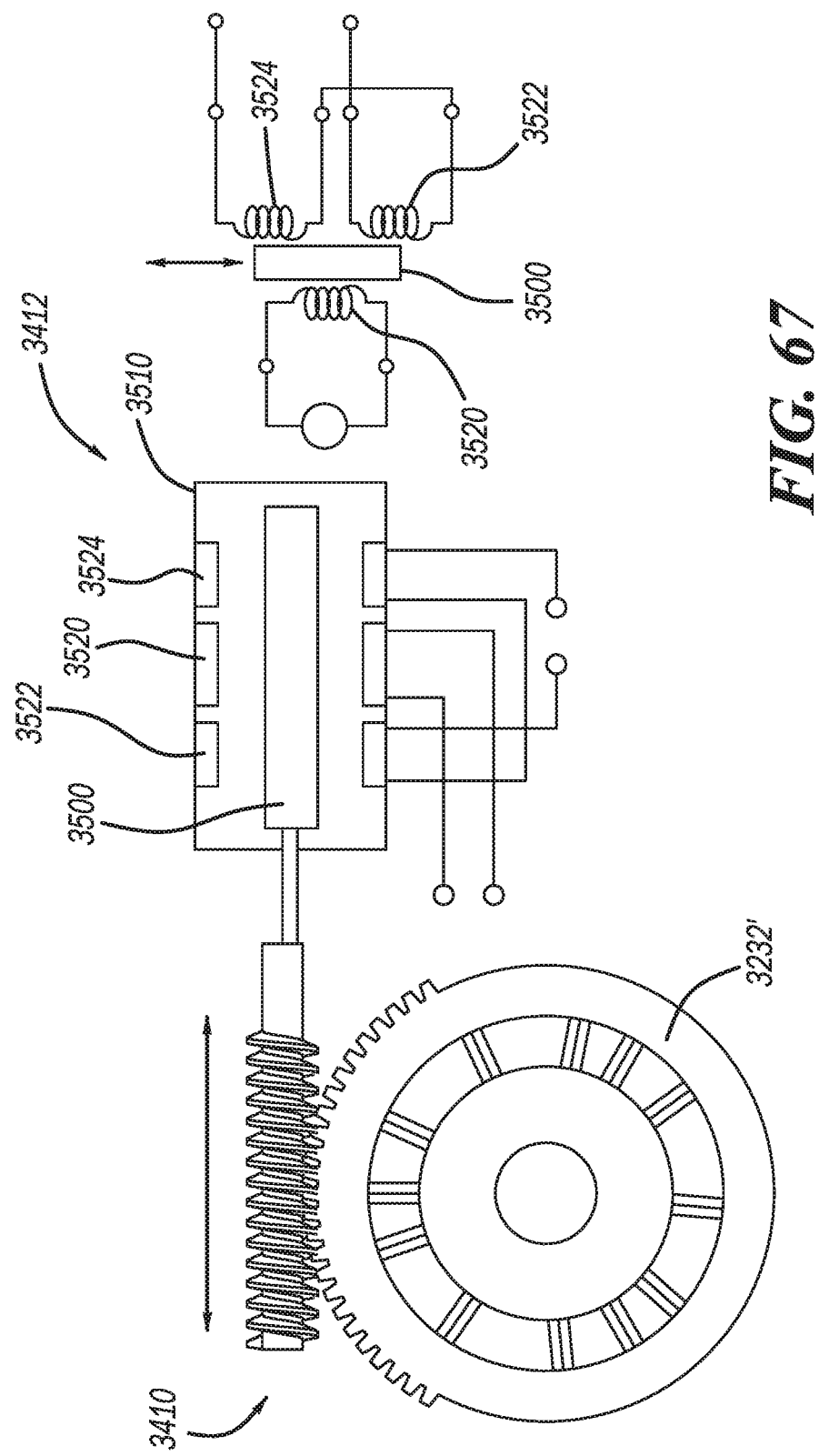
FIG. 67 is a partial schematic view of a sensing arrangement according to another example of the present disclosure.

FIG. 66 illustrates a sensing arrangement 3450 including a potentiometer 3452. FIG. 67 illustrates a sensing arrangement 3410 including a linear variable differential transformer (LVDT) position sensor 3412. A worm gear 3420 can rotate to turn the cam disk 3232'. The LVDT position sensor 3412 includes a core 3500 coupled to the worm gear 3420. The core 3500 can translate within a housing 3510 based on linear motion of the worm gear 3420. The housing 3510 can have a primary coil 3520, a first secondary coil 3522 and a second secondary coil 3524. The position of the core 3500 can be determined by determining a difference in voltage between the first and second secondary coils 3522 and 3524.

Figure 68:
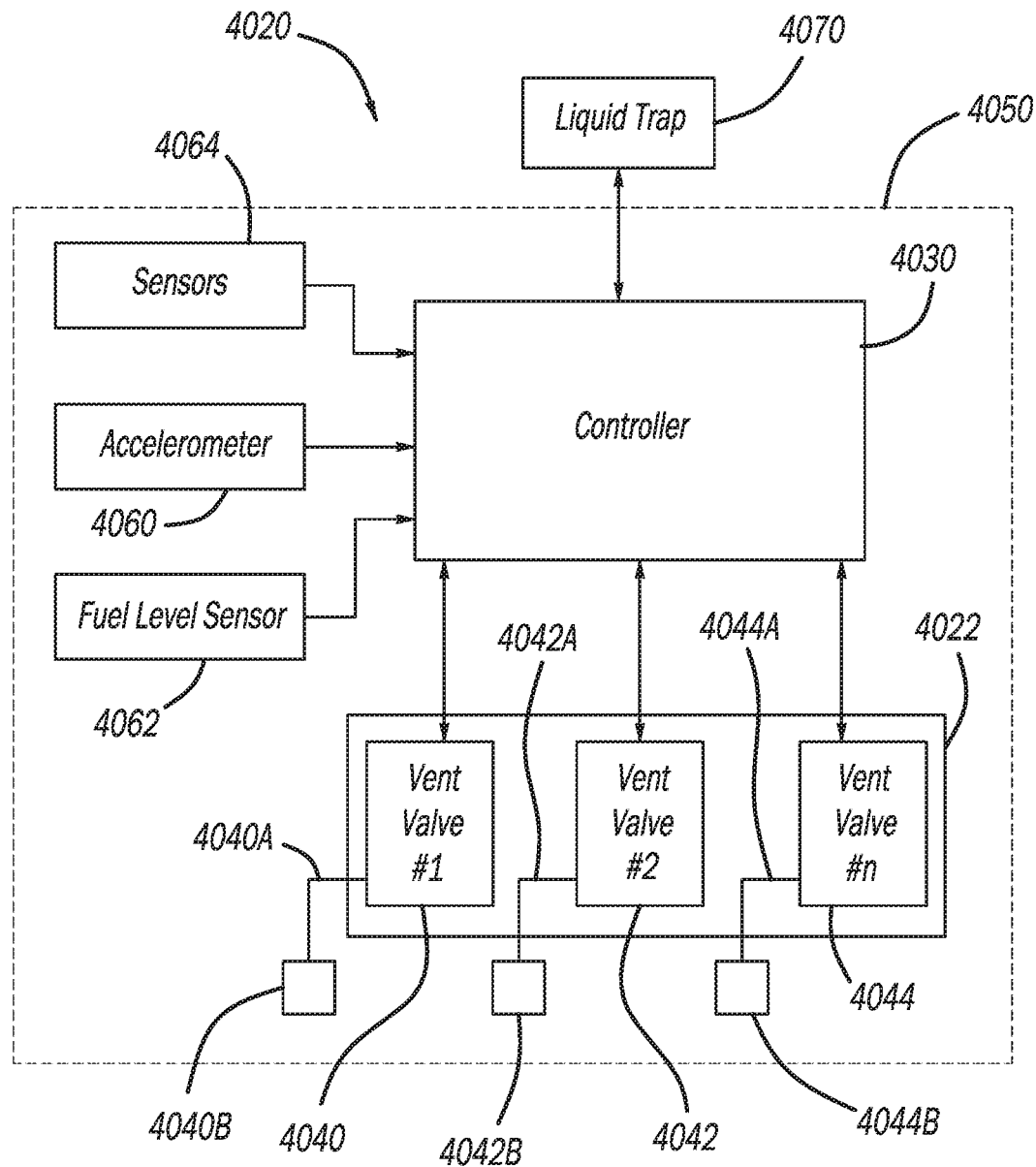
FIG. 68 is a schematic illustration of an evaporative emissions control system according to another example of the present disclosure.
Figure 69:
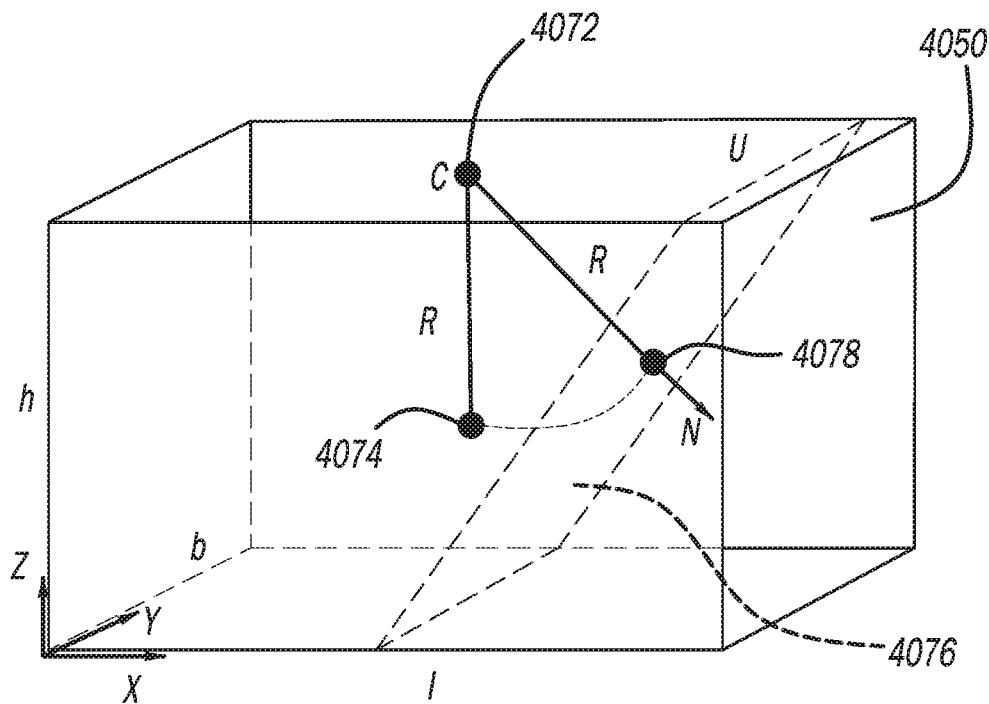
FIG. 69 is a diagrammatic representation of a fuel tank used to determine a tangential fuel surface according to various examples of the present disclosure.

With reference now to FIGS. 1, 68 and 69, an evaporative emissions control system 4020 will be described. It will be appreciated that the control systems and related control methods described herein may be used in conjunction with the electronically controlled solenoid vent valves (solenoid vent shut-off assembly 1022A, FIG. 2) or the motor/cam shaft operated vent valves (mechanical vent shut-off assembly 1022B, FIG. 6) described herein. For simplicity, FIG. 68 includes vent shut-off assembly 4022 and is used to generically represent both of the electronically controlled solenoid valve configuration and the motor/cam shaft operated vent valve configuration described above. In this regard, the evaporative emissions control system 4020 can include a controller 4030 that communicates with electronically controlled solenoid vent valves or motor/cam shaft operated vent valves as described above. Such vent valves are referred to generically as "vent valve #1" 4040, "vent valve #2" 4042 and "vent valve #n" 4044. Each vent valve 4040, 4042 and 4044 has a vent line 4040A, 4042A and 4044A leading to a respective vent opening 4040B, 4042B and 4044B positioned generally in the vapor space near an upper surface of the fuel tank 4050 (see also discussion above with respect to vent openings 1041A and 1041B, FIG. 1). It will be appreciated that vent valve #n 4044 is used to denote any combination of vent valves above two vent valves. The vent valves can be disposed at any desired location within fuel tank 4050 according to application.

A three axis accelerometer 4060 senses acceleration in an x, y and z axis. A fuel level sensor 4062 provides information indicative of an amount of fuel in the fuel tank 4050. A liquid trap 4070 discriminates between vapor and liquid fuel and drains liquid fuel back into the fuel tank 4050. The liquid trap 4070 can have a pump such as a piston pump, solenoid pump, cam actuated pump or other configuration that can selectively pump liquid from the liquid trap 4070. The fuel level sensor 4062 communicates a liquid level to the controller 4030. Other sensors 4064 such as a pressure sensor, a temperature sensor and other sensors provide operating information to the controller 4030. The controller 4030 can also receive operating information from each vent valve 4040, 4042 and 4044 such as current drawn.

A robust control algorithm is used to control the vent valves 4040, 4042 and 4044 to prevent liquid carryover and also to prevent high pressure buildup inside the fuel tank 4050. The instant disclosure provides a control algorithm and method of controlling the vent valves 4040, 4042 and 4044. The algorithm approximates the fuel level surface (sloshing inside the fuel tank 4050) as motion of a pendulum. The fuel tank 4050 is approximated to be of a rectangular shape. The data from the accelerometer 4060 is used by the controller 4030.

Referring now to FIG. 69, a center point 4072 of the top surface of the fuel tank 4050 is assumed to be a center of a sphere having a radius R. A length of a pendulum is calculated using a fuel level in the fuel tank 4050 received by the fuel level sensor 4062. The length of the pendulum terminates at a fuel level center 4074. A tangential surface 4076 to this point mass is calculated. From the tangential surface 4076, the volume beneath it is calculated using surface equations and rectangular tank surface/edge equations represented in FIG. 69. The length of pendulum (fuel level surface distance) is adjusted to compensate for any change in volume (beneath surface) at various angles from the initial value at stand still.

The controller 4030 uses the positions of the openings 4040B, 4042B and 4044B associated with the respective vent valves 4040, 4042 and 4044 and the tangential surface equations to determine which opening 4040B, 4042B and/or 4044B is (or is about to be) submerged with fuel. The vent valve(s) 4040, 4042 and/or 4044 can then be closed electronically (or mechanically) to prevent fuel from entering the liquid trap 4070 by way of the vent openings 4040B, 4042B and/or 4044B associated with the respective vent valves 4040, 4042 and/or 4044. A compensatory value is used to move the tangential surface parallel to the original calculated surface for overcoming the effect of sinusoidal (wave) nature of actual fuel surface in the fuel tank 4050. The algorithm remains the same and can be adjusted to account for varying tank size and location of the vent openings 4040B, 4042B and/or 4044B associated with the respective vent valves 4040, 4042 and/or 4044.

Additional features will now be described. The controller 4030 can use the following equations:

$$a_r = \sqrt{(ax^2 + ay^2 + az^2)}$$

$$\theta = \cos^{-1} a_z/a_r$$

$$\varnothing = \tan^{-1} a_y/a_x$$

From the above equations, $a_x$, $a_y$, and $a_z$ are the acceleration in the x, y and z directions from the accelerometer 4060; $a_r$ is the resultant acceleration acting on the pendulum point mass; θ and Ø are the respective angles of the pendulum with the z axis and its projection on the XY plane with the x axis. Using fuel level at standstill (i.e. $a_z=1$ g, gravitational acceleration and $a_x=0$, $a_y=0$) as length of pendulum, the position of the point mass 4078 can be found as $x_p$, $y_p$ and $z_p$ (see FIG. 69).

The controller 4030 can determine a top surface location of fuel within the fuel tank 4050 based on information from the fuel level sensor 4062. If the fuel is assumed to be a point mass, the data from the accelerometer 4060 can be used to determine a location of the point mass. An equation S (FIG. 69) represents a sphere having a center at 4072 and a radius R. A variable U is a tangential surface. The pendulum point mass can be moved on a line extending between points 4072 and 4078, depending upon the compensatory value for taking sinusoidal or wave surface into account. The position of the openings 4040B, 4042B and 4044C of the respective vent valves 4040, 4042 and 4044 can be substituted in the equations shown in FIG. 69. The controller 4030 can then determine if one or more of the openings 4040B, 4042B and 4044C of the vent valves 4040, 4042 and/or 4044 are on the surface of fuel, above the surface of fuel or beneath the surface of fuel. The volume beneath the surface can be calculated by determining the face and edges of a rectangular tank being cut by fuel surface (i.e. tangential surface) and then dividing it into polyhedron and summing the total volume.

With continued reference to FIG. 68 and additional reference now to FIGS. 70, 71 and 72 additional features of the present disclosure will be described. The controller 4030 can implement a control algorithm that controls the vent shut-off assembly 4022 to prevent liquid carryover and high pressure buildup inside the tank. The control algorithm utilizes a first event assignment lookup table 4200 shown in FIG. 70 and a second vent closing lookup table 4210 shown in FIG. 72 as will be described further herein. It is appreciated that the lookup table 4210 is merely exemplary and other values may be used.

The controller 4030 identifies events such as acceleration, braking, turns, constant speed motion, standstill or parked condition based on data from the accelerometer 4060. The accelerometer 4060 can measure acceleration along an x-axis, the y-axis and the z-axis. Acceleration along the x-axis is for acceleration and braking and is denoted in FIG. 70 as "Ax". Acceleration along the y-axis is for turns (in the left and right direction) and is denoted in FIG. 70 as "Ay". Acceleration along the z-axis is for vehicle inclination and is denoted in FIG. 70 as "Az". It will be appreciated that the axes can be interchanged in directions for vehicle integration. It will be further appreciated that the lookup tables 4200 and 4210 would be modified accordingly.

Figure 70:
FIG. 70 is a first event assignment lookup table according to an example of the present disclosure.

With particular reference to FIG. 70, the event assignment lookup table 4200 will be described. The event assignment lookup table 4200 includes accelerometer axis readings 4220 and identification events, while the vehicle is running identified at 4222, and while the vehicle is parked identified at 4224. Values of "0", "1" and "2" are assigned based on accelerometer data in the x, y and z directions.

Event identification with respect to accelerometer readings along the x axis while the vehicle is running will now be described. If Ax is less than a threshold brake acceleration in the x direction, a value of 0 is assigned for Accel_x. If the threshold brake acceleration in the x direction is less than Ax and Ax is less than a threshold acceleration in the x direction, a value of 1 is assigned for Accel_x. If Ax is greater than the threshold acceleration in the x direction, a value of 2 is assigned for Accel_x. As shown in the identification events 4222, a value of 0 for the Accel_x corresponds to a vehicle braking or reverse acceleration event. A value of 1 for the Accel_x corresponds to the vehicle travelling at constant speed. A value of 2 for the Accel_x corresponds to the vehicle accelerating or reverse braking.

Event identification with respect to accelerometer readings along the y axis while the vehicle is running will now be described. If Ay is less than a threshold right turn acceleration in the y direction, a value of 0 is assigned for Accel_y. If the threshold right turn acceleration in the y direction is less than Ay and Ay is less than a threshold left turn acceleration in the y direction, a value of 1 is assigned for Accel_y. If Ay is greater than the threshold left turn acceleration in the y direction, a value of 2 is assigned for Accel_y. As shown in the identification events 4222, a value of 0 for the Accel_y corresponds to a vehicle right turn event. A value of 1 for the Accel_y corresponds to the vehicle travelling generally in a straight path. A value of 2 for the Accel_y corresponds to a vehicle left turn event.

Event identification with respect to accelerometer readings along the z axis while the vehicle is running will now be described. If Az is greater than a threshold flat inclination in the z direction, a value of 0 is assigned for Accel_z. If a threshold roll value in the z direction is less than Az and Az is less than the threshold flat inclination in the z direction, a value of 1 is assigned for Accel_z. If Az is less than the threshold roll value in the z direction, a value of 2 is assigned for Accel_z. As shown in the identification events 4222, a value of 0 for the Accel_z corresponds to a vehicle on flat ground. A value of 1 for the Accel_z corresponds to the vehicle on an incline (uphill/downhill). A value of 2 for the Accel_z corresponds to a vehicle being inverted or rolled over or dangerous inclination.

Event identification with respect to accelerometer readings along the x axis when the vehicle is parked will now be described. It will be appreciated that for all axes, the same thresholds or changed values may be used to determine vehicle orientation while parked. A value of 0 corresponds to the vehicle nose being down. A value of 1 corresponds to the vehicle being straight on the x axis. A value of 2 corresponds to the vehicle having a nose up.

Event identification with respect to accelerometer readings along the y axis when the vehicle is parked will now be described. A value of 0 corresponds to the vehicle having a left tilt, or rotated in a first direction around the y axis. A value of 1 corresponds to the vehicle being straight on the y axis. A value of 2 corresponds to the vehicle having a right tilt, or rotated in a second direction, opposite the first direction, around the y axis.

Event identification with respect to accelerometer readings along the z axis when the vehicle is parked will now be described. A value of 0 corresponds to the vehicle parked on an almost flat surface. A value of 1 corresponds to the vehicle being parked on an inclined surface along the z axis. A value of 2 corresponds to the vehicle being parked on a severe inclination along the z axis.

Figure 71:
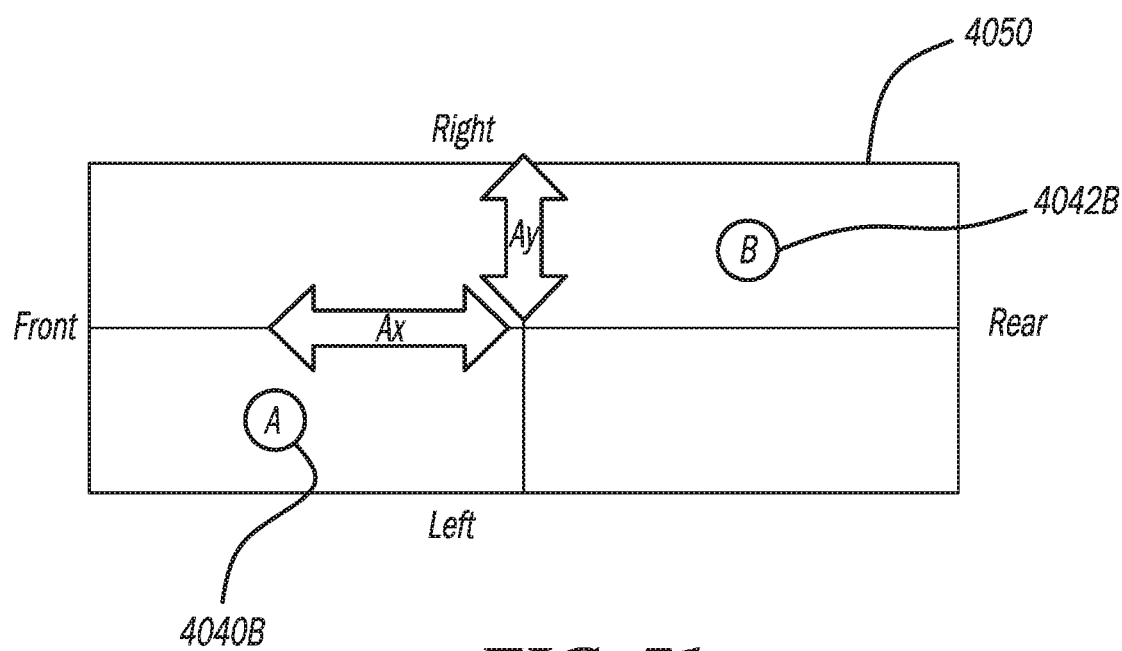
FIG. 71 is a schematic plan view of an exemplary fuel tank having vent openings positioned according to one example.

With reference to FIG. 71 an exemplary schematic illustration of the fuel tank 4050 is shown. The vent valve openings 4040B and 4042B corresponding to the vent valves 4040 and 4042 are shown in exemplary locations. In the particular example shown, the vent valve opening 4040B is shown generally in the front and left quadrant of the fuel tank 4050 while the vent opening 4042B is shown generally in the right rear quadrant of the fuel tank 4050. When the vehicle is accelerating, the liquid fuel in the fuel tank is pushed towards the rear and hence the vent valve 4042 (FIG. 68) should be closed to prevent liquid carryover through the vent opening 4042B. Similarly, the vent valve 4040 (FIG. 68) should be closed to prevent liquid carryover through the vent opening 4040B during a braking event. The various combinations of acceleration in all three axes and corresponding intuitive vent valve states are prepared in the vent closing lookup table 4210 (FIG. 72). It is appreciated that the closed (0), and open (1) states is dependent upon the locations (placement and heights) of the valve openings 4040B, 4042B associated with the valves 4040 and 4042. As identified herein, the valves 4040 and 4042 can be driven in a pulse-width-modulation manner to prevent liquid carryover and also the prevent pressure buildup inside the fuel tank 4050. The liquid trap 4070 allows to have this flexibility as liquid fuel in it can be drained back to the fuel tank 4050.

According to another example of the present disclosure, the controller 4030 can be configured to detect a refueling event and control the vent valves 4040, 4042 and/or 4044 based on the detection for smooth refueling of the fuel tank 4050. In one configuration, a refueling event can be determined at least in part based on information provided by the fuel level sensor 4062. In a refueling event, mechanical valves remain open unless submerged and/or wet in fuel. The placement and sizing of mechanical valves is done to meet refueling performance like high rate refueling, triggering shut off at predefined levels, allow trickle fill to an extent and build pressure to prevent more fuel coming inside the fuel tank. In electronically controlled vent valves, sensing the refueling event and maintaining vent valve operations is critical to meet performance.

The controller 4030 uses information from the three axis accelerometer 4060, the fuel level sensor 4062, and the other sensors 4064 to perform additional functions. The controller 4030 also receives valve positions of the respective vent valves 4040, 4042 and/or 4044. During a refueling event three conditions are satisfied: (1) the vehicle is in park; (2) fuel level increases; and (3) pressure is observed to build (increase) at the start of refueling (fuel coming inside the tank from the filler neck). When the controller 4030 determines that each of the three conditions are satisfied, the algorithm recognizes it as a refueling event and operates the valve/motor driven cam shaft (see FIGS. 5A-8 and related description) in accordance to allow smooth refueling preventing premature shut offs (PSOs). The same may be implemented for the solenoid vent shut-off assembly 1022A. The algorithm also utilizes past history from the three axis accelerometer 4060, the fuel level sensor 4062, and the other sensors 4064 to prevent any false detection of a refueling event.

According to another example of the present disclosure, the controller 4030 can be configured to detect a refueling event and control the vent valves 4040, 4042 and/or 4044 based on the detection to control refueling volume and trickle fill characteristics. In a conventional fuel system, a mechanical fill limit vent valve (FLVV) and grade vent valves (GVV) control refueling fill and subsequent trickle fill by their mechanical properties. An electrically-actuated system such as disclosed herein does not have the same physical limitations and needs a strategy to control the refueling volume and trickle fill characteristics. The controller 4030 uses a fill algorithm to allow for customization of the trickle fill based on a desired profile. The fuel level sensor 4062 communicates a signal to the controller 4030 and the controller 4030 determines the volume in the fuel tank 4050 and thus the percent fill. At the desired fill level, the venting mechanism is actuated closed and the resulting pressure build-up causes the pump nozzle to shut off.

The controller 4030 can implement a profile for trickle fill and the vent valves 4040, 4042 and/or 4044 will actuate open after a prescribed time to allow for the resumption of fill. Once the next fill level is reached, the vent valves 4040, 4042 and/or 4044 will close and cause the next shut off event. This can be continued for as many trickle fills (or "clicks") as prescribed in the profile. In a case where the prescribed time that the vent valves 4040, 4042 and/or 4044 are closed (either in between trickle fills or after the final fill) is sufficiently long to cause the tank pressure to build above a prescribed limit, the vent valves 4040, 4042 and/or 4044 can be "pulsed" open and closed via dithering or pulse width modulation (PWM). This allows the fuel tank 4050 pressure to remain at a safe level while also not allowing further volume to be added via fill. This modulation will continue until the vehicle is no longer at rest, or some signal has been given to indicate the refueling event has ended.

The foregoing description of the examples has been provided for purposes of illustration and description. It is not intended to be exhaustive or to limit the disclosure. Individual elements or features of a particular example are generally not limited to that particular example, but, where applicable, are interchangeable and can be used in a selected example, even if not specifically shown or described. The same may also be varied in many ways. Such variations are not to be regarded as a departure from the disclosure, and all such modifications are intended to be included within the scope of the disclosure.

What is claimed is:

1. An evaporative emissions control system configured to recapture and recycle emitted fuel vapor in a vehicle fuel tank having liquid fuel, the evaporative emissions control system comprising:
   a purge canister adapted to collect fuel vapor emitted by the fuel tank and to subsequently release the fuel vapor to an engine;

a three axis accelerometer that senses acceleration in an x, y and z axis;

a first vent tube disposed in the fuel tank and that terminates at a first vent opening;

a second vent tube disposed in the fuel tank and that terminates at a second vent opening;

a first vent valve fluidly coupled to the first vent tube and configured to selectively open and close a first port that connects the first vent valve to the first vent tube;

a second vent valve fluidly coupled to the second vent tube and configured to selectively open and close a second port that connects the second vent valve to the second vent tube;

a vent shut-off assembly that selectively opens and closes the first and second valves to provide overpressure and vacuum relief for the fuel tank; and a control module that regulates operation of the vent shut-off assembly based on operating conditions, wherein the control module (i) estimates a location of liquid fuel based on the sensed acceleration from the accelerometer and (ii) determines which vent opening of the first and second vent openings is one of submerged and about to be submerged based on the estimated location of liquid fuel, and (iii) closes the vent valve associated with the determined vent opening.

2. The evaporative emissions control system of claim 1 wherein the control module determines which vent opening is one of submerged and about to be submerged based upon a lookup table.

3. The evaporative emissions control system of claim 2 wherein the control module compares a first acceleration measured in a first direction by the accelerometer with a threshold acceleration and closes one of the first and second valves based on the comparison.

4. The evaporative emissions control system of claim 3 wherein the threshold acceleration corresponds to a sensed acceleration in the x, y and z axes.

5. The evaporative emissions control system of claim 1 wherein the control module closes one of the first and second valves by way of pulse width modulation.

6. The evaporative emissions control system of claim 3 wherein the threshold acceleration is dependent upon a fuel level of liquid fuel in the fuel tank.

7. The evaporative emissions control system of claim 6, further comprising a liquid trap configured to drain liquid fuel back to the fuel tank, wherein the threshold acceleration is further dependent upon at least one of (i) pressure within the fuel tank, and (ii) amount of liquid fuel in the liquid trap.

8. The evaporative emissions control system of claim 6 wherein the control module modifies the threshold acceleration based upon historic performance of the evaporative emissions control system.

9. The evaporative emissions control system of claim 1 wherein the control module estimates a fuel level top surface based on the sensed acceleration.

10. The evaporative emissions control system of claim 9 wherein the control module approximates a tangential surface of the fuel.

11. The evaporative emissions control system of claim 10 wherein the control module determines a volume of fuel in the fuel tank.

12. The evaporative emissions control system of claim 11 wherein the control module corrects the tangential surface of the fuel based on the determined volume of fuel.

13. The evaporative emissions control system of claim 12 wherein the control module determines which vent opening associated with the first and second vent valves is one of submerged and about to be submerged based on a comparison of a respective location of the first and second vent valve openings and the tangential surface of the fuel.

14. An evaporative emissions control system configured to recapture and recycle emitted fuel vapor in a vehicle fuel tank having liquid fuel, the evaporative emissions control system comprising:

a purge canister adapted to collect fuel vapor emitted by the fuel tank and to subsequently release the fuel vapor to an engine;

a fuel level sensor that communicates a signal indicative of an amount of fuel in the fuel tank;

a first vent tube disposed in the fuel tank and that terminates at a first vent opening;

a second vent tube disposed in the fuel tank and that terminates at a second vent opening;

a first vent valve fluidly coupled to the first vent tube and configured to selectively open and close a first port that connects the first vent valve to the first vent tube;

a second vent valve fluidly coupled to the second vent tube and configured to selectively open and close a second port that connects the second vent valve to the second vent tube;

a vent shut-off assembly that selectively opens and closes the first and second valves to provide overpressure and vacuum relief for the fuel tank; and a controller that receives the signal from the fuel level sensor and (i) determines whether a refueling event is occurring, (ii) actuates the first and second valves closed a first time based on a first fill level being reached; (iii) actuates the first and second vent valves open after a predetermined time to allow for a resumption of fill, (iv) determines whether a subsequent fill level is reached, and (v) closes the first and second vent valves closed a second time based upon the subsequent fill level being reached.

15. The evaporative emissions control system of claim 14 wherein the controller implements a profile to allow for a predetermined amount of subsequent fill levels being reached.

16. The evaporative emissions control system of claim 15 wherein the first and second valves are opened and closed using pulse width modulation.

17. An evaporative emissions control system configured to recapture and recycle emitted fuel vapor in a vehicle fuel tank having liquid fuel, the evaporative emissions control system comprising:

a purge canister adapted to collect fuel vapor emitted by the fuel tank and to subsequently release the fuel vapor to an engine;

an accelerometer that senses acceleration;

a first vent tube disposed in the fuel tank and that terminates at a first vent opening;

a second vent tube disposed in the fuel tank and that terminates at a second vent opening;

a first vent valve fluidly coupled to the first vent tube and configured to selectively open and close a first port that connects the first vent valve to the first vent tube;

a second vent valve fluidly coupled to the second vent tube and configured to selectively open and close a second port that connects the second vent valve to the second vent tube;

a vent shut-off assembly that selectively opens and closes the first and second valves to provide overpressure and vacuum relief for the fuel tank; and a control module that regulates operation of the vent shut-off assembly based on operating conditions, wherein the control module (i) estimates a location of liquid fuel based on the sensed acceleration from the accelerometer and (ii) determines which vent opening of the first and second vent openings is one of submerged and about to be submerged based on the estimated location of liquid fuel, and (iii) closes the vent valve associated with the determined vent opening.

18. The evaporative emissions control system of claim 17 wherein the control module compares a first acceleration measured in a first direction by the accelerometer with a threshold acceleration and closes one of the first and second valves based on the comparison.

19. The evaporative emissions control system of claim 18 wherein the threshold acceleration is dependent upon a fuel level of liquid fuel in the fuel tank, the evaporative emissions control system further comprising a liquid trap configured to drain liquid fuel back to the fuel tank, wherein the threshold acceleration is further dependent upon at least one of (i) pressure within the fuel tank, and (ii) amount of liquid fuel in the liquid trap.

* * * * *